US011624007B2

(12) United States Patent
Liu et al.

(10) Patent No.: US 11,624,007 B2
(45) Date of Patent: Apr. 11, 2023

(54) PHOTOCURABLE ADHESION-PROMOTING COMPOSITIONS AND METHODS OF USE

(71) Applicant: PRC-DeSoto International, Inc., Sylmar, CA (US)

(72) Inventors: JianCheng Liu, Arcadia, CA (US); Chu Ran Zheng, Arcadia, CA (US); Millie Chang, Burbank, CA (US); Nagarajan Srivatsan, Diamond Bar, CA (US)

(73) Assignee: PRC-DESOTO INTERNATIONAL, INC., Slymar, CA (US)

( * ) Notice: Subject to any disclaimer, the term of this patent is extended or adjusted under 35 U.S.C. 154(b) by 508 days.

(21) Appl. No.: 16/775,524

(22) Filed: Jan. 29, 2020

(65) Prior Publication Data
US 2021/0230457 A1 Jul. 29, 2021

(51) Int. Cl.
| | | |
|---|---|---|
| C09J 11/06 | (2006.01) | |
| B32B 7/12 | (2006.01) | |
| B32B 15/08 | (2006.01) | |
| C08K 5/5419 | (2006.01) | |
| C08K 5/544 | (2006.01) | |
| C08K 5/56 | (2006.01) | |
| C09J 183/06 | (2006.01) | |
| C08G 77/04 | (2006.01) | |
| C08G 77/18 | (2006.01) | |
| C08G 77/20 | (2006.01) | |
| C08G 77/26 | (2006.01) | |
| C08G 77/28 | (2006.01) | |
| C08G 77/00 | (2006.01) | |
| C09D 7/20 | (2018.01) | |
| C09D 183/06 | (2006.01) | |
| C09D 183/08 | (2006.01) | |
| C09J 183/08 | (2006.01) | |
| C08K 5/548 | (2006.01) | |

(52) U.S. Cl.
CPC ............... C09J 11/06 (2013.01); B32B 7/12 (2013.01); B32B 15/08 (2013.01); C08K 5/544 (2013.01); C08K 5/548 (2013.01); C08K 5/5419 (2013.01); C08K 5/56 (2013.01); C09J 183/06 (2013.01); *B32B 2310/08* (2013.01); *B32B 2405/00* (2013.01); *B32B 2605/18* (2013.01)

(58) Field of Classification Search
None
See application file for complete search history.

(56) References Cited

U.S. PATENT DOCUMENTS

| | | |
|---|---|---|
| 3,022,196 A | 2/1962 | Jenkins et al. |
| 4,366,307 A | 12/1982 | Singh et al. |
| 4,389,432 A | 6/1983 | Inoue et al. |
| 4,609,762 A | 9/1986 | Morris et al. |
| 5,178,675 A | 1/1993 | Sexsmith |
| 5,225,472 A | 7/1993 | Cameron et al. |
| 5,650,474 A | 7/1997 | Yamaya et al. |
| 5,750,197 A | 5/1998 | Van Ooij et al. |
| 5,888,656 A | 3/1999 | Suzuki et al. |
| 6,172,179 B1 | 1/2001 | Zook et al. |
| 6,525,168 B2 | 2/2003 | Zook et al. |
| 6,875,836 B2 | 4/2005 | Yoshihara et al. |
| 7,438,974 B2 | 10/2008 | Obuhowich |
| 8,367,743 B2 | 2/2013 | Galob et al. |
| 8,513,339 B1 | 8/2013 | Keledjian et al. |
| 9,315,695 B2 | 4/2016 | Rahim et al. |
| 2001/0032568 A1 | 10/2001 | Schutt |
| 2001/0036554 A1 | 11/2001 | Jin et al. |
| 2004/0091716 A1 | 5/2004 | Van den Berg et al. |
| 2004/0131793 A1 | 7/2004 | Bier et al. |
| 2005/0288474 A1* | 12/2005 | Matsuda ............... C09D 171/02 428/447 |
| 2006/0105101 A1 | 5/2006 | Pialet et al. |
| 2006/0275616 A1 | 12/2006 | Clough et al. |
| 2008/0081120 A1 | 4/2008 | Van Ooij et al. |
| 2008/0268162 A1 | 10/2008 | Borovik et al. |
| 2008/0268216 A1 | 10/2008 | Schwoeppe et al. |
| 2009/0104464 A1 | 4/2009 | Galbo et al. |
| 2009/0162592 A1 | 6/2009 | Baikerikar et al. |
| 2010/0010133 A1 | 1/2010 | Zook et al. |
| 2010/0041839 A1 | 2/2010 | Anderson et al. |
| 2010/0191001 A1 | 7/2010 | Wassmer et al. |
| 2011/0148294 A1 | 6/2011 | Krajka et al. |
| 2011/0195256 A1 | 8/2011 | Morikawa et al. |
| 2011/0268899 A1 | 11/2011 | Albert et al. |
| 2011/0319559 A1 | 12/2011 | Kania et al. |
| 2012/0040103 A1 | 2/2012 | Keledjian et al. |
| 2012/0040104 A1 | 2/2012 | Keledjian et al. |
| 2013/0284359 A1 | 10/2013 | Virnelson |
| 2013/0344287 A1 | 12/2013 | Keledjian et al. |
| 2013/0345372 A1 | 12/2013 | Blackford et al. |
| 2014/0069293 A1 | 3/2014 | Albert et al. |
| 2014/0186543 A1 | 7/2014 | Keledjian et al. |

(Continued)

FOREIGN PATENT DOCUMENTS

| | | | |
|---|---|---|---|
| CN | 1407042 A | | 4/2003 |
| CN | 103773235 A | | 5/2014 |
| EA | 001588 B1 | | 6/2001 |
| EP | 1659160 | | 5/2006 |
| JP | 54063176 A | | 5/1979 |
| JP | 56125464 A | | 10/1981 |

(Continued)

OTHER PUBLICATIONS

Heitz et al., "Cross-condensation and particle growth in aqueous silane mixtures at low concentration," Journal of Colloid and Interface Science, 2006, vol. 298, p. 192-201.
International Search Report and Written Opinion for PCT Application No. PCT/US2016/020602, dated Jun. 1, 2016, 8 pages.

*Primary Examiner* — Ramsey Zacharia

(57) ABSTRACT

Photocurable adhesion-promoting compositions containing organic titanates and/or organic zirconates and partially reacted alkoxysilanes and the use of the photocurable adhesion-promoting compositions to provide adhesion between metal substrates and an overlying radiation-cured sealant are disclosed.

21 Claims, 2 Drawing Sheets

(56) References Cited

U.S. PATENT DOCUMENTS

| | | |
|---|---|---|
| 2014/0272155 A1 | 9/2014 | Kramer et al. |
| 2014/0275461 A1 | 9/2014 | Rao et al. |
| 2015/0115311 A1 | 4/2015 | Yoshida et al. |
| 2015/0376476 A1 | 12/2015 | Rahim et al. |
| 2016/0200913 A1 | 7/2016 | Matsukawa et al. |
| 2016/0257819 A1 | 9/2016 | Pathak et al. |
| 2018/0201816 A1 | 7/2018 | Lee et al. |
| 2019/0264076 A1 | 8/2019 | Tanabe et al. |

FOREIGN PATENT DOCUMENTS

| | | |
|---|---|---|
| JP | 2000-256620 A | 9/2000 |
| JP | 2003-176360 A | 6/2003 |
| JP | 2003-531924 A | 10/2003 |
| JP | 2010-537016 A | 12/2010 |
| JP | 5525431 A | 6/2011 |
| RU | 2447113 C2 | 9/2007 |
| RU | 2392288 C2 | 6/2010 |
| RU | 2524342 C1 | 7/2014 |

\* cited by examiner

PHOTOCURABLE ADHESION-PROMOTING COMPOSITIONS AND METHODS OF USE

FIELD

The disclosure relates to photocurable adhesion-promoting compositions and the use of the photocurable adhesion-promoting compositions to provide adhesion-promoting layers that enhance adhesion between metal substrates and a radiation-cured sealant.

BACKGROUND

It is desirable that a sealant adhere to a variety of metal substrates. Photocurable adhesion-promoting layers can be used to enhance the adhesion of an overlying a radiation-cured sealant to an underlying metal substrate.

SUMMARY

According to the present invention, photocurable adhesion-promoting precursor compositions comprise: an amine-functional alkoxysilane; an alkenyl-functional alkoxysilane; a photoinitiator; and an organic solvent.

According to the present invention, photocurable adhesion-promoting compositions comprise the product of heating the photocurable adhesion-promoting precursor composition according to the present invention at temperature from 40° C. to 100° C.

According to the present invention, photocurable adhesion-promoting layers are derived from the photocurable adhesion-promoting composition according to the present invention.

According to the present invention, multilayer systems comprise: (a) the photocurable adhesion-promoting layer according to the present invention; and (b) a polymer layer overlying the photocurable adhesion-promoting layer, wherein the polymer layer is derived from a radiation-curable composition.

According to the present invention, vehicles comprise a multilayer system according to the present invention.

According to the present invention, methods of making a photocurable adhesion-promoting composition comprise heating the photocurable adhesion-promoting precursor composition according to the present invention to a temperature from 40° C. to 100° C., for from 20 hours to 200 hours to form the photocurable adhesion-promoting composition.

According to the present invention, photocurable adhesion-promoting compositions are made according to the present invention.

According to the present invention, method of making multilayer systems comprise: applying the photocurable adhesion-promoting composition according to the present invention to a substrate; drying the applied photocurable adhesion-promoting composition to form a photocurable adhesion-promoting layer; applying a radiation-curable polymer composition onto the photocurable adhesion-promoting layer; and exposing the photocurable adhesion-promoting layer and the applied radiation-curable polymer composition to radiation to cure the photocurable adhesion-promoting layer and to cure the applied radiation-curable polymer composition.

According to the present invention, vehicles comprise a multilayer system according to the present invention.

BRIEF DESCRIPTION OF THE DRAWINGS

The drawings described herein are for illustration purposes only. The drawings are not intended to limit the scope of the present disclosure.

DETAILED DESCRIPTION

Figure 1:
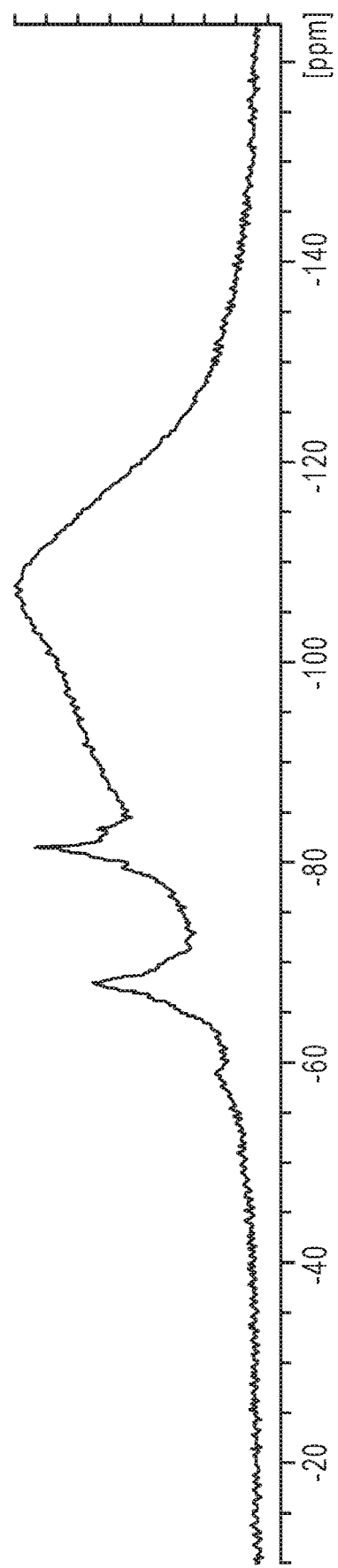
FIG. 1 shows an Si-NMR spectrum of an adhesion-promoting composition provided by the present disclosure.

For purposes of the following detailed description, it is to be understood that embodiments provided by the present disclosure may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

An "adhesion-promoting layer" refers to a material layer disposed between a substrate such as a metal substrate and a polymer layer that is different from the adhesion-promoting layer such as a sealant. The adhesion between the substrate and the overlying polymer layer is greater with an adhesion-promoting layer provided by the present disclosure disposed between the substrate and the polymer layer, than the adhesion between the polymer layer and the substrate without the adhesion-promoting layer. Adhesion can be determined as described herein.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). A branched alkanediyl has a minimum of three carbon atoms. An alkanediyl can be $C_{2-14}$ alkanediyl, $C_{2-10}$ alkanediyl, $C_{2-8}$ alkanediyl, $C_{2-6}$ alkanediyl, $C_{2-4}$ alkanediyl, or $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—CH₂CH₂CH₂CH₂—), pentane-1,5-diyl (—CH₂CH₂CH₂CH₂CH₂—), hexane-1,6-diyl (—CH₂CH₂CH₂CH₂CH₂CH₂—), heptane-1,7-diyl, octane-1,8-diyl, nonane-1,9-diyl, decane-1,10-diyl, and dodecane-1,12-diyl. "Alkanecycloalkyl" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. Each cycloalkyl and/or cycloalkanediyl group(s) can be $C_{3-6}$, $C_{5-6}$, cyclohexyl or cyclohexanediyl. Each alkyl and/or alkanediyl group(s) can be $C_{1-6}$, $C_{1-4}$, $C_{1-3}$, methyl, methanediyl, ethyl, or ethane-1,2-diyl. An alkanecycloalkyl group can be $C_{4-18}$ alkanecycloalkyl, $C_{4-16}$ alkanecycloalkyl, $C_{4-12}$ alkanecycloalkyl, $C_{4-8}$ alkanecycloalkyl, $C_{6-12}$ alkanecycloalkyl, $C_{6-10}$ alkanecycloalkyl, or $C_{6-9}$ alkanecycloalkyl. Examples of alkanecycloalkyl groups include 1,1,3,3-tetramethylcyclohexane and cyclohexylmethane.

"Alkanecycloalkanediyl" refers to a diradical of an alkanecycloalkane group. An alkanecycloalkanediyl group can be $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, or $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. Each aryl and/or arenediyl group(s) can be $C_{6-12}$, $C_{6-10}$, phenyl or benzenediyl. Each alkyl and/or alkanediyl group(s) can be $C_{1-6}$, $C_{1-4}$, $C_{1-3}$, methyl, methanediyl, ethyl, or ethane-1,2-diyl. An alkanearene group can be $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, or $C_{6-9}$ alkanearene. Examples of alkanearene groups include diphenyl methane.

"Alkanearenediyl" refers to a diradical of an alkanearene group. An alkanearenediyl group can be $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, or $C_{6-9}$ alkanearenediyl. An example of an alkanearenediyl group is diphenyl methane-4,4'-diyl.

"Alkenyl" group refers to the structure —CR=C(R)₂ where the alkenyl group is bonded to a larger molecule. In such embodiments, each R can independently comprise, for example, hydrogen and $C_{1-3}$ alkyl. Each R can be hydrogen and an alkenyl group can have the structure —CH=CH₂.

"Alkynyl" group refers to a moiety —C≡CR where the alkynyl group is bonded to a larger molecule. In such embodiments, each R can independently comprise, for example, hydrogen or $C_{1-3}$ alkyl. Each R can be hydrogen and an alkynyl group can have the structure —C≡CH.

"Alkoxy" refers to a —OR group where R is alkyl as defined herein. Examples of alkoxy groups include methoxy, ethoxy, n-propoxy, isopropoxy, and n-butoxy. An alkoxy group can be, for example, $C_{1-8}$ alkoxy, $C_{1-6}$ alkoxy, $C_{1-4}$ alkoxy, or $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. An alkyl group can be, for example, $C_{1-6}$ alkyl, $C_{1-4}$ alkyl, or $C_{1-3}$ alkyl. Examples of alkyl groups include methyl, ethyl, n-propyl, iso-propyl, n-butyl, iso-butyl, tert-butyl, n-hexyl, n-decyl, and tetradecyl.

"Arenediyl" refers to diradical monocyclic or polycyclic aromatic group. Examples of arenediyl groups include benzene-diyl and naphthalene-diyl. An arenediyl group can be, for example, $C_{6-12}$ arenediyl, $C_{6-10}$ arenediyl, $C_{6-9}$ arenediyl, or benzene-diyl.

"Aryl" refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes a phenyl ring fused to a 5- to 7-membered heterocycloalkyl ring containing one or more heteroatoms selected from N, O, and S. For such fused, bicyclic ring systems wherein only one of the rings is a carbocyclic aromatic ring, the radical carbon atom may be at the carbocyclic aromatic ring or at the heterocycloalkyl ring. Examples of aryl groups include groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, pentacene, pentalene, pentaphene, perylene, phenalene, phenanthrene, picene, pleiadene, pyrene, pyranthrene, rubicene, triphenylene, trinaphthalene, and the like. In certain embodiments, an aryl group is $C_{6-10}$ aryl, and in certain embodiments, phenyl. Aryl, however, does not encompass or overlap in any way with heteroaryl, separately defined herein.

An "alkoxysilane" refers to a silane have one alkoxy group, two alkoxy groups, or three alkoxy groups. Similarly, an alkoxysilane refers to a compound having at least one alkoxysilane group in which the alkoxysilane group may have one, two, or three alkoxy groups.

"Average molecular weight" refers to number average molecular weight. Number average molecular weight can be determined by gel permeation chromatography using a polystyrene standard, or for thiol-terminated prepolymers, can be determined using iodine titration.

A "backbone" of a prepolymer refers to the segment between the reactive terminal groups. A prepolymer backbone typically includes repeating subunits. For example, the backbone of a polythiol HS—[R]ₙ—SH is —[R]ₙ—.

"Composition" is intended to encompass a product comprising the specified components in the specified amounts, as well as any product which results, directly or indirectly, from the combination of the specified ingredients in the specified amounts.

A "core" of a polyfunctionalizing agent B(—V)_z refers to the moiety B. A "core" of a compound or a polymer refers to the segment between the reactive terminal groups. For example, the core of a polythiol HS—R—SH will be —R—. A core of a compound or prepolymer can also be referred to as a backbone of a compound or a backbone of a prepolymer. A core of a polyfunctionalizing agent can be an atom or a structure such as a cycloalkane, a substituted cycloalkane, heterocycloalkane, substituted heterocycloalkane, arene, substituted arene, heteroarene, or substituted heteroarene from which moieties having a reactive functional are bonded.

As used herein, the term "cure" or "cured" as used in connection with a composition, e.g., "composition when cured" or a "cured composition," means that any curable or crosslinkable components of the composition are at least partially reacted or crosslinked.

A "curable composition" refers to a composition that comprises at least two reactants capable of reacting to form a cured composition. For example, a curable composition can comprise an isocyanate-terminated chain-extended polythioether prepolymer and a polyamine capable of reacting to form a cured polymer. A curable composition may include a catalyst for the curing reaction and other components such as, for example, filler, pigments, and adhesion promoters. A curable composition may be curable at room temperature or may require exposure to elevated temperature such as a temperature above room temperature or other condition(s) to initiate and/or to accelerate the curing reaction. A curable composition can be a free radical polymerizable composition in which the curing reaction proceeds in the presence of free radicals. A curable composition may initially be provided as a two-part composition including, for example, a separate base component and an accelerator component. The base composition can contain one of the reactants participating in the curing reaction such as an isocyanate-terminated chain-extended polythioether prepolymer and the accelerator component can contain the other reactant such as a polyamine. The two components can be mixed shortly before use to provide a curable composition. A curable composition can exhibit a viscosity suitable for a particular method of application. For example, a Class A sealant composition, which is suitable for brush-on applications, can be characterized by a viscosity from 1 poise to 500 poise (0.1 Pa-sec to 50 Pa-sec). A Class B sealant composition, which is suitable for fillet seal applications, can be characterized by a viscosity from 4,500 poise to 20,000 poise (450 Pa-sec to 2,000 Pa-sec). A Class C sealant composition, which is suitable for fay seal applications, can be characterized by a viscosity from 500 poise to 4,500 poise (50 Pa-sec to 450 Pa-sec). The viscosity of compositions (curable compositions) can be measured as described herein. After the two components of a sealant system are combined and mixed, the curing reaction can proceed, and the viscosity of the curable composition can increase and at some point, will no longer be workable. The duration between when the two components are mixed to form the curable composition to when the curable composition can no longer be reasonably or practically applied to a surface for its intended purpose can be referred to as the working time. As can be appreciated, the working time can depend on a number of factors including, for example, the curing chemistry, the catalyst used, the application method, and the temperature. Once a curable composition is applied to a surface (and during application), the curing reaction can proceed to provide a cured composition. A cured composition develops a tack-free surface, cures, and then fully cures over a period of time. A curable composition can be considered to be cured when the hardness of the surface is at least Shore 30A for a Class B sealant or a Class C sealant. After a sealant has cured to a hardness of Shore 30A it can take from several days to several weeks for a curable composition fully cure. A composition is considered fully cured when the hardness no longer increases. Depending on the formulation, a fully cured sealant can exhibit, for example, a hardness from Shore 40A to Shore 70A. Shore A hardness is, determined according to ISO 868. For coating applications, a curable composition can have a viscosity, for example, from 200 cps to 800 cps (0.2 Pa-sec to 0.8 Pa-sec). For sprayable coating and sealant compositions, a curable composition can have a viscosity, for example, from 15 cps to 100 cps (0.015 Pa-sec to 0.1 Pa-sec), such as from 20 cps to 80 cps (0.02 Pa-sec to 0.0.8 Pa-sec).

"Curing agent" refers to a compound that has reactive groups that are reactive with the reactive groups of a prepolymer with which it is used to form a cured crosslinked polymer. A curing agent may include monomers, chain-extenders, and crosslinkers. In general, a curing agent is characterized by a low molecular weight, which is less than the molecular weight of the prepolymer with which it is used. A curing agent and the prepolymer are used in a one-to-one equivalent ratio.

"Cycloalkanediyl" refers to a diradical saturated monocyclic or polycyclic hydrocarbon group. A cycloalkanediyl group can be, for example, $C_{3-12}$ cycloalkanediyl, $C_{3-8}$ cycloalkanediyl, $C_{3-6}$ cycloalkanediyl, or $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon mono-radical group. A cycloalkyl group can be, for example, $C_{3-12}$ cycloalkyl, $C_{3-8}$ cycloalkyl, $C_{3-6}$ cycloalkyl, or $C_{5-6}$ cycloalkyl.

"Dark cure" refers to curing mechanisms that do not require exposure to actinic radiation such as UV radiation to initiate the curing reaction. Actinic radiation may be applied to a dark cure system to accelerate curing of all or a part of a composition but exposing the composition to actinic radiation is not necessary to cure the sample. A dark cure composition can fully cure under dark conditions without exposure to actinic radiation.

A dash ("-") that is not between two letters or symbols is used to indicate a point of bonding for a substituent or between two atoms. For example, —$CONH_2$ is attached to another moiety through the carbon atom.

"Derived from" as in "a moiety derived from a compound" refers to a moiety that is generated upon reaction of a parent compound with a reactant. For example, a bis (alkenyl) compound such as $CH_2$=CH—R—CH=$CH_2$ can react with another compound such as a compound having thiol groups to produce the moiety —$(CH_2)_2$—R—$(CH_2)_2$—, which is derived from the reaction of the alkenyl groups with the thiol groups. For example, for a parent diisocyanate having the structure O=C=N—R—N=C=O, a moiety derived from the diisocyanate has the structure —C(O)—NH—R—NH—C(O)—. As another example, for a parent non-linear short chain diol having the structure HO—R—OH, a moiety derived from the non-linear short-chain diol has the structure —O—R—O—.

"Derived from the reaction of —V with a thiol" refers to a moiety —V'— that results from the reaction of a thiol group with a moiety comprising a terminal group reactive with a thiol group. For example, a group V— can comprise $CH_2$=CH—$CH_2$—O—, where the terminal alkenyl group $CH_2$=CH— is reactive with a thiol group —SH. Upon reaction with a thiol group, the moiety —V'— is —$CH_2$—$CH_2$—$CH_2$—O—.

The term "equivalents" refers to the number of functional reactive groups of the substance.

"Equivalent weight" is effectively equal to the molecular weight of a substance, divided by the valence or number of functional reactive groups of the substance.

Glass transition temperature $T_g$ is determined by dynamic mechanical analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

"Heteroalkanediyl" refers to an alkanediyl group in which one or more of the carbon atoms are replaced with a heteroatom, such as N, O, S, and/or P. In a heteroalkanediyl, the one or more heteroatoms can be N and/or O.

"Heterocycloalkanediyl" refers to a cycloalkanediyl group in which one or more of the carbon atoms are replaced with a heteroatom, such as N, O, S, and/or P. In a heterocycloalkanediyl, the one or more heteroatoms can be N and/or O.

"Heteroarenediyl" refers to an arenediyl group in which one or more of the carbon atoms are replaced with a heteroatom, such as N, O, S, and/or P. In a heteroarenediyl, the one or more heteroatoms can be N and/or O.

"Heteroaryl" refers to a monovalent heteroaromatic radical derived by the removal of one hydrogen atom from a single atom of a parent heteroaromatic ring system. Heteroaryl encompasses multiple ring systems having at least one heteroaromatic ring fused to at least one other ring, which may be aromatic or non-aromatic. For example, heteroaryl encompasses bicyclic rings in which one ring is heteroaromatic and the second ring is a heterocycloalkyl ring. For such fused, bicyclic heteroaryl ring systems wherein only one of the rings contains one or more heteroatoms, the radical carbon may be at the aromatic ring or at the heterocycloalkyl ring. In certain embodiments, when the total number of N, S, and O atoms in the heteroaryl group exceeds one, the heteroatoms may or may not be adjacent to one another. In certain embodiments, the total number of heteroatoms in the heteroaryl group is not more than two. In certain embodiments of heteroaryl, the heteroatomic group is selected from —O—, —S—, —NH—, —N(—CH$_3$)—, —SO—, and —SO$_2$—, in certain embodiments, the heteroatomic group is selected from —O— and —NH—, and in certain embodiments the heteroatomic group is —O— or —NH—. A heteroaryl group can be selected from $C_{5-10}$ heteroaryl, $C_{5-9}$ heteroaryl, $C_{5-8}$ heteroaryl, $C_{5-7}$ heteroaryl, and $C_{5-6}$ heteroaryl, such as $C_5$ heteroaryl and $C_6$ heteroaryl.

Examples of heteroaryl groups include groups derived from acridine, arsindole, carbazole, α-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, thiazolidine, oxazolidine, and the like. In certain embodiments, heteroaryl groups are those derived from thiophene, pyrrole, benzothiophene, benzofuran, indole, pyridine, quinoline, imidazole, oxazole, or pyrazine. For example, heteroaryl can be selected from furyl, thienyl, pyrrolyl, imidazolyl, pyrazolyl, isothiazolyl, or isoxazolyl. In certain embodiments, heteroaryl is $C_6$ heteroaryl, and is selected from pyridinyl, pyrazinyl, pyrimidinyl, and pyridazinyl.

A mono-organo-functional alkoxysilane refers to an alkoxysilane having one organo-functional group. A di-organo-functional alkoxysilane refers to an alkoxysilane having two organo-functional groups. A tri-organo-functional alkoxysilane refers to an alkoxysilane having three organo-functional groups. Examples of organo-functional groups include primary amines, secondary amines and alkenyl groups. A secondary amine-functional alkoxysilane refers to an alkoxysilane having one or more secondary amine groups. A dipodal organo-functional alkoxysilane refers to an organo-silane having to alkoxysilane groups.

"Photocurable" refers to a composition such as an adhesion-promoting composition, an adhesion-promoting layer or a polymer composition that is curable upon exposure to actinic radiation such as visible light or ultraviolet (UV) radiation.

A "polyalkenyl" refers to a compound having at least two alkenyl groups. The at least two alkenyl groups can be terminal alkenyl groups and such polyalkenyls can be referred to as alkenyl-terminated compounds. Alkenyl groups can also be pendent alkenyl groups. A polyalkenyl can be a dialkenyl, having two alkenyl groups. A polyalkenyl can have more than two alkenyl groups such as from three to six alkenyl groups. A polyalkenyl can comprise a single type of polyalkenyl, can be a combination of polyalkenyls having the same alkenyl functionality, or can be a combination of polyalkenyls having different alkenyl functionalities.

A "polyalkenyl prepolymer" refers to a polyalkenyl having at least one repeating subunits in the polyalkenyl backbone. A polyalkenyl prepolymer generally can have a number average molecular weight in the range from 500 Da to 6,000 Da, such as from 500 Da to 4,000 Da, or from 500 Da to 2,000 Da.

A "monomeric polyalkenyl" refers to a polyalkenyl that does not include repeating subunits in the polyalkenyl backbone. A monomeric polyalkenyl generally has a number average molecular weight that is less than that of a polyalkenyl prepolymer. Monomeric polyalkenyls can be difunctional or can have an alkenyl functionality greater than two. A monomeric polyalkenyl can have a molecular weight, for example, less than 1,000 Da, less than 800 Da, less than 600 Da, less than 400 Da, or less than 200 Da.

A "polyalkynyl" refers to a compound having at least two alkynyl groups. The at least two alkynyl groups can be terminal alkynyl groups and such polyalkynyls can be referred to as alkynyl-terminated compounds. Alkynyl groups can also be pendent alkynyl groups. A polyalkynyl can be a dialkynyl, having two alkynyl groups. A polyalkynyl can have more than two alkynyl groups such as from three to six alkynyl groups. A polyalkynyl can comprise a single type of polyalkynyl, can be a combination of polyalkynyls having the same alkynyl functionality, or can be a combination of polyalkynyls having different alkynyl functionalities.

A "polyalkynyl prepolymer" refers to a polyalkynyl having at least one repeating subunit in the polyalkynyl backbone. A polyalkynyl prepolymer generally can have a number average molecular weight in the range from 500 Da to 6,000 Da, such as from 500 Da to 4,000 Da, or from 500 Da to 2,000 Da.

A "monomeric polyalkynyl" refers to a polyalkynyl that does not include repeating subunits in the polyalkynyl backbone. A monomeric polyalkynyl generally has a molecular weight that is less than that of a polyalkynyl prepolymer. Monomeric polyalkynyls can be difunctional or can have an alkynyl functionality greater than two. A monomeric polyalkynyl can have a molecular weight, for example, less than 1,000 Da, less than 800 Da, less than 600 Da, less than 400 Da, or less than 200 Da.

A compound having a thiol functionality, or an alkenyl functionality refers to a compound which has reactive thiol or alkenyl groups, respectively. The reactive thiol or alkenyl groups may be terminal groups bonded to the ends of the molecule, may be bonded to the backbone of the molecule, or the compound may contain thiol or alkenyl groups that are terminal groups and are bonded to the backbone.

"Polythiol polyfunctionalizing agent" refers to a polythiol having, for example, from 3 to 6 terminal thiol groups. A polythiol polyfunctionalizing agent can have a number average molecular weight, for example, less than 1,400 Da, less than 1,200 Da, less than 1,000 Da, less than 800 Da, less than 700 Da, less than 600 Da, less than 500 Da, less than 400 Da, less than 300 Da, or less than 200 Da. Polythiol polyfunctionalizing agents can be represented by the formula B(—V)$_z$, where B$^4$ represents a core of a z-valent polyfunctionalizing agent B(—V)$_z$, z is an integer from 3 to 6; and each —V is a moiety comprising a terminal thiol (—SH) group. A polythiol or a polyalkenyl can be a polythiol polyfunctionalizing agent or a polyalkenyl polyfunctionalizing agent, respectively.

"Prepolymer" refers to oligomers, homopolymers, and copolymers. For thiol-terminated prepolymers, molecular weights are number average molecular weights "Mn" as determined by end group analysis using iodine titration. For prepolymers that are not thiol-terminated, the number average molecular weights are determined by gel permeation chromatography using polystyrene standards. A prepolymer comprises reactive groups capable of reacting with another compound such as a curing agent or crosslinker to form a cured polymer. A prepolymer such as a chain-extended polythioether prepolymer provided by the present disclosure can be combined with a curing agent to provide a curable composition, which can cure to provide a cured polymer network. Prepolymers are liquid at room temperature (23° C.) and atmospheric pressure (760 torr; 101 kPa). A prepolymer includes multiple repeating subunits bonded to each other than can be the same or different. The multiple repeating subunits make up the backbone of the prepolymer.

Reacted alkoxysilanes" or "reacted alkoxysilane composition" refers to the reaction product of an alkoxysilane composition comprising one or more alkoxysilanes in an organic solvent that has been reacted at a temperature up to 100° C. for at least 30 minutes to provide reacted alkoxysilanes. The alkoxysilane composition can further comprise water and/or an organic titanate, an organic zirconate, or a combination thereof.

"SCOD" refers to cure on demand sealants. Cure-on-demand sealants can include free radical polymerizable compositions in which the curing reaction is proceeds in the presence of free radicals. Free radicals can be generated using radiation-activated free radical initiators, thermally-activated free radical initiators, and/or chemically-activated free radical initiators. SCOD sealants can be formulated as Class A, Class B, or Class C sealants as described in the preceding paragraph. A SCOD sealant in which the free radical curing reaction is initiated upon exposure to visible light, UV, or radiation is referred to as a UV SCOD sealant.

"Sealant composition" refers to a composition that is capable of producing a film that has the ability to resist atmospheric conditions, such as moisture and temperature and at least partially block the transmission of materials, such as water, fuel, and other liquid and gasses. A sealant composition of the present disclosure can be useful, e.g., as aerospace sealants and linings for fuel tanks.

"Substituted" refers to a group in which one or more hydrogen atoms are each independently replaced with the same or different substituent(s). A substituent can comprise halogen, —S(O)$_2$OH, —S(O)$_2$, —SH, —SR where R is C$_{1-6}$ alkyl, —COOH, —NO$_2$, —NR$_2$ where each R is independently hydrogen or C$_{1-3}$ alkyl, —CN, =O, C$_{1-6}$ alkyl, —CF$_3$, —OH, phenyl, C$_{2-6}$ heteroalkyl, C$_{5-6}$ heteroaryl, C$_{1-6}$ alkoxy, or —C(O)R where R is C$_{1-6}$ alkyl. A substituent can be —OH, —NH$_2$, or C$_{1-3}$ alkyl.

Sulfur-containing prepolymer" refers to a prepolymer in which the repeating unit of the prepolymer backbone comprises sulfur atom such as —S— or —S$_n$— groups. Thiol-terminated prepolymers have reactive thiol groups at the ends of the prepolymer backbone. Prepolymers can have pendent reactive thiol groups extending from the prepolymer backbone. Prepolymers having only thiol-terminal and/or only pendent thiol groups are not encompassed by a sulfur-containing prepolymer.

Sulfur-containing sealant" refers to a sealant composition having a sulfur content, for example, greater than 10 wt %, greater than 15 wt %, greater than 17.5 wt %, greater than 20 wt %, greater than 25 wt %, or greater than 30 wt %, where wt % is based on the total weight of the organic constituents of the sealant composition. Organic constituents of a sealant composition can include polymerizable constituents such as prepolymers, monomers and polyfunctionalizing agents, adhesion promoters, and other organic additives. A sulfur-containing sealant can have a sulfur content, for example, from 10 wt % to 35 wt %, from 10 wt % to 30 wt %, from 10 wt % to 25 wt %, from 10 wt % to 20 wt %, from 12 wt % to 20 wt %, or from 14 wt % to 20 wt %, where wt % is based on the total weight of the sealant composition. Sealant compositions having a high sulfur content can be more resistant to fluids and solvents.

When reference is made to a chemical group defined, for example, by a number of carbon atoms, the chemical group is intended to include all sub-ranges of carbon atoms as well as a specific number of carbon atoms. For example, a C$_{2-10}$ alkanediyl includes a C$_{2-4}$ alkanediyl, C$_5$ alkanediyl, and other sub-ranges, such as a C$_2$ alkanediyl, a C$_6$ alkanediyl, and alkanediyls having other specific number(s) of carbon atoms from 2 to 10.

A polyfunctionalizing agent can have the structure of Formula (1):

$$B(—V)_z \qquad (1)$$

where B is the core of the polyfunctionalizing agent, each V is a moiety terminated in a reactive functional group such as a thiol group, an alkenyl group, an alkynyl group, an epoxy group, an isocyanate group, or a Michael acceptor group, and z is an integer from 3 to 6, such as 3, 4, 5, or 6. In polyfunctionalizing agents of Formula (1), each —V can have the structure, for example, —R—SH or —R—CH=CH$_2$, where R can be, for example, C$_{2-10}$ alkanediyl, C$_{2-10}$ heteroalkanediyl, substituted C$_{2-10}$ alkanediyl, or substituted C$_{2-10}$ heteroalkanediyl.

When the moiety V is reacted with another compound the moiety —V$^1$— results and is said to be derived from the reaction with the other compound. For example, when V is —R—CH=CH$_2$ and is reacted, for example, with a thiol group, the moiety V$^1$ is —R—CH$_2$—CH$_2$— is derived from the reaction.

In polyfunctionalizing agents of Formula (1), B can be, for example C$_{2-8}$ alkane-triyl, C$_{2-8}$ heteroalkane-triyl, C$_{5-8}$ cycloalkane-triyl, C$_{5-8}$ heterocycloalkane-triyl, substituted C$_{5-8}$ cycloalkene-triyl, C$_{5-8}$ heterocycloalkane-triyl, C$_6$ arene-triyl, C$_{4-5}$ heteroarene-triyl, substituted C$_6$ arene-triyl, or substituted C$_{4-5}$ heteroarene-triyl.

In polyfunctionalizing agents of Formula (1), B can be, for example, C$_{2-8}$ alkane-tetrayl, C$_{2-8}$ heteroalkane-tetrayl, C$_{5-10}$ cycloalkane-tetrayl, C$_{5-10}$ heterocycloalkane-tetrayl, C$_{6-10}$ arene-tetrayl, C$_4$ heteroarene-tetrayl, substituted C$_{2-8}$ alkane-tetrayl, substituted $C_{2-8}$ heteroalkane-tetrayl, substituted $C_{5-10}$ cycloalkane-tetrayl, substituted $C_{5-10}$ heterocycloalkane-tetrayl, substituted $C_{6-10}$ arene-tetrayl, and substituted $C_{4-10}$ heteroarene-tetrayl.

Examples of suitable alkenyl-terminated polyfunctionalizing agents include triallyl cyanurate (TAC), triallylisocyanurate (TAIC), 1,3,5-triallyl-1,3,5-triazinane-2,4,6-trione1, 3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, and combinations of any of the foregoing.

A polyfunctionalizing agent of Formula (1) can be thiol terminated.

Examples of suitable trifunctional thiol-terminated polyfunctionalizing agents include, for example, 1,2,3-propanetrithiol, 1,2,3-benzenetrithiol, heptane-1,3-7-trithiol, 1,3,5-triazine-2,4-6-trithiol, isocyanurate-containing trithiols, and combinations thereof, as disclosed in U.S. Application Publication No. 2010/0010133, and the polythiols described in U.S. Pat. Nos. 4,366,307; 4,609,762; and 5,225,472. Combinations of polyfunctionalizing agents may also be used.

Examples of suitable polythiol polyfunctionalizing agents include pentaerythritol tetra(3-mercapto-propionate) (PETMP), trimethylol-propane tri(3-mercaptopropionate) (TMPMP), tris[2-(3-mercapto-propionyloxy)ethyl]isocyanurate (TEMPIC), di-pentaerythritol hexa(3-mercaptopropionate) (di-PETMP), tri(3-mercaptopropionate) pentaerythritol, triethylolethane tri-(3-mercaptopropionate), and combinations of any of the foregoing.

Examples of suitable mercapto-acetate polythiol polyfunctionalizing agents include pentaerythritol tetramercaptoacetate (PRTMA), trimethylolpropane trimercaptoacetate (TMPMA), di-trimethylolpropane tetramercaptoacetate, and combinations of any of the foregoing.

Examples of suitable polythiol polyfunctionalizing agents include, tris[2-(3-mercaptopropionyloxy)ethyl]isocyanurate, 2,3-di(2-mercaptoethylthio)-1-propane-thiol, and combinations of any of the foregoing.

Other examples of polythiol polyfunctionalizing agents and polythiol monomers include pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, and also alkoxylated, for example, ethoxylated and/or propoxylated, such as ethoxylated, products of these compounds. Examples include, pentaerythritol tetra(3-mercaptopropionate) (PETMP), pentaerythritol tetramercaptoacetate (PETMA), dipentaerythritol tetra(3-mercaptopropionate), dipentaerythritol tetramercaptoacetate, dipentaerythritol penta(3-mercaptopropionate), dipentaerythritol pentamercaptoacetate, dipentaerythritol hexa(3-mercaptopropionate), dipentaerythritol hexamercaptoacetate, ditrimethylolpropane tetra(3-mercaptopropionate), ditrimethylolpropane tetramercaptoacetate, particularly pentaerythritol tetra(3-mercaptopropionate) (PETMP), pentaerythritol tetramercaptoacetate (PETMA), dipentaerythritol hexa(3-mercaptopropionate), dipentaerythritol hexamercaptoacetate, ditrimethylolpropane tetra(3-mercaptopropionate), and ditrimethylolpropane tetramercaptoacetate.

Suitable polythiol polyfunctionalizing agents are commercially available, for example, from Bruno Bock Thiochemicals under the Thiocure® tradename.

"Derived from a polyfunctionalizing agent" refers to a moiety that results from the reaction of a polyfunctionalizing agent with a reactive functional group. For example, a moiety derived from the polyfunctionalizing agent triallyl cyanurate of Formula (2a):

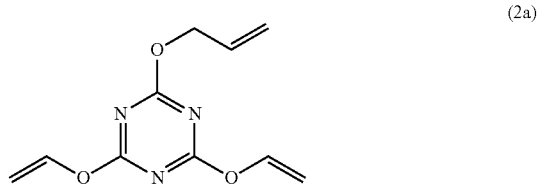 [SMILES: C=CCOc1nc(OC=C)nc(OC=C)n1]

results in a moiety having the structure of Formula (2b):

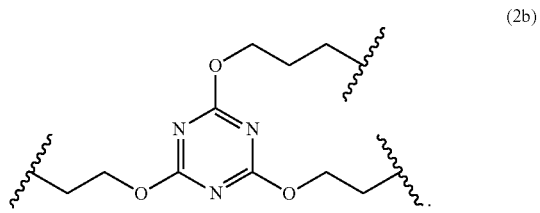 [SMILES: *CCCOc1nc(OCC*)nc(OCC*)n1]

where the segments are bonded to the other reactants.

Reference is now made to certain compounds, compositions, and methods of the present invention. The disclosed compounds, compositions, and methods are not intended to be limiting of the claims. To the contrary, the claims are intended to cover all alternatives, modifications, and equivalents.

Adhesion between metal substrates and an overlying radiation-cured sealant can be enhanced by using an adhesion-promoting layer comprising a combination of organofunctional alkoxysilanes, an organic titanate and/or organic zirconate, and a photoinitiator. An adhesion-promoting layer can be prepared by applying an adhesion-promoting composition to a metal surface and drying the adhesion-promoting composition to remove the solvent. An adhesion-promoting composition can be prepared by heating an adhesion-promoting precursor composition.

Adhesion-promoting precursor compositions, adhesion-promoting compositions, and adhesion-promoting layers can be cured upon exposure to UV or visible radiation and are therefore can be referred to as photocurable adhesion-promoting precursor composition, photocurable adhesion-promoting compositions, and photocurable adhesion-promoting layers.

An adhesion-promoting precursor composition provided by the present disclosure can comprise, for example, an amine-functional alkoxysilane; an alkenyl-functional alkoxysilane; a photoinitiator; and an organic solvent. An adhesion-promoting precursor composition can further comprise a mercapto-functional alkoxysilane, an organic titanate and/or an organic zirconate, and/or water.

An adhesion-promoting precursor composition provided by the present disclosure can comprise, for example, from 1 wt % to 30 wt % of the amine-functional alkoxysilane; from 1 wt % to 30 wt % of the alkenyl-functional alkoxysilane; from 0.1 wt % to 20 wt % of the photoinitiator; and from 30 wt % to 95 wt % of the organic solvent; where wt % is based on the total weight of the adhesion-promoting precursor composition.

An adhesion-promoting precursor composition provided by the present disclosure can comprise, for example, from 5 wt % to 15 wt % of the amine-functional alkoxysilane; from 7 wt % to 17 wt % of the alkenyl-functional alkoxysilane; from 0.5 wt % to 3 wt % of the photoinitiator; and from 65 wt % to 85 wt % of the organic solvent; where wt % is based on the total weight of the adhesion-promoting precursor composition.

An adhesion-promoting precursor composition provided by the present disclosure can comprise, for example, from 0.1 wt % to 10 wt %, such as from 0.5 wt % to 4.5 wt % of a mercapto-functional alkoxysilane, where wt % is based on the total weight of the adhesion-promoting precursor composition. An adhesion-promoting precursor composition provided by the present disclosure can comprise, for example, from 1 wt % to 10 wt %, such as from 2 wt % to 6 wt % of an organic titanate and/or organic zirconate, where wt % is based on the total weight of the adhesion-promoting precursor composition.

An adhesion-promoting precursor composition provided by the present disclosure can comprise, for example, from 1 wt % to 15 wt %, such as from 1 wt % to 9 wt % water, where wt % is based on the total weight of the adhesion-promoting precursor composition.

An adhesion-promoting precursor composition provided by the present disclosure can comprise, for example, from 5 wt % to 15 wt % of an amine-functional alkoxysilane; from 7 wt % to 17 wt % of an alkenyl-functional alkoxysilane; from 0.5 wt % to 4.5 wt % of a mercapto-functional alkoxysilane; from 2.0 wt % to 6.0 wt % of an organic titanate, an organic zirconate, or a combination thereof; from 0.5 wt % to 3.0 wt % of a photoinitiator; from 70 wt % to 80 wt % organic solvent; and from 1 wt % to 9 wt % water, where wt % is based on the total weight of the adhesion-promoting precursor composition.

An adhesion-promoting precursor composition provided by the present disclosure can comprise, for example, from 1 wt % to 10 wt %, such as from 0.5 wt % to 3 wt % of a photosensitizer, where wt % is based on the total weight of the adhesion-promoting precursor composition.

An adhesion-promoting precursor composition provided by the present disclosure can comprise, for example, from 1 wt % to 10 wt %, such as from 0.5 wt % to 3 wt % of a co-initiator, where wt % is based on the total weight of the adhesion-promoting precursor composition.

An adhesion-promoting precursor composition can be used to prepare an adhesion-promoting composing by heating the adhesion-promoting precursor composition for a period of time.

Adhesion-promoting precursor compositions provided by the present disclosure can comprise an amine-functional alkoxysilane or a combination of amine-functional alkoxysilanes.

An amine-functional alkoxysilane can comprise a primary amine group and/or a secondary amine group.

An amine-functional alkoxysilane can comprise a monoamine-functional alkoxysilane, a di-amine-functional alkoxysilane, a tri-amine-functional alkoxysilane, a mono-amine-functional dipodal alkoxysilane, a di-amine-functional dipodal alkoxysilane, a tri-amine-functional dipodal alkoxysilane, or a combination of any of the foregoing.

Examples of suitable monoamine-functional trialkoxysilanes include 4-aminobutyltriethoxysilane, 4-amino-3,3-dimethylbutyltrimethoxysilane, N-(2-aminoethyl)-3-aminopropyltriethoxysilane, 3-aminopropyltrimethoxysilane, 3-aminopropyltriethoxysilane, 11-aminoundecyltriethoxysilane, 2-(4-pyridylethyl)triethoxysilane, and combinations of any of the foregoing.

Examples of suitable monoamine-functional dialkoxysilanes include 4-amino-3,3-dimethylbutylmethyldimethoxysilane, 3-aminopropylmethyldiethoxysilane, and combinations of any of the foregoing.

Examples of suitable monoamine-functional monoalkoxysilanes include 1-amino-2-(dimethylethoxysilyl)propane, 3-aminopropyldiisopropylethoxysilane, 3-aminopropyldimethylethoxysilane, and combinations of any of the foregoing.

Examples of suitable diamine-functional trialkoxysilanes include (aminoethylaminomethyl)phenethyltrimethoxysilane, N-(2-aminoethyl)-3-aminopropyltrimethoxysilane, N-(2-aminoethyl)-3-aminopropyltrimethoxysilane, N-(6-aminohexyl)aminomethyltriethoxysilane, N-(6-aminohexyl)aminopropyltrimethoxysilane, N-(2-aminoethyl)-11-aminoundecyltrimethoxysilane, N-3-[(amino(polypropylenoxy)]aminopropyltrimethoxysilane, N-(2-n-benzylaminoethyl)-3-aminopropyltrimethoxysilane, N-(2-aminoethyl)-3-aminopropylsilanetriol, N-(2-aminoethyl)-3-aminoisobutylmethyldimethoxysilane, N-(2-aminoethyl)-3-aminopropylmethyldiethoxysilane, N-(2-aminoethyl)-3-aminopropylmethyldimethoxysilane.

Suitable diamine functional alkoxysilanes include N-(2-aminoethyl)-3-aminoisobutyldimethylmethoxysilane.

Suitable triamine functional alkoxysilanes include (3-trimethoxysilylpropyl)diethylenetriamine.

Examples of suitable secondary amine-functional alkoxysilanes include 3-(N-allylamino)propyltrimethoxysilane, n-butylaminopropyltrimethoxysilane, t-butylaminopropyltrimethoxysilane, (N-cyclohexylaminomethyl)methyldiethoxysilane, (N-cyclohexylaminomethyl)triethoxysilane, (N-cyclohexylaminopropyl)trimethoxysilane, (3-(N-ethylamino)isobutyl)methyldiethoxysilane, (3-(N-ethylamino)isobutyl)trimethoxysilane, N-methylaminopropylmethyldimethoxysilane, N-methylaminopropyltrimethoxysilane, (phenylaminomethyl)methyldimethoxysilane, 3-(N,N-dimethylaminopropyl)aminopropylmethyldimethoxysilane, and combinations of any of the foregoing.

Examples of suitable dipodal amine-functional alkoxysilanes include 1-[3-(2-aminoethyl)-3-aminoisobutyl]-1,1,3,3,3-pentaethoxy-1,3-disilapropane, bis(methyldiethoxysilylpropyl)amine, bis(3-triethoxysilylpropyl)amine, 1,11-bis(trimethoxysilyl)-4-oxa-8-azaundecan-6-ol, bis(3-trimethoxysilylpropyl)amine, N,N-bis[(3-trimethoxysilyl)propyl]ethylenediamine, N,N-bis[(3-trimethoxysilyl)propyl]ethylenediamine, and combinations of any of the foregoing.

Examples of suitable amine-functional alkoxysilanes include γ-aminopropyltriethoxysilane, γ-aminopropyltrimethoxysilane, and 3-aminopropylmethyldiethoxysilane.

Other examples of suitable amine-functional alkoxysilanes include 3-aminopropyltriethoxysilane, bis(3-triethoxysilyl)propyl]amine, 3-aminopropyltrimethoxysilane, bis(3-trimethoxysilyl)propylamine, 3-aminopropylmethyldiethoxysilane, 3-aminopropylmethyldimethoxysilane, N-(aminoethyl)aminopropyltrimethoxysilane, N-(aminoethyl)aminopropyltriethoxysilane, aminoethylaminopropylmethyldimethoxysilane, diethylenetriaminopropylmethyldimethoxysilane, piperazinylpropylmethyldimethoxysilane, (N-phenylamino)methyltrimethoxysilane, (N-phenylamino)methyltriethoxysilane, 3-(N-phenylamino)propyltrimethoxysilane, diethylaminomethyltriethoxysilane, diethylaminomethylmethyldiethoxysilane, diethylaminopropyltrimethoxysilane, and N-(n-butyl)-3-aminopropyltrimethoxysilane.

Examples of suitable alkenyl-functional alkoxysilanes include vinyltriethoxysilane, vinyltrimethoxysilane, vinyltris-(2-methoxyethoxy)silane, 10-undecenylsilane bis-(γ-trimethoxysilylpropyl)amine, vinyltrisisopropoxysilane, vinyltris(tert-butylperoxy)silane, vinyldimethylethoxysilane, vinylmethyldimethoxysilane, and vinylmethyldiethoxysilane.

Examples of suitable bis(alkoxysilanes) include bis-(γ-trimethoxysilylpropyl)amine, bis[(3-triethoxysilyl)propyl]amine, bis[(3-trimethoxysilyl)propyl]amine, bis(triethoxysilylpropyl)disulfide, bis(triethoxysilylpropyl)tetrasulfide, 1,2-bis(trimethoxysilyl)ethane, and 1,2-bis(triethoxysilyl)ethane.

In general, the adhesive strength of an adhesion-promoting layer can be improved by the use of amine-terminated alkoxysilanes. It is believed that the amine groups, in proximity to reactive organo-functional groups such as thiol and alkenyl groups, partially catalyze the reaction of the organo-functional groups with functional groups of an overlying coating. Also, in general, the adhesive strength of an adhesion-promoting layer provided by the present disclosure is improved with the addition of dipodal amine-functional alkoxysilanes. It is believed that dipodal amine-functional alkoxysilanes create cross-linked networks of condensed alkoxysilanes.

An amine-functional alkoxysilane can comprise a combination of different amine-functional alkoxysilanes.

A combination of amine-functional alkoxysilanes can comprise a monoamine-functional trialkoxysilane such as a gamma-aminoalkyl trialkoxysilane, a diamine functional trialkoxysilane such as N-(2-aminoethyl)-3-alkyl trialkoxysilane, triamine-functional trialkoxysilane, or a combination of any of the foregoing.

A combination of amine-functional alkoxysilanes can comprise amine-functional trialkoxysilanes such as amine-functional trimethoxysilanes, amine-functional triethoxysilanes, and combinations thereof.

A combination of amine functional alkoxysilanes can comprise monoamine-functional trimethoxysilanes, diamine-functional trialkoxysilanes, triamine-functional trialkoxysilanes, or a combination of any of the foregoing.

Examples of suitable diamine-functional trialkoxysilanes include N-(2-aminoethyl)-2-aminopropyltrimethoxysilane, N-(6-aminohexyl)aminomethyltrimethoxysilane, N-(6-aminohexyl)aminopropyltrimethoxysilane, N-(2-aminoethyl)-11-aminoundecyltrimethoxysilane, and N-3-[(amino(polypropylenoxy)]aminopropyltrimethoxysilane.

Examples of suitable triamine-functional trialkoxysilanes include (3-trimethoxysilylpropyl)diethylenetriamine.

An adhesion-promoting precursor composition provided by the present disclosure can comprise a monoamine-functional trialkoxysilane and a diamine-functional trialkoxysilane.

An amine-functional alkoxysilane can comprise, for example, from 65 wt % to 85 wt % of a monoamine-functional trialkoxysilane; and from 15 wt % to 35 wt % of a diamine-functional trialkoxysilane, where wt % is based on the total weight of the amine-functional alkoxysilane in the adhesion-promoting precursor composition.

An amine-functional alkoxysilane can comprise, for example, from 70 wt % to 80 wt % of a monoamine-functional trialkoxysilane; and from 20 wt % to 30 wt % of a diamine-functional trialkoxysilane, wherein wt % is based on the total weight of the amine-functional alkoxysilane in the adhesion-promoting precursor composition.

An amine-functional alkoxysilane can comprise, for example, from 72 wt % to 78 wt % of a monoamine-functional trialkoxysilane; and from 22 wt % to 28 wt % of a diamine-functional trialkoxysilane, wherein wt % is based on the total weight of the amine-functional alkoxysilane in the adhesion-promoting precursor composition.

An adhesion-promoting precursor composition provided by the present disclosure can comprise, for example, from 1 wt % to 30 wt %, from 2 wt % to 20 wt %, from 5 wt % to 15 wt % of an amine-functional alkoxysilane, from 6 wt % to 14 wt %, from 7 wt % to 13 wt %, or from 9 wt % to 12 wt % of an amine-functional alkoxysilane, where wt % is based on the total weight of the adhesion-promoting precursor composition. An adhesion-promoting precursor composition provided by the present disclosure can comprise, for example, greater than 1 wt %, greater than 2 wt %, greater than 5 wt % of an amine-functional alkoxysilane, greater than 7 wt %, greater than 9 wt %, greater than 11 wt %, greater than 13 wt %, greater than 15 wt %, or greater than 20 wt % of an amine-functional alkoxysilane, where wt % is based on the total weight of the adhesion-promoting precursor composition. An adhesion-promoting precursor composition provided by the present disclosure can comprise, for example, less than 30 wt %, less than 20 wt %, less than 15 wt % of an amine-functional alkoxysilane, less than 13 wt %, less than 11 wt %, less than 9 wt %, less than 7 wt %, less than 5 wt %, or less than 2 wt % of an amine-functional alkoxysilane, where wt % is based on the total weight of the adhesion-promoting precursor composition.

Adhesion-promoting precursor compositions provided by the present disclosure can comprise an alkenyl-functional alkoxysilane or a combination of alkenyl-functional alkoxysilanes.

An alkenyl-functional alkoxysilane can comprise, for example, a monoalkenyl-functional alkoxysilane, a dialkenyl-functional alkoxysilane, an alkenyl-functional ketoximino alkoxysilane, a dipodal alkenyl-functional alkoxysilane, or a combination of any of the foregoing.

Examples of suitable alkenyl-functional trialkoxysilanes include 11-allyloxyundecyltrimethoxysilane, m-allylphenylpropyltriethoxysilane, allyltriethoxysilane, [(5-bicyclo[2.2.1]hept-2-enyl)ethyl]trimethoxysilane, (5-bicyclo[2.2.1]hept-2-enyl)triethoxysilane, 3-butenyltriethoxysilane, [2-(3-cyclohexenyl)ethyl]triethoxysilane, (3-cyclopentadienylpropyl)triethoxysilane, 2-(divinylmethylsilyl)ethyltriethoxysilane, docosenyltriethoxysilane, 5-hexenyltrimethoxysilane, 7-octenyltrimethoxysilane, 10-undecenyltrimethoxysilane, vinyltriethoxysilane, vinyltrimethoxysilane, and combinations of any of the foregoing.

Examples of suitable alkenyl-functional dialkoxysilanes include allylmethyldimethoxysilane, (5-bicyclo[2.2.1]hept-2-enyl)methyldiethoxysilane, vinylmethyldiethoxysilane, vinylmethyldimethoxysilane, and combinations of any of the foregoing.

Examples of suitable alkenyl-functional monoalkoxysilanes include (5-bicyclo[2.2.1]hept-2-enyl)dimethylethoxysilane, trivinylmethoxysilane, vinyldimethylethoxysilane, and combinations of any of the foregoing.

Examples of suitable dipodal alkenyl-functional alkoxysilanes include 1,2-bis(methyldiethoxysilyl)ethylene, bis(triethoxysilylethyl)vinylmethylsilane, 1,2-bis(triethoxysilyl)ethylene, 1,1-bis(trimethoxysilylmethyl)ethylene, and combinations of any of the foregoing.

Examples of suitable alkenyl-functional ketoximine alkoxysilanes include vinyltris(methylethylketoximino)silane (Gelest SIV9280).

Examples of suitable alkenyl-functional dipodal alkoxysilanes include Gelest SIB1817.0, 8-bis(triethoxysilyl)octane (Gelest SIB1824.0), Gelest SIB1831.0, and 1,2-bis(trimethoxysilyl)decane (Gelest SIB1829.0), Gelest SIB 1833.0, SIB1834.0, Gelest SIB1142.0, Gelest SIB1824.82, and Gelest SIB1824.5.

Examples of suitable alkenyl-functional alkoxysilanes include methyltris(3-methyoxy propylene glycoxy)silane, vinyltris(3-methoxypropylene glycoxy)silane, and phenyltris(3-methoxypropylene glycoxysilane), Silquest® G-170 silane, and Gelest SIU9048.0 (10-undecenylsilane).

An alkenyl-functional alkoxysilane can comprise an alkenyl-functional ketoximine alkoxysilane such as, for example, vinyltris(methylethylketoximino)silane.

An adhesion-promoting precursor composition can comprise, for example, an alkenyl-functional alkoxysilane that does not comprise a ketoxime group.

An alkenyl-functional alkoxysilane can comprise, for example, from 55 wt % to 75 wt % of an alkenynyl-functional alkoxysilane that does not comprise a ketoxime group, and from 25 wt % to 45 wt % of a vinyl-functional (ketoximino)alkoxysilane, where wt % is based on the total weight of the alkenyl-functional alkoxysilane in the adhesion-promoting precursor composition.

An alkenyl-functional alkoxysilane can comprise from 60 wt % to 70 wt % of an alkenyl-functional alkoxysilane that does not comprise a ketoxime group and from 30 wt % to 40 wt % of a vinyl-functional (ketoximino)alkoxysilane, where wt % is based on the total weight of the alkenyl-functional alkoxysilane in the adhesion-promoting precursor composition.

An adhesion-promoting precursor composition provided by the present disclosure can comprise, for example, from 1 wt % to 30 wt %, from 2 wt % to 20 wt %, from 7 wt % to 17 wt % of an alkenyl-functional alkoxysilane, from 8 wt % to 16 wt %, from 9 wt % to 15 wt %, from 10 wt % to 14 wt %, or from 11 wt % to 13 wt % of an alkenyl-functional alkoxysilane, where wt % is based on the total weight of the adhesion-promoting precursor composition. An adhesion-promoting precursor composition provided by the present disclosure can comprise, for example, greater than 1 wt %, greater than 2 wt %, greater than 7 wt % of an alkenyl-functional alkoxysilane, greater than 9 wt %, greater than 11 wt %, greater than 13 wt %, greater than 15 wt %, or greater than 20 wt % of an alkenyl-functional alkoxysilane, where wt % is based on the total weight of the adhesion-promoting precursor composition. An adhesion-promoting precursor composition provided by the present disclosure can comprise, for example, less than 30 wt %, less than 20 wt %, less than 17 wt % of an alkenyl-functional alkoxysilane, less than 15 wt %, less than 13 wt %, less than 11 wt %, less than 9 wt %, or less than 5 wt % of an alkenyl-functional alkoxysilane, where wt % is based on the total weight of the adhesion-promoting precursor composition.

Adhesion-promoting precursor compositions provided by the present disclosure can comprise a mercapto-functional alkoxysilane or a combination of mercapto-functional alkoxysilanes.

Examples of suitable mercapto-functional trialkoxysilanes include 3-mercaptopropyltriethoxysilane, 3-mercaptopropyltrimethoxysilane, and 11-mercaptoundecylrimethoxysilane.

Examples of suitable mercapto-functional dialkoxysilanes include (mercaptomethyl)methyldiethoxysilane, and 3-mercaptopropylmentyldimehtoxysilane.

A mercapto-functional alkoxysilane can comprise a γ-mercapto-functional alkoxysilane.

An adhesion-promoting precursor composition provided by the present disclosure can comprise, for example, from 0.5 wt % to 4.5 wt % of a mercapto-functional alkoxysilane, from 2 wt % to 4 wt %, or from 2.5 wt % to 3.5 wt % of a mercapto-functional alkoxysilane, where wt % is based on the total weight of the adhesion-promoting precursor composition. An adhesion-promoting precursor composition provided by the present disclosure can comprise, for example, greater than 0.5 wt % of a mercapto-functional alkoxysilane, greater than 1 wt %, greater than 1.5 wt %, greater than 2.5 wt %, or greater than 3.5 wt % of a mercapto-functional alkoxysilane, where wt % is based on the total weight of the adhesion-promoting precursor composition. An adhesion-promoting precursor composition provided by the present disclosure can comprise, for example, less than 4.5 wt % of n mercapto-functional alkoxysilane, less than 3.5 wt %, less than 2.5 wt %, less than 1.5 wt %, or less than 1 wt % of a mercapto-functional alkoxysilane, where wt % is based on the total weight of the adhesion-promoting precursor composition.

Adhesion-promoting precursor compositions provided by the present disclosure can comprise an organic titanate, a combination of organic titanates, an organic zirconate, a combination of organic zirconates, or a combination of any of the foregoing.

An organic titanate can have the structure Ti(—O—R)$_4$, where each R is independently selected from $C_{1-8}$ alkyl or substituted $C_{1-8}$ alkyl. Examples of tetraalkyl titanates include tetraethyl titanate (TET, Ti(OC$_2$H$_5$)$_4$), tetra-n-butyl titanate (T$_n$BT, Ti(OC$_4$H$_9$)$_4$) octylene glycol titanate (OGT, Ti(O$_2$C$_8$H$_{17}$)$_4$), and combinations of any of the foregoing. Tetraalkyl titanates are compatible with water.

An organic titanate compatible in an organic solvent can comprise a chelated organic titanate. Examples of chelated organic titanates compatible in organic solvents include Tyzor® organic titanates available from Dupont de Nemours.

Examples of suitable organic titanates include Tyzor® AA (titanium acetylacetonate), Tyzor® AA-75 (acetylacetonate titanate chelate), Tyzor® AA-65 (acetylacetonate titanate chelate), Tyzor® AA-105 (acetylacetonate titanate chelate), Tyzor® BTP (n-butyl polytitanate), Tyzor® DC (ethyl acetoacetate titanate chelate), Tyzor® ET (ethyl titanate), Tyzor® GBA (titanium acetylacetonate), Tyzor® LA (lactic acid titanate chelate), Tyzor® NPT (titanium tetrapropanolate), Tyzor® OGT (octyleneglycol titanate), Tyzor® TnBT (tetra-n-butyl titanate), Tyzor® TOT (tetrakis(2-ethylhexyl) titanate), Tyzor® TPT-20B (tetraisopropyl titanate), Tyzor® GBO (titanium acetylacetonate), Tyzor® TE (triethanolamine titanate chelate), Tyzor® 131, and combinations of any of the foregoing.

Chelated organic titanates compatible in water can have the structure:

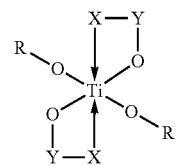

where each R is independently $C_{1-8}$ alkyl or substituted $C_{1-8}$ alkyl, each X is independently an organic group comprising an oxygen or nitrogen atom, and each Y is independently a $C_{1-4}$ alkanediyl. For example, each X can independently be an amino radical or a lactate radical.

Examples of suitable organic titanates include titanium diisopropoxide bis(acetylacetonate), titanium(IV) 2-ethylhexyloxide, and combinations thereof.

Examples of organic titanates compatible with water include triethanolamine titanates such as Tyzor® TE and Tyzor® TEP, alkanolamine titanate such as Tyzor® TA and lactic acid titanates such as Tyzor® LA.

Examples of suitable organic titanates include titanium acetylacetonate, tetra-N-butyl titanate, tetra-isopropyl titanate, tetra-2-ethylhexyl titanate, polybutyl titanate, isopropyl butyl titanate, tetra-N-propyl titanate, tetra-ethyl titanate, tetra-N-propyl titanate, tetra-ethyl titanate, tetra-tert-butyl titanate, and combinations of any of the foregoing.

Other examples of suitable organic titanates include titanium acetylacetonate complex, butyl titanium phosphate, triethanolamine titanate, di-iso-propoxy titanium bis-ethyl acetoacetate, di-iso-butoxy titanium bis-ethyl acetoacetate, alkanolamine titanate complex, titanium ammonium lactate, and combinations of any of the foregoing.

An organic zirconate can have the structure $Zr(-O-R)_4$, where each R can be independently selected from $C_{1-8}$ alkyl or substituted $C_{1-8}$ alkyl. Examples of tetraalkyl zirconates include tetra-N-propyl zirconate and tetra-N-butyl zirconate, and combinations thereof. Tetraalkyl titanates are compatible with water.

An organic zirconate can be compatible with water or with an organic solvent.

An example of an organic zirconate compatible with organic solvents are chelated diethyl citrate zirconate such as Tyzor® ZEC.

Examples of suitable organic zirconates include zirconium lactate, sodium salt, tetra-N-propyl zirconate, and combinations thereof.

Examples of organic zirconates compatible with water include triethanolamine zirconate such as Tyzor® TEAZ and lactic acid chelated zirconates such as Tyzor® LAZ.

Examples of suitable organic zirconates include, for example, ammonium zirconium lactate acetate, triethanolamine zirconate, zirconium lactate, sodium salt, and combinations of any of the foregoing.

Examples of suitable organic zirconates include Tyzor® NPZ (zirconium tetra-N-propanolate), Tyzor® TEAZ (ethanolamine zirconium complex), Tyzor® NBZ (zirconium tetra-N-butanolate), Tyzor® 217 (zirconium lactate), tetra-N-propyl zirconate, tetra-N-butyl zirconate, and combinations of any of the foregoing.

Adhesion-promoting precursor compositions provided by the present disclosure can be prepared by adding an organic titanate, a combination of organic titanates, an organic zirconate, a combination of organic zirconates, or a combination of any of the foregoing to a reacted alkoxysilane composition.

The organic titanates/zirconates can be provided as chelates in a solvent such as isopropanol and water. The solvent content can range, for example, from about 0 wt % to about 30 wt % of the organic titanate/zirconate composition. The active titanate/zirconate content in an adhesion-promoting precursor composition can range, for example, from about 70 wt % to about 100%, the $TiO_2/ZrO_2$ content can range from about 5 wt % to 30 wt %, and the Ti/Zr content can range, for example, from about 5 wt % to 25 wt %, where wt % is based on the total weight of the adhesion-promoting precursor composition.

An adhesion-promoting precursor composition provided by the present disclosure can comprise, for example, from 2.0 wt % to 6 wt % of an organic titanate/zirconate, from 2.5 wt % to 5.5 wt %, or from 3.0 wt % to 5.0 wt % of an organic titanate/zirconate, where wt % is based on the total weight of the adhesion-promoting precursor composition. An adhesion-promoting precursor composition provided by the present disclosure can comprise, for example, greater than 2.0 wt % of an organic titanate/zirconate, greater than 3.0 wt %, greater than 4.0 wt %, or greater than 5.0 wt % of an organic titanate/zirconate, where wt % is based on the total weight of the adhesion-promoting precursor composition. An adhesion-promoting precursor composition provided by the present disclosure can comprise, for example, less than 6.0 wt % of an organic titanate/zirconate, less than 5.0 wt %, less than 4.0 wt %, or less than 2.0 wt % of an organic titanate/zirconate, where wt % is based on the total weight of the adhesion-promoting precursor composition.

An adhesion-promoting precursor composition provided by the present disclosure can comprise a photoinitiator or combination of photoinitiators. A photoinitiator can comprise a visible photoinitiator or a UV photoinitiator as defined herein. A photoinitiator can generate free radicals when exposed to ultraviolet (UV) light (200 nm to 400 nm) including UV-A (320 nm to 400 nm), UV-B (280 nm to 320 nm), and UV-C (200 nm to 280 nm), visible light (400 nm to 770 nm), or blue light (450 nm to 490 nm).

Suitable photoinitiators include, for example, aromatic ketones and synergistic amines, alkyl benzoin ethers, thioxanthones and derivatives, benzyl ketals, acylphosphine oxide, ketoxime ester or α-acyloxime esters, cationic quaternary ammonium salts, acetophenone derivatives, and combinations of any of the foregoing.

Examples of suitable UV photoinitiators include α-hydroxyketones, benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, and bisacyclophosphine oxide.

Examples of suitable benzophenone photoinitiators include 2-hydroxy-2-methyl-1-phenyl-1-propanone, 2-hydroxy-1,4,4-(2-hydroxyethoxy)phenyl]-2-methyl-1-propanone, α-dimethoxy-α-phenylacetophenone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

Examples of suitable oxime photoinitiators include (hydroxyimino)cyclohexane, 1-[4-(phenylthio)phenyl]-octane-1,2-dione-2-(O-benzoyloxime), 1-[9-ethyl-6-(2-methylbenzoyl)-9H-carbazol-3-yl]-ethanone-1-(O-acetyloxime), and trichloromethyl-triazine derivatives).

Examples of suitable phosphine oxide photoinitiators include diphenyl (2,4,6-trimethylbenzoyl)-phosphine oxide (TPO) and phenylbis(2,4,6-trimethyl benzoyl) phosphine oxide (BAPO).

Examples of suitable acetophenone photoinitiators include 2-benzyl-2-(dimethylamino)-4'-morpholinobutyrophenone, 4'-tert-butyl-2',6'-dimethylacetophenone, 2,2-diethoxyacetophenone, 2,2-dimethoxy-2-phenylacetophenone, diphenyl(2,4,6-trimethylbenzyl)phosphine oxide/2-hydroxy-2-methylpropiophenone, 4'-ethoxyacetophenone, 3'-hydroxyacetophenone, 4'-hydroxyacetophenone, 1-hydroxycyclohexyl phenyl ketone, 2-hydroxy-4'-(2-hydroxcyethoxy)-2-methylpropiophenone, 2-hydroxy-2-methylpropiophenone, 2-methyl-4'-(methylthio)-2-morpholinopropiophenone, and 4'-phenoxyacetophenone.

Examples of suitable benzil and benzoin photoinitiators such as benzoin ethyl ether, benzoin methyl ether, 4,4'-dimethoxybenzoin, and 4,4'-dimethyl benzil.

Examples of suitable thioxanthone photoinitiators include 1-chloro-4-propoxy-3H-thioxanthone-9-one, 2-chlorothioxanthen-9-one, 2,4-diethyl-9H-thioxanthen-9-one, isopropyl-9H-thioxanthen-9-one, 10-methylphenothiazine, and thioxanthen-9-one.

Other examples of suitable photoinitiators include 2-hydroxy-2-methyl propiophenone, 2-2-hydroxy-4'-(2-hydroxyethoxy)-2-methyl propiophenone, 1-hydroxycyclohexyphenyl ketone, methylbenzoyl formate, diphenyl (2,4,6-trimethylbenzoyl)-phosphine oxide, phosphine oxide, phenyl bis (2,4,6-trimethyl benzoyl), 2-methyl-1-[4-(methylthio)phenyl]-2-(4-morpholinyl)-1-propanone, 2-benzyl-2-(dimethylamino)-1-[4-(4-morpholinyl) phenyl]-1-butanone, 2-dimethylamino-2-(4-methyl-benzyl)-1-(4-morpholin-4-yl-phenyl)-butan-1-one, bis(5-2,4-cyclopentadien-1-yl)-bis (2,6-difluoro-3-(1H-pyrrol-1-yl)-phenyl)titanium, 2-isopropyl thioxanthone, 2-ethyl anthraquinone, 2,4-diethyl thioxanthone, benzil dimethyl ketal, benzophenone, 4-chloro benzophenone, methyl-2-benzoylbenzoate, 4-phenyl benzophenone, 2,2'-bis(2-chlorophenyl)-4,4',5,5'-tetraphenyl-1,2'-bi-imidazole, 2,2',4-tris(2-chlorophenyl)-5-(3,4-dimethoxyphenyl)-4'5'-diphenyl-1,1'-biimidazole, 4-phenoxy-2,'2'-dichloro acetophenone, ethyl-4-(dimethylamino)benzoate, isoamyl-4-(dimethylamino)benzoate, 2-ethyl hexyl-4-(dimethylamino) benzoate, 4,4'-bis(diethylamino) benzophenone (Michler's ethyl ketone), 4-(4'-methylphenylthio)-benzophenone, 1,7-bis(9-acridinyl)heptane, and N-phenyl glycine.

Examples of suitable UV photoinitiators include the Irgacure® products from BASF or Ciba, such as Irgacure® 184, Irgacure® 500, Irgacure® 1173, Irgacure® 2959, Irgacure® 745, Irgacure® 651, Irgacure® 369, Irgacure® 907, Irgacure® 1000, Irgacure® 1300, Irgacure® 819, Irgacure® 819DW, Irgacure® 2022, Irgacure® 2100, Irgacure® 784, Irgacure® 250; Irgacure® MBF, Darocur® 1173, Darocur® TPO, Darocur® 4265, and combinations of any of the foregoing.

A UV photoinitiator can comprise, for example, 2,2-dimethoxy-1,2-diphenylethan-1-one (Irgacure® 651, Ciba Specialty Chemicals), 2,4,6-trimethylbenzoyl-diphenylphosphineoxide (Darocur® TPO, Ciba Specialty Chemicals), or a combination thereof.

Other examples of suitable photoinitiators include Darocur® TPO (available from Ciba Specialty Chemicals), Lucirin® TPO (available from BASF), Speedcure® TPO (available from Lambson), Irgacure® TPO (available from Ciba Specialty Chemicals, and Omnirad® (available from IGM Resins), and combinations of any the foregoing.

Adhesion promoting precursor compositions provided by the present disclosure can comprise, for example, from 0.1 wt % to 20 wt %, from 0.2 wt % to 10 wt %, from 0.5 wt % to 3.0 wt % of a photoinitiator, from 1.0 wt % to 2.5 wt %, or from 1.5 wt % to 2.0 wt % of a photoinitiator, where wt % is based on the total weight of the adhesion-promoting precursor composition. An adhesion-promoting precursor composition provided by the present disclosure can comprise, for example, greater than 0.1 wt %, greater than 2 wt %, greater than 0.5 wt % of a photoinitiator, greater than 1.0 wt %, greater than 1.5 wt %, greater than 2.0 wt %, greater than 2.5 wt %, greater than 5 wt % or greater than 10 wt % of a photoinitiator, where wt % is based on the total weight of the adhesion-promoting precursor composition. An adhesion-promoting precursor composition provided by the present disclosure can comprise, for example, less than 20 wt %, less than 10 wt %, less than 5 wt %, less than 3.0 wt % of a photoinitiator, less than 2.5 wt %, less than 2.0 wt %, less than 1.5 wt %, or less than 1.0 wt % of a photoinitiator, where wt % is based on the total weight of the adhesion-promoting precursor composition.

Adhesion-promoting precursor compositions provided by the present disclosure can comprise an organic solvent or a combination of organic solvents.

An organic solvent can comprise an alcohol, a glycol ether, or a combination thereof.

Examples of suitable alcohols include methanol, n-propanol, isopropanol, n-butanol, butan-2-ol, 2-methylpropan-1-ol, pentan-2-ol, 3-methylbutan-1-ol, 2-methylbutan-1-ol, pentan-3-ol, and combinations of any of the foregoing. The alcohol can be isopropanol.

Examples of suitable glycol ethers include diethylene glycol ethyl ethers, diethylene glycol methyl ether, diethylene glycol n-butyl ether, diethylene glycol hexyl ether, diethylene glycol n-butyl ether acetate, ethylene glycol propyl ether, ethylene glycol n-butyl ether, ethylene glycol hexyl ether, ethylene glycol n-butyl ether acetate, triethylene glycol methyl ether, triethylene glycol ethyl ether, triethylene glycol n-butyl ether, ethylene glycol phenyl ether, ethylene glycol n-butyl phenyl ether, and a combination of any of the foregoing.

A suitable glycol ether can comprise propylene glycol methyl ether.

An organic solvent can comprise, for example, isopropanol, propylene glycol methyl ether, or a combination thereof.

An organic solvent can include other suitable solvents such as, for example, methyl ethyl ketone and ethyl acetate.

The use of an organic solvent such as alcohol or glycol and the low solids content, such as a solids content of less than 10 wt % or less than 5 wt %, of the alkoxysilane composition can be important in maintaining an equilibrium of the reacted alkoxysilanes and thereby increase the shelf life of a reacted adhesion-promoting precursor composition. An organic solvent such as an alcoholic or glycolytic solvent, following application to a surface, can also dry rapidly at 25° C./50% RH. For practical application, it is also important that the film of the adhesion-promoting precursor composition be applied with a homogeneous thickness such that the adhesive properties are consistent across the surface of a part. Both thick and thin regions can lead to variable adhesive strength across a surface. The balance of solids content and the chemical nature of the adhesion-promoting precursor composition are believed to contribute to the homogeneity of the dried surface film. Furthermore, it is also believed that the drying time of the applied thin film can affect the adhesive strength of the adhesion-promoting layer. For example, it is believed that some migration of the alkoxysilanes over a surface facilitates reaction of the alkoxysilanes with surface functional groups and thereby improves adhesive strength. It is believed that rapid drying may restrict surface migration and thereby inhibit development of full adhesive strength and that extended drying times may either have no effect on adhesive strength or may facilitate formation of in-plane condensed alkoxysilane gels and inhomogeneous films in contrast to facilitating bonding with surface reactive groups.

Adhesion promoting precursor compositions provided by the present disclosure can comprise, for example, from 30 wt % to 95 wt %, from 40 wt % to 90 wt %, from 60 wt % to 85 wt %, from 70 wt % to 80 wt % of an organic solvent, from 72 wt % to 78 wt %, or from 74 wt % to 76 wt % of an organic solvent, where wt % is based on the total weight of the adhesion-promoting precursor composition. An adhesion-promoting precursor composition provided by the present disclosure can comprise, for example, greater than 30 wt %, greater than 50 wt %, greater than 60 wt %, greater than 70 wt % of an organic solvent, greater than 72 wt %, greater than 74 wt %, greater than 76 wt %, greater than 78 wt %, or greater than 85 wt % of an organic solvent, where wt % is based on the total weight of the adhesion-promoting precursor composition. An adhesion-promoting precursor composition provided by the present disclosure can comprise, for example, less than 95 wt %, less than 90 wt %, less than 80 wt % of an organic solvent, less than 78 wt %, less than 76 wt %, less than 74 wt %, less than 72 wt % less than 60 wt %, or less than 50 wt % of an organic solvent, where wt % is based on the total weight of the adhesion-promoting precursor composition.

Adhesion promoting precursor compositions provided by the present disclosure can comprise, for example, from 1 wt % to 9 wt % water, from 2 wt % to 8 wt %, from 3 wt % to 7 wt %, or from 4 wt % to 6 wt % water, where wt % is based on the total weight of the adhesion-promoting precursor composition. An adhesion-promoting precursor composition provided by the present disclosure can comprise, for example, greater than 1 wt % water, greater than 3 wt %, greater than 5 wt %, or greater than 7 wt % water, where wt % is based on the total weight of the adhesion-promoting precursor composition. An adhesion-promoting precursor composition provided by the present disclosure can comprise, for example, less than 9 wt % water, less than 7 wt %, less than 5 wt %, or less than 3 wt % water, where wt % is based on the total weight of the adhesion-promoting precursor composition.

Adhesion-promoting precursor compositions provided by the present disclosure can comprise a photosensitizer or combination of photosensitizers.

Upon exposure to radiation, a photosensitizer can absorb the radiation and transfer energy to a photoinitiator resulting in free radical formation. Suitable photosensitizers include photo-reducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes. Photosensitizers include Type II photoinitiators.

Examples of suitable photosensitizers include 2,4,6-tri-(fluorophenyl)pyrylium tetrafluoroborate, 9,10, antrhacenedicarbonitrile, 2,4,6,-tris(4-methoxyphenyl)pyrylium tetrafluoroborate, and 2-isopropylthioxanthone. Photosensitizers are available from IGM Resins.

Adhesion promoting precursor compositions provided by the present disclosure can comprise, for example, from 0.5 wt % to 3.0 wt % of a photosensitizer, from 1.0 wt % to 2.5 wt %, or from 1.5 wt % to 2.0 wt % of a photosensitizer, where wt % is based on the total weight of the adhesion-promoting precursor composition. An adhesion-promoting precursor composition provided by the present disclosure can comprise, for example, greater than 0.5 wt % of a photosensitizer, greater than 1.0 wt %, greater than 1.5 wt %, greater than 2.0 wt %, or greater than 2.5 wt % of a photosensitizer, where wt % is based on the total weight of the adhesion-promoting precursor composition. An adhesion-promoting precursor composition provided by the present disclosure can comprise, for example, less than 3.0 wt % of a photosensitizer, less than 2.5 wt %, less than 2.0 wt %, less than 1.5 wt %, or less than 1.0 wt % of a photosensitizer, where wt % is based on the total weight of the adhesion-promoting precursor composition.

Adhesion-promoting precursor compositions provided by the present disclosure can comprise a co-initiator or combination of co-initiators.

Examples of suitable co-initiators include tertiary aliphatic amines such as methyldiethanolamine, dimethyl ethanolamine, triethanolamine, p-tolyldiethanolamine, triethylamine and N-methylmorpholine; aromatic amines such as amylparadimethylaminobenzoate, 2,2'-(4-methylphenylimino)diethanol, 2-n-butoxyethyl-4-(dimethylamino)benzoate, 2-(dimethylamino)ethylbenzoate, ethyl-4-(dimethylamino)benzoate, and 2-ethylhexyl-4-(dimethylamino)benzoate; (meth)acrylated amines such as dialkylamino alkyl(meth)acrylates such as diethylaminoethylacrylate or N-morpholinoalkyl-(meth)acrylates such as N-morpholinoethyl-acrylate; and amides or ureas.

Amine photochemical co-initiators include tertiary amines such as 4,4'-bis(diethylamino)benzophenone, 4-(diethylamino)benzophenone, 2-(diethylamino)ethyl acrylate, 2-(diethylaminoethyl) methacrylate, 4-(dimethylamino)benzophenone, 2-(dimethylamino)ethyl acrylate, 2-(dimethylamino)ethyl methacrylate, 3-(dimethylamino)propyl acrylate, ethyl 4-(dimethylamino)benzoate, 2-ethylhexyl 4-(dimethylamino)benzoate, and Michler's ketone.

An adhesion promoting precursor composition provided by the present disclosure can comprise, for example, from 0.5 wt % to 3.0 wt % of a co-initiator, from 1.0 wt % to 2.5 wt %, or from 1.5 wt % to 2.0 wt % of a co-initiator, where wt % is based on the total weight of the adhesion-promoting precursor composition. An adhesion-promoting precursor composition provided by the present disclosure can comprise, for example, greater than 0.5 wt % of a co-initiator, greater than 1.0 wt %, greater than 1.5 wt %, greater than 2.0 wt %, or greater than 2.5 wt % of a co-initiator, where wt % is based on the total weight of the adhesion-promoting precursor composition. An adhesion-promoting precursor composition provided by the present disclosure can comprise, for example, less than 3.0 wt % of a co-initiator, less than 2.5 wt %, less than 2.0 wt %, less than 1.5 wt %, or less than 1.0 wt % of a co-initiator, where wt % is based on the total weight of the adhesion-promoting precursor composition.

An adhesion-promoting composition provided by the present disclosure can comprise a colorant or a combination of colorants such as pigments, dyes, or a combination thereof.

A pigment and/or dye can be included in an adhesion-promoting composition to facilitate the ability of an operator to visually inspect a surface to determine, for example, whether an adhesion-promoting composition has been applied to a surface and/or whether a sufficient amount of an adhesion-promoting composition has been applied to a surface. In this way, an operator can determine whether a homogeneous layer of an adhesion-promoting composition has been uniformly applied across the surface before applying an overlying sulfur-containing sealant.

Examples of suitable inorganic pigments include metal-containing inorganic pigments such as those containing cadmium, carbon, chromium, cobalt, copper, iron oxide, lead, mercury, titanium, tungsten, and zinc. Suitable examples further include ultramarine blue, ultramarine violet, reduced tungsten oxide, cobalt aluminate, cobalt phosphate, manganese ammonium pyrophosphate and/or metal-free inorganic pigments. An inorganic pigment can comprise nanoparticles such as ultramarine blue, ultramarine violet, Prussian blue, cobalt blue and/or reduced tungsten oxide nanoparticles. Examples of suitable organic pigments include indanthrone, quinacridone, phthalocyanine blue, copper phthalocyanine blue, and perylene anthraquinone.

Additional examples of suitable pigments include iron oxide pigments, in all shades of yellow, brown, red and black; in all their physical forms and grain categories; titanium oxide pigments in all the different inorganic surface treatments; chromium oxide pigments also co-precipitated with nickel and nickel titanates; black pigments from organic combustion (e.g., carbon black); blue and green pigments derived from copper phthalocyanine, also chlorinated and brominated, in the various α, β and ε crystalline forms; yellow pigments derived from lead sulfochromate; yellow pigments derived from lead bismuth vanadate; orange pigments derived from lead sulfochromate molybdate; yellow pigments of an organic nature based on arylamides; orange pigments of an organic nature based on naphthol; orange pigments of an organic nature based on diketo-pyrrolo-pyrrole; red pigments based on manganese salts of azo dyes; red pigments based on manganese salts of β-oxynaphthoic acid; red organic quinacridone pigments; and red organic anthraquinone pigments.

Examples of suitable dyes include acridines, anthraquinones, arylmethane dyes, azo dyes, phthalocyanine dyes, quinone-imine dyes including azin dyes, indamins, indophenyls, oxazins, oxazones, and thiazines, thiazole dyes, saffranin dyes, xanthene dyes including fluorene dyes. Examples of suitable dyes include Alcian blue, Alcian yellow, Alizarin, Alizarin red, Alizarin yellow, Azophloxin, Bismarck brown R, Bismarck brown Y, Brilliant cresyl blue, Chrysoidine R, Crisoidine Y, Congo red, Crystal violet, Ethyl green, Fuchsin acid, Gentian violet, Janus green, Lissamine fast yellow, Malachite green, Martius yellow, Meldola blue, Metanil yellow, Methyl orange, Methyl red, Naphthalene black, Naphthol green, Naphthol yellow, Orange G, Purpurin, Rose bengal, Sudan II, Titan yellow, Tropaeolin O, Tropaeolin OO, Tropaeolin OOO, Victoria blue, and Xylene cyanol.

The amount of dye or pigment added to an adhesion-promoting precursor composition can bean amount sufficient to facilitate visual inspection and not compromise the ability of the adhesion-promoting layer to provide desired adhesion. For example, an adhesion-promoting precursor composition provided by the present disclosure can comprise less than 2 wt % of a colorant, less than 1 wt %, less than 0.5 wt %, or less than 0.1 wt % of a colorant, where wt % is based on the total weight of the adhesion-promoting precursor composition.

An adhesion-promoting composition provided by the present disclosure can comprise a photochromic material or a combination of photochromic materials.

A photochromic material can be a reversible photochromic material or a non-reversible photochromic material. A photochromic material can be a thermally reversible photochromic material or a thermally non-reversible photochromic material.

A photochromic material can be a compound that is activated by absorbing actinic radiation having a particular wavelength, such as UV radiation, which causes a change in a feature of the photochromic material. A feature change is an identifiable change in a feature of the photochromic material which can be detected using an instrument or visually. Examples of feature changes include a change of color or color intensity and a change in structure or other interactions with energy in the visible UV, infrared (IR), near IR or far IR portions of the electromagnetic spectrum such as absorption and/or reflectance. A color change at visible wavelengths refers to a color change at wavelengths within a range from 400 nm to 800 nm.

A photochromic material can be activated by absorbing radiation energy (visible and non-visible light) having a particular wavelength, such as UV light, to undergo a feature change such as a color change. The feature change can be a change of feature of the photochromic material alone or it can be a change of feature of a coreactive composition. Examples of suitable photochromic materials include spiropyrans, spiropyrimidines, spirooxazines, diarylethenes, photochromic quinones, azobenzenes, other photochromic dyes and combinations thereof. These photochromic materials can undergo a reversible or irreversible feature change when exposed to radiation where the first and second states can be different colors or different intensities of the same color.

For example, an adhesion-promoting precursor composition provided by the present disclosure can comprise up to 2 wt % of a photochromic material, up to 1 wt %, up to 0.5 wt %, or up to 0.1 wt % of a photochromic material, where wt % is based on the total weight of the adhesion-promoting precursor composition.

An adhesion promoting precursor composition and an adhesion-promoting composition provided by the present disclosure is substantially free of an acid capable of catalyzing the hydrolysis reaction of the alkoxysilanes. Substantially free means that the composition comprises less than 0.1 wt %, less than 0.05 wt %, less than 0.01 wt %, less than 0.005 wt %, or less than 0.001% of an acid, where wt % is based on the total weight of an adhesion-promoting precursor composition or adhesion-promoting composition.

An adhesion-promoting precursor composition provided by the present disclosure can comprise, for example, from 5.0 wt % to 15.0 wt % of an amine-functional alkoxysilane; from 5 wt % to 17 wt % of an alkenyl-functional alkoxysilane; from 0.5 wt % to 4.5 wt % of a mercapto-functional alkoxysilane; from 2.0 wt % to 6.0 wt % of an organic titanate, an organic zirconate, or a combination thereof; from 0.5 wt % to 3.0 wt % of a photoinitiator; from 70 wt % to 80 wt % an organic solvent; and from 1 wt % to 9 wt % water, wherein wt % is based on the total weight of the adhesion-promoting precursor composition.

An adhesion-promoting precursor composition provided by the present disclosure can comprise, for example, from 3.0 wt % to 13.0 wt % of an amine-functional alkoxysilane; from 9 wt % to 15 wt % of an alkenyl-functional alkoxysilane; from 1 wt % to 4.0 wt % of a mercapto-functional alkoxysilane; from 2.5 wt % to 5.5 wt % of an organic titanate, an organic zirconate, or a combination thereof; from 1.0 wt % to 2.5 wt % of a photoinitiator; from 72 wt % to 78 wt % an organic solvent; and from 2 wt % to 7 wt % water, wherein wt % is based on the total weight of the adhesion-promoting precursor composition.

An adhesion-promoting precursor composition provided by the present disclosure can comprise, for example, from 5.0 wt % to 11.0 wt % of an amine-functional alkoxysilane; from 10 wt % to 14 wt % of an alkenyl-functional alkoxysilane; from 1.5 wt % to 3.5 wt % of a mercapto-functional alkoxysilane; from 3 wt % to 5 wt % of an organic titanate, an organic zirconate, or a combination thereof; from 1.0 wt % to 2.5 wt % of a photoinitiator; from 74 wt % to 76 wt % an organic solvent; and from 3 wt % to 6 wt % water, wherein wt % is based on the total weight of the adhesion-promoting precursor composition.

An adhesion-promoting precursor composition provided by the present disclosure can further comprise, for example, from 0.5 wt % to 3.0 wt % of a photosensitizer; and from 0.5 wt % to 3.0 wt % of a co-initiator, wherein wt % is based on the total weight of the adhesion-promoting precursor composition.

An adhesion-promoting precursor composition provided by the present disclosure can further comprise, for example, from 1 wt % to 2.5 wt % of a photosensitizer; and from 1 wt % to 2.5 wt % of a co-initiator, wherein wt % is based on the total weight of the adhesion-promoting precursor composition.

An adhesion-promoting precursor composition provided by the present disclosure can further comprise, for example, from 1.5 wt % to 2.0 wt % of a photosensitizer; and from 1.5 wt % to 2.0 wt % of a co-initiator, wherein wt % is based on the total weight of the adhesion-promoting precursor composition.

An adhesion-promoting precursor composition can comprise, for example, from 0.9 equivalents to 1.1 equivalents hydroxyl groups derived from the alcohol and/or water to equivalents alkoxy groups, from 0.95 equivalents to 1.05 equivalents, or from 0.97 equivalents to 1.03 equivalents hydroxyl groups derived from the alcohol and/or water to equivalents alkoxy groups.

An adhesion-promoting precursor composition provided by the present disclosure can substantially consist of, for example, from 5.0 wt % to 15.0 wt % of an amine-functional alkoxysilane; from 5 wt % to 17 wt % of an alkenyl-functional alkoxysilane; from 0.5 wt % to 4.5 wt % of a mercapto-functional alkoxysilane; from 2.0 wt % to 6.0 wt % of an organic titanate, an organic zirconate, or a combination thereof; from 0.5 wt % to 3.0 wt % of a photoinitiator; from 70 wt % to 80 wt % an organic solvent; and from 1 wt % to 9 wt % water, wherein wt % is based on the total weight of the adhesion-promoting precursor composition.

An adhesion-promoting precursor composition provided by the present disclosure can comprise, for example, from 3 wt % to 13 wt % of a monoamine-functional trialkoxysilane, from 3 wt % to 13 wt % of an alkenyl-functional alkoxysilane, from 1 wt % to 4 wt % of a triamine-functional trialkoxysilane, from 50 wt % to 70 wt % of an organic solvent, from 1 wt % to 7 wt % of an organic titanate and/or organic zirconate, from 1 wt % to 4 wt % of a thiol-functional trialkoxysilane, from 1 wt % to 7 wt % of an alkenyl-functional tris-ketoximinosilane, from 2 wt % to 8 wt % water, from 0.5 wt % to 3.5 wt % of a photoinitiator, and from 1 wt % to 7 wt % of a photosensitizer and/or co-initiator.

An adhesion-promoting precursor composition provided by the present disclosure can comprise, for example, from 5 wt % to 11 wt % of a monoamine-functional trialkoxysilane, from 5 wt % to 11 wt % of an alkenyl-functional alkoxysilane, from 1.5 wt % to 3.5 wt % of a triamine-functional trialkoxysilane, from 55 wt % to 65 wt % of an organic solvent, from 2 wt % to 6 wt % of an organic titanate and/or organic zirconate, from 1.5 wt % to 3.5 wt % of a thiol-functional trialkoxysilane, from 2 wt % to 6 wt % of an alkenyl-functional tris-ketoximinosilane, from 3 t % to 7 wt % water, from 1 wt % to 3 wt % of a photoinitiator, and from 2 wt % to 6 wt % of a photosensitizer and/or co-initiator.

An adhesion-promoting precursor composition provided by the present disclosure can comprise, for example, from 7 wt % to 9 wt % of a monoamine-functional trialkoxysilane, from 6 wt % to 9 wt % of an alkenyl-functional alkoxysilane, from 2 wt % to 3 wt % of a triamine-functional trialkoxysilane, from 55 wt % to 65 wt % of an organic solvent, from 3 wt % to 5 wt % of an organic titanate and/or organic zirconate, from 2 wt % to 3 wt % of a thiol-functional trialkoxysilane, from 3 wt % to 5 wt % of an alkenyl-functional tris-ketoximinosilane, from 4 t % to 6 wt % water, from 1 wt % to 3 wt % of a photoinitiator, and from 3 wt % to 5 wt % of a photosensitizer and/or co-initiator.

An adhesion-promoting composition provided by the present disclosure can comprise the product obtained by heating an adhesion-promoting precursor composition provided by the present disclosure to a temperature from 40° C. to 100° C., for example, from 20 hours to 200 hours. After heating, the adhesion-promoting precursor composition can be cooled to 23° C. to form an adhesion-promoting composition of the present disclosure.

The adhesion-promoting precursor composition can be heated to a temperature, for example, from 40° C. to 100° C., from 40° C. to 90° C., from 45° C. to 85° C., from 50° C. to 80° C., from 55° C. to 75° C., or from 60° C. to 70° C., The adhesion-promoting precursor composition can be heated, for example, to a temperature greater than 40° C., greater than 50° C., greater than 60° C., greater than 70° C., greater than 80° C., or greater than 90° C. The adhesion-promoting precursor composition can be heated, for example, to a temperature less than 100° C., less than 90° C., less than 80° C., less than 70° C., less than 60° C., or less than 50° C.

An adhesion-promoting precursor composition can be heated, for example, from 20 hours to 200 hours, from 40 hours to 180 hours, from 60 hours to 160 hours, from 80 hours to 140 hours, or from 100 hours to 120 hours to form an adhesion-promoting composition provided by the present disclosure. An adhesion-promoting precursor composition can be heated, for example, for greater than 20 hours, greater than 60 hours, greater than 100 hours, greater than 140 hours, or greater than 180 hours to form an adhesion-promoting composition provided by the present disclosure. An adhesion-promoting precursor composition can be heated, for example, for less than 200 hours, less than 160 hours, less than 120 hours, less than 80 hours, or less than 40 hours to form an adhesion-promoting composition provided by the present disclosure.

After heating for a period of time, the thermally treated adhesion-promoting precursor composition can be cooled to from 20° C. to 30° C. such as 23° C. to form an adhesion-promoting composition of the present disclosure.

After the adhesion-promoting precursor composition is heated for a period of time to form an adhesion-promoting composition, the adhesion promoting composition can be aged. Aging can comprise heating the adhesion promoting composition at a temperature, for example, from 40° C. to 60° C., or from 30° C. to 50° C. for at least 7 days, such as 9 days, 11 days, 13 days, 15 days, or 17 days to provide an aged adhesion-promoting composition. Aging us done under dark conditions. After aging, the adhesion-promoting composition can be cooled to from 20° C. to 30° C. such as 23° C.

Methods of making a photocurable adhesion-promoting composition provided by the present disclosure comprise heating a photocurable adhesion-promoting precursor composition provided by the present disclosure to a temperature from 40° C. to 100° C., for from 20 hours to 200 hours to form the photocurable adhesion-promoting composition. After heating, the photocurable adhesion-promoting composition can be cooled to a temperature, for example, from 20° C. to 30° C. The cooled adhesion-promoting composition can then be used to prepare an adhesion-promoting layer. After cooling, the adhesion-promoting composition can be aged at elevated temperature for a period of time. For example, the adhesion-promoting composition can be heated to a temperature from 40° C. to 60° C. for at least 24 hours, at least 2 days, at least 4 days, or at least 7 days. The aged adhesion-promoting composition can be cooled to a temperature, for example, from 20° C. to 30° C., and used to prepare an adhesion-promoting layer.

An adhesion-promoting composition provided by the present disclosure comprises substantially the same amounts of the constituents as in the adhesion-promoting precursor composition used to prepare the adhesion-promoting composition. The thermal treatment is expected to at least partially hydrolyze the alkoxysilanes and the organic titanate/zirconate. For example, from 30% to 70%, from 40% to 60%, or from 45% to 55% of the alkoxy groups can be hydrolyzed.

An adhesion-promoting composition provided by the present disclosure can comprise, for example, from 1 wt % to 30 wt % of the amine-functional alkoxysilane; from 1 wt % to 30 wt % of the alkenyl-functional alkoxysilane; from 0.1 wt % to 20 wt % of the photoinitiator; and from 30 wt % to 95 wt % of the organic solvent; wherein wt % is based on the total weight of the adhesion-promoting precursor composition.

An adhesion-promoting composition provided by the present disclosure can comprise, for example, from 5 wt % to 15 wt % of the amine-functional alkoxysilane; from 5 wt % to 20 wt % of the alkenyl-functional alkoxysilane; from 0.5 wt % to 5 wt % of the photoinitiator; and from 60 wt % to 85 wt % of the organic solvent; wherein wt % is based on the total weight of the adhesion-promoting composition.

An adhesion-promoting composition provided by the present disclosure can comprise, for example, from 5.0 wt % to 15.0 wt % of an amine-functional alkoxysilane; from 7 wt % to 17 wt % of an alkenyl-functional alkoxysilane; from 0.5 wt % to 4.5 wt % of a mercapto-functional alkoxysilane; from 2.0 wt % to 6.0 wt % of an organic titanate, an organic zirconate, or a combination thereof; from 0.5 wt % to 3.0 wt % of a photoinitiator; from 70 wt % to 80 wt % an organic solvent; and from 1 wt % to 9 wt % water, wherein wt % is based on the total weight of the adhesion-promoting composition.

For example, an adhesion-promoting composition provided by the present disclosure can consist of, for example, from 5.0 wt % to 15.0 wt % of an amine-functional alkoxysilane; from 7 wt % to 17 wt % of an alkenyl-functional alkoxysilane; from 0.5 wt % to 4.5 wt % of a mercapto-functional alkoxysilane; from 2.0 wt % to 6.0 wt % of an organic titanate, an organic zirconate, or a combination thereof; from 0.5 wt % to 3.0 wt % of a photoinitiator; from 70 wt % to 80 wt % an organic solvent; and from 1 wt % to 9 wt % water, wherein wt % is based on the total weight of the adhesion-promoting composition.

An adhesion-promoting composition provided by the present disclosure can be characterized by a Si-NMR spectrum as substantially shown in FIG. 1.

An adhesion-promoting composition provided by the present disclosure can be characterized by a Si-NMR spectrum having characteristic peaks at about 58 ppm, at about 68 ppm, at about 82 ppm, and at about 108 ppm.

Figure 2:
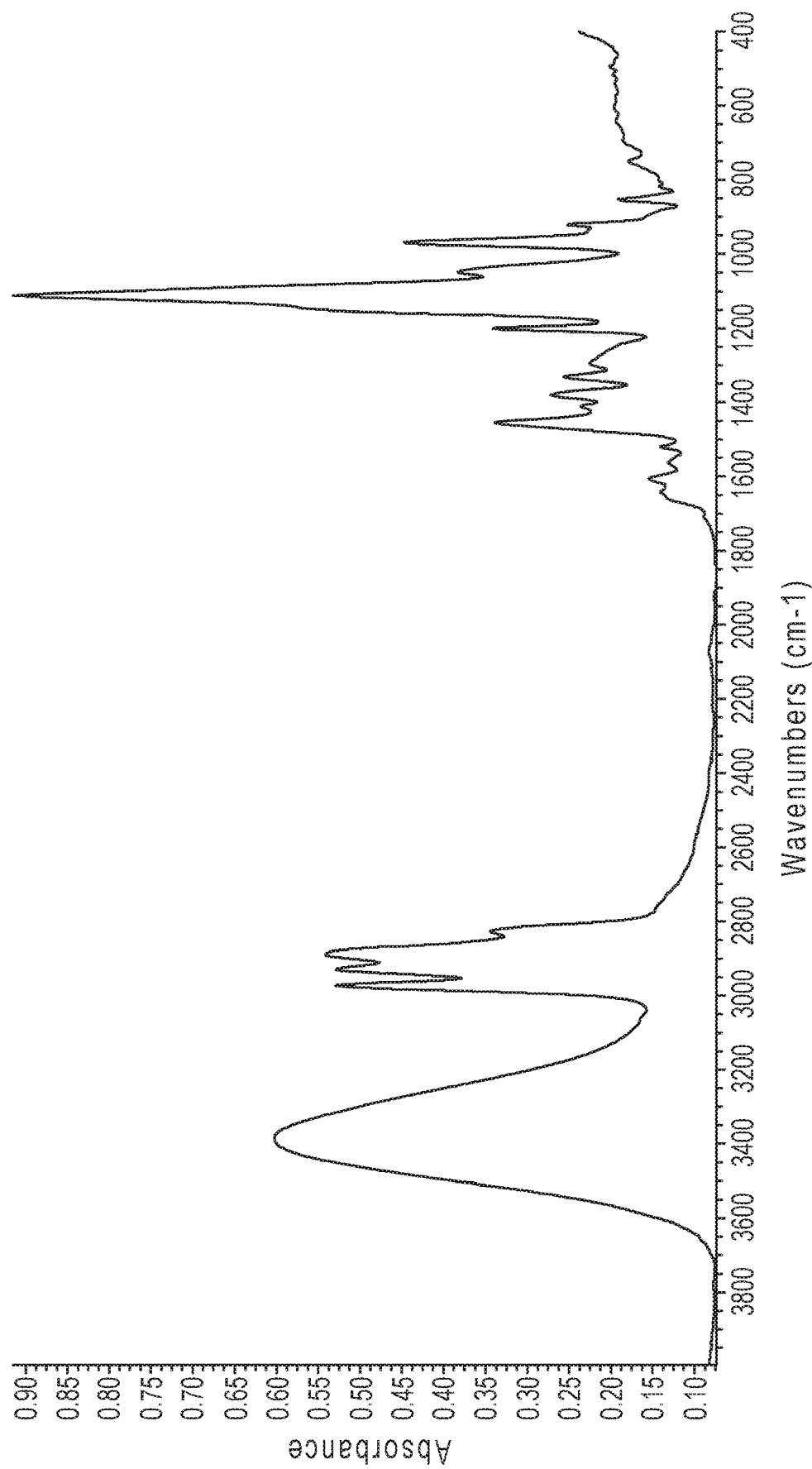
FIG. 2 shows a Fourier transform infrared (FTIR) spectrum of an adhesion-promoting composition provided by the present disclosure.

An adhesion-promoting composition provided by the present disclosure can be characterized by a Fourier transform infrared spectrum as substantially shown in FIG. 2.

An adhesion-promoting composition provided by the present disclosure can be characterized by a Fourier transform infrared spectrum having characteristic peaks at about 3380 nm, from about 2980 nm to 2800 nm, from 1670 nm to 1600 nm, at about 1350 nm, at about 1100 nm and at about 960 nm.

An adhesion-promoting composition provided by the present disclosure can have a viscosity less than 100 cp (0.1 Pa×s) measured using a CAP 2000 viscometer (parallel plate) at 25° C. and at a shear rate of 50 rpm.

An adhesion-promoting composition provided by the present disclosure can exhibit a theoretical density, for example, from 0.7 g/cc to 0.9 g/cc, from 0.72 g/cc to 0.88 g/cc, from 0.74 g/cc to 0.86 g/cc, from 0.76 g/cc to 0.84 g/cc, from 0.78 g/cc to 0.81 g/cc, or at 0.79 g/cc, wherein the theoretical density is based on the density of each of the constituents in the adhesion-promoting composition and the amounts of the respective constituents in the adhesion-promoting composition.

An adhesion-promoting composition can be visually clear and are not visually turbid.

An adhesion-promoting composition can be storage-stable at 25° C. for at least 2 months, at least 3 months, at least 4 months, or for at least 6 months under dark conditions. Storage stability means that the adhesion-promoting composition remains clear, exhibits a viscosity less than 100 centipoise, and is capable of being used for its intended purpose. A clear adhesion-promoting composition is not hazy and does not show visible signs of alkoxysilane condensation. A storage-stable adhesion-promoting composition retains substantially the same optical properties as first formed for at least 2 months under dark conditions. In a storage stable adhesion-promoting composition the alkoxysilanes and the organic titanates and/or organic zirconates remain substantially homogeneously suspended in the solution.

An adhesion-promoting composition provided by the present disclosure can comprise reactive alkenyl groups and/or reactive thiol groups. The reactive alkenyl groups can react, for example, with reactive thiol groups of a compound such as a thiol-terminated prepolymer and/or polythiol of an overlying sealant or coating composition. The reactive thiol groups can react, for example, with reactive alkenyl groups of a compound such as an alkenyl-terminated prepolymer and/or polyalkenyl of an overlying sealant or coating composition. The resulting covalent bonding between alkenyl-functional alkoxysilanes in the adhesion-promoting composition and the overlying sealant can enhance the adhesion strength of a multilayer sealant system.

An adhesion-promoting layer provided by the present disclosure can be derived from an adhesion-promoting composition provided by the present disclosure.

An adhesion-promoting layer can be prepared by applying an adhesion-promoting composition provided by the present disclosure to a substrate and drying the applied adhesion-promoting composition to provide an adhesion-promoting layer. After drying, an adhesion-promoting layer can comprise less than 5 wt % solvent and water, less than 2 wt % solvent and water, less than 1 wt % solvent and water, or less than 0.1 wt % solvent and water, where wt % is based on the total weight of the adhesion-promoting layer.

Drying the applied adhesion-promoting composition can comprise leaving the composition at ambient conditions such as 23° C./50% RH or slightly heating the applied composition at a temperature, for example, of less than 30° C., for a duration sufficient to evaporate at least 95 wt % of the water and organic solvent, such as at least 96 wt %, at least 97 wt %, at least 98 wt %, or at least 99 wt % of the water and organic solvent where wt % is based on the total weight of the water and organic solvent in the adhesion-promoting composition. For example, drying can comprise leaving the applied adhesion-promoting composition at 23° C. for at least 30 min or for at least 60 min.

An adhesion-promoting layer provided by the present disclosure can comprise, for example, from 20 wt % to 40 wt % of an amine-functional alkoxysilane, from 22 wt % to 38 wt %, from 24 wt % to 36 wt %, from 26 wt % to 34 wt %, or from 28 wt % to 32 wt % of an amine-functional alkoxysilane, where wt % is based on the total weight of the adhesion-promoting layer. An adhesion-promoting layer provided by the present disclosure can comprise, for example, greater than 20 wt % of an amine-functional alkoxysilane, greater than 24 wt %, greater than 28 wt %, greater than 32 wt %, or greater than 36 wt % of an amine-functional alkoxysilane, where wt % is based on the total weight of the adhesion-promoting layer. An adhesion-promoting layer provided by the present disclosure can comprise, for example, less than 40 wt % of an amine-functional alkoxysilane, less than 36 wt %, less than 32 wt %, less than 28 wt %, or less than 24 wt % of an amine-functional alkoxysilane, where wt % is based on the total weight of the adhesion-promoting layer.

An adhesion-promoting layer provided by the present disclosure can comprise, for example, from 25 wt % to 45 wt % of an alkenyl-functional alkoxysilane, from 27 wt % to 43 wt %, from 29 wt % to 41 wt %, from 31 wt % to 39 wt %, or from 33 wt % to 37 wt % of an alkenyl-functional alkoxysilane, where wt % is based on the total weight of the adhesion-promoting layer. An adhesion-promoting layer provided by the present disclosure can comprise, for example, greater than 25 wt % of an alkenyl-functional alkoxysilane, greater than 29 wt %, greater than 33 wt %, greater than 37 wt %, or greater than 41 wt % of an alkenyl-functional alkoxysilane, where wt % is based on the total weight of the adhesion-promoting layer. An adhesion-promoting layer provided by the present disclosure can comprise, for example, less than 45 wt % of an alkenyl-functional alkoxysilane, less than 41 wt %, less than 37 wt %, less than 33 wt %, or less than 29 wt % of an alkenyl-functional alkoxysilane, where wt % is based on the total weight of the adhesion-promoting layer.

An adhesion-promoting layer provided by the present disclosure can comprise, for example, from 2.5 wt % to 12.5 wt % of a mercapto-functional alkoxysilane, from 4 wt % to 11 wt %, from 5 wt % to 9 wt %, or from 6 wt % to 8 wt % of a mercapto-functional alkoxysilane, where wt % is based on the total weight of the adhesion-promoting layer. An adhesion-promoting layer provided by the present disclosure can comprise, for example, greater than 2.5 wt % of a mercapto-functional alkoxysilane, greater than 4 wt %, greater than 6 wt %, greater than 8 wt %, or greater than 10 wt % of a mercapto-functional alkoxysilane, where wt % is based on the total weight of the adhesion-promoting layer. An adhesion-promoting layer provided by the present disclosure can comprise, for example, less than 12.5 wt % of a mercapto-functional alkoxysilane, less than 11 wt %, less than 9 wt %, less than 7 wt %, or less than 5 wt % of a mercapto-functional alkoxysilane, where wt % is based on the total weight of the adhesion-promoting layer.

An adhesion-promoting layer provided by the present disclosure can comprise, for example, from 7.5 wt % to 17.5 wt % of an organic titanate/zirconate, from 9 wt % to 16 wt %, from 10 wt % to 15 wt %, or from 11 wt % to 14 wt % of an organic titanate/zirconate, where wt % is based on the total weight of the adhesion-promoting layer. An adhesion-promoting layer provided by the present disclosure can comprise, for example, greater than 7.5 wt % of an organic titanate/zirconate, greater than 9 wt %, greater than 11 wt %, greater than 13 wt %, or greater than 15 wt % of an organic titanate/zirconate, where wt % is based on the total weight of the adhesion-promoting layer. An adhesion-promoting layer provided by the present disclosure can comprise, for example, less than 17.5 wt % of an organic titanate/zirconate less than 16 wt %, less than 14 wt %, less than 12 wt %, or less than 10 wt % of an organic titanate/zirconate where wt % is based on the total weight of the adhesion-promoting layer.

An adhesion-promoting layer provided by the present disclosure can comprise, for example, from 2 wt % to 8 wt % of a photoinitiator, from 3 wt % to 7 wt %, or from 4 wt % to 6 wt % of a photoinitiator, where wt % is based on the total weight of the adhesion-promoting layer. An adhesion-promoting layer provided by the present disclosure can comprise, for example, greater than 2 wt % of a photoinitiator, greater than 3 wt %, greater than 4 wt %, greater than 5 wt %, or greater than 6 wt % of a photoinitiator, where wt % is based on the total weight of the adhesion-promoting layer. An adhesion-promoting layer provided by the present disclosure can comprise, for example, less than 8 wt % of a photoinitiator, less than 7 wt %, less than 6 wt %, less than 5 wt %, or less than 4 wt % of a photoinitiator, where wt % is based on the total weight of the adhesion-promoting layer.

An adhesion promoting layer provided by the present disclosure can comprise, for example, from 20 wt % to 40 wt % of the amine-functional alkoxysilane; from 25 wt % to 45 wt % of the alkenyl-functional alkoxysilane; from 2.5 wt % to 12.5 wt % of the mercapto-functional alkoxysilane; from 7.5 wt % to 17.5 wt % of the organic titanate, an organic zirconate, or a combination thereof; from 2.0 wt % to 8.0 wt % of a photoinitiator; wherein wt % is based on the total weight of the dried adhesion-promoting layer.

An adhesion promoting layer provided by the present disclosure can comprise, for example, from 22 wt % to 38 wt % of the amine-functional alkoxysilane; from 27 wt % to 43 wt % of the alkenyl-functional alkoxysilane; from 3.5 wt % to 11.5 wt % of the mercapto-functional alkoxysilane; from 8.5 wt % to 16.5 wt % of the organic titanate, an organic zirconate, or a combination thereof; from 3.0 wt % to 7.0 wt % of a photoinitiator; wherein wt % is based on the total weight of the dried adhesion-promoting layer.

An adhesion promoting layer provided by the present disclosure can comprise, for example, from 24 wt % to 36 wt % of the amine-functional alkoxysilane; from 29 wt % to 41 wt % of the alkenyl-functional alkoxysilane; from 4.5 wt % to 10.5 wt % of the mercapto-functional alkoxysilane; from 9.5 wt % to 15.5 wt % of the organic titanate, an organic zirconate, or a combination thereof; from 4.0 wt % to 6.0 wt % of a photoinitiator; wherein wt % is based on the total weight of the dried adhesion-promoting layer.

An adhesion promoting layer provided by the present disclosure can further comprise, for example, from 2.0 wt % to 8.0 wt % of the photosensitizer; and from 2.0 wt % to 8.0 wt % of the co-initiator, wherein wt % is based on the total weight of the dried adhesion-promoting layer.

An adhesion promoting layer provided by the present disclosure can further comprise, for example, from 3.0 wt % to 7.0 wt % of the photosensitizer; and from 3.0 wt % to 7.0 wt % of the co-initiator, wherein wt % is based on the total weight of the dried adhesion-promoting layer.

An adhesion promoting layer provided by the present disclosure can further comprise, for example, from 4.0 wt % to 6.0 wt % of the photosensitizer; and from 4.0 wt % to 6.0 wt % of the co-initiator, wherein wt % is based on the total weight of the dried adhesion-promoting layer.

An adhesion-promoting composition provided by the present disclosure are effective, for example, in enhancing the adhesion between a radiation-curable composition and a metal surface such as aluminum and stainless-steel surfaces. A radiation-curable composition can be a coating, a sealant, a potting compounds/encapsulant, or an adhesive.

Multilayer systems provided by the present disclosure comprise (a) an adhesion-promoting layer provided by the present disclosure; and (b) a polymer layer overlying the adhesion-promoting layer, wherein the polymer layer is derived from a radiation-curable composition.

Examples of substrates to which an adhesion-promoting composition may be applied include metals such as titanium, steel alloys, stainless steel, steel alloy, aluminum, and aluminum alloy, tungsten, tungsten alloys, magnesium alloys, copper alloys, nickel, and nickel alloys. A substrate can comprise an aerospace metal. A substrate can comprise a metal substrate of a vehicle such as an automotive vehicle or an aerospace vehicle.

An adhesion-promoting layer provided by the present disclosure can have a thickness, for example, from 1 μm to 40 μm, from 2 μm to 35 μm, from 3 μm to 30 μm, from 4 μm to 25 μm, from 5 μm to 20 μm, or from 10 μm to 15 μm. An adhesion-promoting layer provided by the present disclosure can have a thickness, for example, greater than 1 μm, greater than 5 μm, greater than 10 μm, greater than 10 μm, greater than 15 μm, greater than 20 μm, or greater than 30 μm. An adhesion-promoting layer provided by the present disclosure can have a thickness, for example, less than 40 μm, less than 30 μm, greater than 20 μm, less than 15 μm, greater than 10 μm, or less than 5 μm.

An adhesion-promoting layer provided by the present disclosure can comprise reactive alkenyl groups and optionally, reactive thiol groups. The reactive alkenyl groups can react, for example, with reactive thiol groups of a compound such as a thiol-terminated prepolymer and/or polythiol of an overlying polymer layer. The reactive thiol groups can react, for example, with reactive alkenyl and/or alkynyl groups of a compound such as an alkenyl-terminated and/or alkynyl-terminated prepolymer and/or polyalkenyl of an overlying polymer layer. The resulting covalent bonding between the reactive alkenyl and/or thiol groups in the adhesion-promoting layer and the overlying polymer layer can enhance the adhesion strength of a multilayer system.

An adhesion-promoting composition provided by the present disclosure can be used to enhance the adhesion between a polymer layer such as a coating, sealant, potting compound/encapsulant or adhesive and a metal substrate. Multiplayer systems comprising a radiation curable polymer layer and an underlying adhesion-promoting layer are included within the scope of the present disclosure. An adhesion-promoting composition provided by the present disclosure can be used to promote adhesion between any suitable overlying radiation-curable polymer layer and an underlying metal or metal alloy substrate.

Radiation-curable compositions include compositions based on thiol/alkenyl and/or thiol/alkynyl curing chemistries. The radiation-curable compositions can include thiol-terminated prepolymers, polythiols, alkenyl-terminated prepolymers, polyalkenyls, alkynyl-terminated prepolymers, and/or polyalkynyls. The radiation-curable compositions can include a photoinitiator and can be cured by exposure, for example, to UV and/or visible radiation.

The prepolymers and monomers forming a radiation-curable composition can have suitable backbone as appropriate for a particular application. For example, for sealants, the prepolymers and/or monomers can comprise a sulfur-containing backbone.

For example, a prepolymer backbone can comprise a polythioether, a polysulfide, a polyformal, a polyisocyanate, a polyurea, polycarbonate, polyphenylene sulfide, polyethylene oxide, polystyrene, acrylonitrile-butadiene-styrene, polycarbonate, styrene acrylonitrile, poly(methylmethacrylate), polyvinylchloride, polybutadiene, polybutylene terephthalate, poly(p-phenyleneoxide), polysulfone, polyethersulfone, polyethylenimine, polyphenylsulfone, acrylonitrile styrene acrylate, polyethylene, syndiotactic or isotactic polypropylene, polylactic acid, polyamide, ethyl-vinyl acetate homopolymer or copolymer, polyurethane, copolymers of ethylene, copolymers of propylene, impact copolymers of propylene, polyetheretherketone, polyoxymethylene, syndiotactic polystyrene (SPS), polyphenylene sulfide (PPS), liquid crystalline polymer (LCP), homo- and co-polymers of butene, homo- and copolymers of hexene; and combinations of any of the foregoing.

Examples of other suitable prepolymer backbones include polyolefins (such as polyethylene, linear low density polyethylene (LLDPE), low density polyethylene (LDPE), high density polyethylene, polypropylene, and olefin copolymers), styrene/butadiene rubbers (SBR), styrene/ethylene/butadiene/styrene copolymers (SEBS), butyl rubbers, ethylene/propylene copolymers (EPR), ethylene/propylene/diene monomer copolymers (EPDM), polystyrene (including high impact polystyrene), poly(vinyl acetates), ethylene/vinyl acetate copolymers (EVA), poly(vinyl alcohols), ethylene/vinyl alcohol copolymers (EVOH), poly(vinyl butyral), poly(methyl methacrylate) and other acrylate polymers and copolymers (including such as methyl methacrylate polymers, methacrylate copolymers, polymers derived from one or more acrylates, methacrylates, ethyl acrylates, ethyl methacrylates, butyl acrylates, butyl methacrylates and the like), olefin and styrene copolymers, acrylonitrile/butadiene/styrene (ABS), styrene/acrylonitrile polymers (SAN), styrene/maleic anhydride copolymers, isobutylene/maleic anhydride copolymers, ethylene/acrylic acid copolymers, poly(acrylonitrile), polyamides, polyesters, liquid crystalline polymers (LCPs), poly(lactic acid), poly(phenylene oxide) (PPO), PPO-polyamide alloys, polyetherketone (PEK), polyetheretherketone (PEEK), polyimides, polyoxymethylene (POM) homo- and copolymers, polyetherimides, fluorinated ethylene propylene polymers (FEP), poly(vinyl fluoride), poly(vinylidene fluoride), poly(vinylidene chloride), and poly(vinyl chloride), aramides (such as Kevlar® and Nomex®), polytetrafluoroethylene (PTFE), polysiloxanes (including polydimethylenesiloxane, dimethylsiloxane/vinylmethylsiloxane copolymers, vinyldimethylsiloxane terminated poly(dimethylsiloxane)), elastomers, epoxy polymers, alkyds, cellulosic polymers (such as ethyl cellulose, ethyl hydroxyethyl cellulose, carboxymethyl cellulose, cellulose acetate, cellulose acetate propionates, and cellulose acetate butyrates), polyethers and glycols such as poly(ethylene oxide)s (also known as poly(ethylene glycol)s, poly(propylene oxides) (also known as poly(propylene glycols), and ethylene oxide/propylene oxide copolymers, acrylic latex polymers, polyester acrylate oligomers and polymers, polyester diol diacrylate polymers, and UV-curable resins.

Prepolymers having an elastomeric backbone can also be used. Examples of suitable prepolymers having an elastomeric backbone include polyethers, polybutadienes, fluoroelastomers, perfluoroelastomers, ethylene/acrylic copolymers, ethylene propylene diene terpolymers, nitriles, polythiolamines, polysiloxanes, and combinations of any of the foregoing.

An adhesion-promoting composition provided by the present disclosure can be effective, for example, in enhancing the adhesion between radiation-curable sulfur-containing sealant compositions and metal surfaces such as aluminum and stainless-steel surfaces. Sulfur-containing sealants are useful in applications that require fuel resistance such as vehicular and aerospace applications.

Radiation-curable sulfur-containing sealant compositions are used, for example, in the aerospace industry.

Radiation-curable sulfur-containing sealants can be based on the reaction of polythiols with polyalkenyls and/or polyalkynyls.

Examples of UV-curable sealants based on thiol-ene chemistry are provided in U.S. Pat. No. 7,438,974, U.S. Application Publication No. 2014/0186543, U.S. Application Publication No. 2013/0345372, U.S. Application Publication No. 2013/0284359, U.S. Application Publication No. 2013/0344287, U.S. Application Publication No. 2012/0040104, U.S. Application Publication No. 2014/0040103, and U.S. Application Publication No. 2015/0086726.

Radiation-curable sulfur-containing sealant compositions can comprise a polythiol, a polyalkenyl and/or polyalkynyl, and a free radical initiator.

Sealants provided by the present disclosure can comprise a polythiol or a combination of polythiols; and a polyalkenyl, a combination of polyalkenyls, a polyalkynyl, a combination of polyalkynyls, or a combination of any of the foregoing.

A polythiol, a polyalkenyl, and a polyalkynyl can independently be selected from a prepolymer, an adduct, an oligomer, a monomer, or a combination of any of the foregoing.

A sealant can comprise a sulfur-containing prepolymer such as, for example, a polythioether prepolymer, a polysulfide prepolymer, a sulfur-containing polyformal prepolymer, a monosulfide, or a combination of any of the foregoing. A sulfur-containing prepolymer can comprise a thiol-terminated sulfur-containing prepolymer or an alkenyl-terminated sulfur-containing prepolymer. For example, a thiol-terminated sulfur-containing prepolymer can comprise a thiol-terminated polythioether prepolymer, a thiol-terminated polysulfide prepolymer, a thiol-terminated sulfur-containing polyformal prepolymer, a thiol-terminated monosulfide, or a combination of any of the foregoing.

A sulfur-containing prepolymer can comprise a thiol-terminated polythioether prepolymer or combinations of thiol-terminated polythioether prepolymers. Examples of suitable thiol-terminated polythioether prepolymers are disclosed, for example, in U.S. Pat. No. 6,172,179. A thiol-terminated polythioether prepolymer can comprise Permapol® P3.1E, Permapol® P3.1E-2.8, Permapol® L56086, or a combination of any of the foregoing, each of which is available from PPG Aerospace. These Permapol® products are encompassed by the thiol-terminated polythioether prepolymers of Formula (3)-(3c), (5) and (6) Thiol-terminated polythioethers include prepolymers described in U.S. Pat. No. 7,390,859 and urethane-containing polythiols described in U.S. Application Publication Nos. 2017/0369757 and 2016/0090507.

A thiol-terminated polythioether prepolymer can comprise a thiol-terminated polythioether prepolymer comprising at least one moiety having the structure of Formula (3):

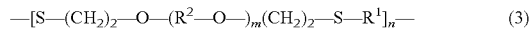 (3)

where, each $R^1$ can independently be selected from $C_{2-10}$ n-alkanediyl, $C_{3-6}$ branched alkanediyl, $C_{6-8}$ cycloalkanediyl, $C_{6-10}$ alkanecycloalkanediyl, and —[(CHR³)$_p$—X—]$_q$(CHR³)$_r$—, wherein each $R^3$ can be selected from hydrogen and methyl;

each $R^2$ can independently be selected from $C_{2-10}$ n-alkanediyl, $C_{3-6}$ branched alkanediyl, $C_{6-8}$ cycloalkanediyl, $C_{6-14}$ alkanecycloalkanediyl, and —[(CH$_2$)$_p$—X—]$_q$(CH$_2$)$_r$—;

each X can independently be selected from O, S, and NR, wherein R can be selected from hydrogen and methyl;

m ranges from 0 to 50;

n can be an integer ranging from 1 to 60;

p can be an integer ranging from 2 to 6;

q can be an integer ranging from 1 to 5; and r can be an integer ranging from 2 to 10.

In moieties of Formula (3), $R^1$ can be —[(CHR³)$_p$—X—]$_q$(CHR³)$_r$— wherein each X can independently be can be selected from O and S.

In moieties of Formula (3), $R^1$ can be —[(CHR³)$_p$—X—]$_q$(CHR³)$_r$—, each X can be O or each X can be S.

In moieties of Formula (3), $R^1$ can be —[(CH$_2$)$_p$—X—]$_q$(CH$_2$)$_r$—, where p can be 2, X can be O, q can be 2, r can be 2, $R^2$ can be ethanediyl, m can be 2, and n can be 9.

In moieties of Formula (3), each $R^1$ can be derived from 1,8-dimercapto-3,6-dioxaoctane (DMDO), each $R^1$ can be derived from dimercaptodiethylsulfide (DMDS), or a combination thereof.

In moieties of Formula (3), each m can independently be an integer from 1 to 3. Each m can be the same and can be 1, 2, or 3.

In moieties of Formula (3), n can be an integer from 1 to 30, an integer from 1 to 20, an integer from 1 to 10, or an integer from 1 to 5. In addition, n may be any integer from 1 to 60.

In moieties of Formula (3), each p can independently be 2, 3, 4, 5, and 6. Each p can be the same and can be 2, 3, 4, 5, or 6.

In moieties of Formula (3), each q can independently be 1, 2, 3, 4, or 5. Each q can be the same and can be 1, 2, 3, 4, or 5.

In moieties of Formula (3), each r can independently be 2, 3, 4, 5, 6, 7, 8, 9, or 10.

In moieties of Formula (3), each r can be the same and can be 2, 3, 4, 5, 6, 7, 8, 9, or 10.

In moieties of Formula (3), each r can independently be an integer from 2 to 4, from 2 to 6, or from 2 to 8.

In moieties of Formula (3), each $R^2$ can independently be selected from a $C_{2-10}$ n-alkanediyl group, a $C_{3-6}$ branched alkanediyl group, and a —[(CH$_2$)$_p$—X—]$_q$(CH$_2$)$_r$— group.

In moieties of Formula (3), each $R^2$ can independently be a $C_{2-10}$ n-alkanediyl group.

In moieties of Formula (3), each $R^2$ can independently comprise a —[(CH$_2$)$_p$—X—]$_q$(CH$_2$)$_r$— group, where each X can be O or S.

Thiol-terminated sulfur-containing prepolymer of Formula (3) can comprise a thiol-terminated polythioether prepolymer or combination of thiol-terminated polythioether prepolymers, where E comprises the backbone of a polythioether prepolymer.

A thiol-terminated polythioether prepolymer can have the structure of Formula (4):

 (4)

wherein, w can be an integer from 1 to 20, and each E can comprise a moiety having the structure of Formula (5):

$$—S—R^1—[S-A-S—R^1—]_nS—\qquad(5)$$

wherein, n can be an integer from 1 to 60;

each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, where, p can be an integer from 2 to 6;

q can be an integer from 1 to 5;

r can be an integer from 2 to 10;

each $R^3$ can independently be selected from hydrogen and methyl; and each X can independently be selected from O, S, S—S, and NR, wherein R can be selected from hydrogen and methyl; and each A can independently be a moiety derived from a polyvinyl ether of Formula (6) and a polyalkenyl polyfunctionalizing agent of Formula (7):

$$CH_2=CH—O—(R^2—O)_m—CH=CH_2 \qquad(6)$$

$$B(—R^{70}—CH=CH_2)_z \qquad(7)$$

wherein, m can be an integer from 0 to 50;

each $R^2$ can independently be selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;

B represents a core of a z-valent, polyalkenyl polyfunctionalizing agent $B(—R^{70}—CH=CH_2)_z$ wherein, z can be an integer from 3 to 6; and each $R^{70}$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In moieties of Formula (5), w can be an integer from 1 to 15, from 1 to 10, or from 1 to 5.

In moieties of Formula (5), w can be an integer greater than 2, greater than 5, or greater than 10.

In moieties of Formula (5), $R^1$ can be $C_{20}$ alkanediyl.

In moieties of Formula (5), $R^1$ can be $—[(CHR^3)_p—X—]_q(CHR^3)—$.

In moieties of Formula (5), X can be selected from O and S, and thus $—[(CHR^3)_p—X—]_q(CHR^3)_r—$ in Formula (5) can be $—[(CHR^3)_p—O—]_q(CHR^3)_r—$ or $—[(CHR^3)_p—S—]_q(CHR^3)_r—$. P and r can be equal, such as where p and r can both be two.

In moieties of Formula (5), $R^1$ can be selected from $C_{2-6}$ alkanediyl and $—[(CHR^3)_p—X—]_q(CHR^3)_r—$.

In moieties of Formula (5), $R^1$ can be $—[(CHR^3)_p—X—]_q(CHR^3)_r—$, and X can be O, or X can be S.

In moieties of Formula (5) where $R^1$ can be $—[(CHR^3)_p—X—]_q(CHR^3)—$, p can be 2, r can be 2, q can be 1, and X can be S; or p can be 2, q can be 2, r can be 2, and X can be O; or p can be 2, r can be 2, q can be 1, and X can be O.

In moieties of Formula (5) where $R^1$ can be $—[(CHR^3)_p—X—]_q(CHR^3)_r—$, each $R^3$ can be hydrogen, or at least one $R^3$ can be methyl.

In moieties of Formula (5), $R^1$ can be $—[(CH_2)_p—X—]_q(CH_2)_r—$ wherein each X can independently be selected from O and S. In polythioethers of Formula (5), $R^1$ can be $—[(CH_2)_p—X—]_q(CH_2)_r—$ each X can be O or each X can be S.

In moieties of Formula (5), $R^1$ can be $—[(CH_2)_p—X—]_q(CH_2)_r—$, where p can be 2, X can be O, q can be 2, r can be 2, $R^2$ can be ethanediyl, m can be 2, and n can be 9.

In moieties of Formula (5), each $R^1$ can be derived from 1,8-dimercapto-3,6-dioxaoctane (DMDO; 2,2-(ethane-1,2-diylbis(sulfanyl))bis(ethan-1-thiol)), or each $R^1$ can be derived from dimercaptodiethylsulfide (DMDS; 2,2'-thiobis (ethan-1-thiol)), and combinations thereof.

In moieties of Formula (5), each p can independently be selected from 2, 3, 4, 5, and 6. Each p can be the same and can be 2, 3, 4, 5, or 6.

In moieties of Formula (5) each q can independently be 1, 2, 3, 4, or 5. Each q can be the same and can be 1, 2, 3, 4, or 5.

In moieties of Formula (5), each r can independently be 2, 3, 4, 5, 6, 7, 8, 9, or 10. Each r can be the same and can be 2, 3, 4, 5, 6, 7, 8, 9, or 10.

In moieties of Formula (5), each r can independently be an integer from 2 to 4, from 2 to 6, or from 2 to 8.

In moieties of Formula (5), each A can be derived from a polyvinyl ether such as a divinyl ether. A divinyl ether can comprise a divinyl ether having the structure of Formula (6).

In divinyl ethers of Formula (6), m can be an integer from 0 to 50, such as from 0 to 40, from 0 to 20, from 0 to 10, from 1 to 50, from 1 to 40, from 1 to 20, from 1 to 10, from 2 to 50, from 2 to 40, from 2 to 20, or from 2 to 10.

In divinyl ethers of Formula (6), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (6), each $R^2$ can independently be a $C_{2-10}$ n-alkanediyl group, such as methanediyl, ethanediyl, n-propanediyl, or n-butanediyl.

In divinyl ethers of Formula (6), each $R^2$ can independently comprise a $—[(CH_2)_p—X—]_q(CH_2)_r—$ group, where each X can be O or S.

In divinyl ethers of Formula (6), each $R^2$ can independently comprise a $—[(CH_2)_p—X—]_q(CH_2)_r—$ group.

In divinyl ethers of Formula (6), each m can be independently an integer from 1 to 3. Each m can be the same and can be 1, 2, or 3.

In divinyl ethers of Formula (6), each $R^2$ can independently be selected from a $C_{2-10}$ n-alkanediyl group, a $C_{3-6}$ branched alkanediyl group, and a $—[(CH_2)_p—X—]_q(CH_2)_r—$ group.

In divinyl ethers of Formula (6), each $R^2$ can independently be a $C_{2-10}$ n-alkanediyl group.

In divinyl ethers of Formula (6), each $R^1$ can independently be a $—[(CH_2)_p—X—]_q(CH_2)_r—$ group, where each X can be O or S.

In divinyl ethers of Formula (6), each $R^2$ can independently be a $—[(CH_2)_p—X—]_q(CH_2)_r—$ group, where each X can be O or S, and each p can independently be 2, 3, 4, 5, and 6.

In divinyl ethers of Formula (6), each p can be the same and can be 2, 3, 4, 5, or 6.

In divinyl ethers of Formula (6), each $R^2$ can independently be a $—[(CH_2)_p—X—]_q(CH_2)_r—$ group, where each X can be O or S, and each q can independently be 1, 2, 3, 4, or 5.

In divinyl ethers of Formula (6), each q can be the same and can be 1, 2, 3, 4, or 5.

In divinyl ethers of Formula (6), each $R^2$ can independently be a $—[(CH_2)_p—X—]_q(CH_2)_r—$ group, where each X can be O or S, and each r can independently be 2, 3, 4, 5, 6, 7, 8, 9, or 10.

In divinyl ethers of Formula (6), each r can be the same and can be 2, 3, 4, 5, 6, 7, 8, 9, or 10. In divinyl ethers of Formula (6), each r can independently be an integer from 2 to 4, from 2 to 6, or from 2 to 8.

Examples of suitable divinyl ethers include ethylene glycol divinyl ether (EG-DVE) butanediol divinyl ether (BD-DVE) hexanediol divinyl ether (HD-DVE), diethylene glycol divinyl ether (DEG-DVE), triethylene glycol divinyl ether, tetraethylene glycol divinyl ether, polytetrahydrofuryl divinyl ether, cyclohexane dimethanol divinyl ether, and combinations of any of the foregoing.

A divinyl ether can comprise a sulfur-containing divinyl ether. Examples of suitable sulfur-containing divinyl ethers are disclosed, for example, in PCT Publication No. WO 2018/085650.

In moieties of Formula (5) each A can independently be derived from a polyalkenyl polyfunctionalizing agent. A polyalkenyl polyfunctionalizing agent can have the structure of Formula (7), where z can be 3, 4, 5, or 6.

In polyalkenyl polyfunctionalizing agents of Formula (7), each $R^{70}$ can independently be selected from $C_{1-10}$ alkanediyl, $C_{1-10}$ heteroalkanediyl, substituted $C_{1-10}$ alkanediyl, or substituted $C_{1-10}$ heteroalkanediyl. The one or more substituent groups can be selected from, for example, —OH, =O, $C_{1-4}$ alkyl, and $C_{1-4}$ alkoxy. The one or more heteroatoms can be selected from, for example, O, S, and a combination thereof.

Examples of suitable polyalkenyl polyfunctionalizing agents include triallyl cyanurate (TAC), triallylisocyanurate (TAIC), 1,3,5-triallyl-1,3,5-triazinane-2,4,6-trione), 1,3-bis(2-methylallyl)-6-methylene-5-(2-oxopropyl)-1,3,5-triazinone-2,4-dione, tris(allyloxy)methane, pentaerythritol triallyl ether, 1-(allyloxy)-2,2-bis((allyloxy)methyl)butane, 2-prop-2-ethoxy-1,3,5-tris(prop-2-enyl)benzene, 1,3,5-tris(prop-2-enyl)-1,3,5-triazinane-2,4-dione, and 1,3,5-tris(2-methylallyl)-1,3,5-triazinane-2,4,6-trione, 1,2,4-trivinylcyclohexane, trimethylolpropane trivinyl ether, and combinations of any of the foregoing.

In moieties of Formula (5) the molar ratio of vinyl ether moieties derived from a divinyl ether to alkenyl moieties derived from a polyalkenyl polyfunctionalizing agent can be, for example, from 10:1 to 1,000:1, from 10:1 to 100:1, or from 20:1 to 100:1.

In moieties of Formula (5), each $R^1$ can be —$(CH_2)_2$—O—$(CH_2)_2$—O—$(CH_2)_2$—; each $R^2$ can be —$(CH_2)_2$—; and m can be an integer from 1 to 4.

In moieties of Formula (5), $R^2$ can be derived from a divinyl ether such a diethylene glycol divinyl ether, a polyalkenyl polyfunctionalizing agent such as triallyl cyanurate, or a combination thereof.

In moieties of Formula (5), each A can independently be selected from a moiety of Formula (6a) and a moiety of Formula (7a):

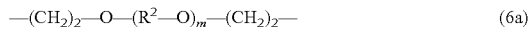

$$-(CH_2)_2-O-(R^2-O)_m-(CH_2)_2- \quad (6a)$$

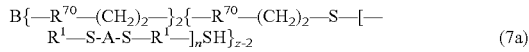

$$B\{-R^{70}-(CH_2)_2-\}_2\{-R^{70}-(CH_2)_2-S-[-R^1-S-A-S-R^1-]_n SH\}_{z-2} \quad (7a)$$

where m, $R^1$, $R^2$, $R^{70}$, A, B, m, n, and z are defined as in Formula (5), Formula (6), and Formula (7).

In moieties of Formula (5),
each $R^1$ can be —$(CH_2)_2$—O—$(CH_2)_2$—O—$(CH_2)_2$—;
each $R^2$ can be —$(CH_2)_2$—;
m can be an integer from 1 to 4; and
the polyfunctionalizing agent $B(-R^{70}-CH=CH_2)_z$ comprises triallyl cyanurate where z is 3 and each $R^{70}$ is —O—$CH_2$—CH=$CH_2$.

A thiol-terminated polythioether prepolymer can have the structure of Formula (5a):

$$HS-R^1-[S-A-S-R^1-]_n-SH \quad (5a)$$

wherein,
n can be an integer from 1 to 60;
each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and —$[(CHR^3)_p$—X—$]_q(CHR^3)_r$—, wherein,
p can be an integer from 2 to 6;
q can be an integer from 1 to 5;
r can be an integer from 2 to 10;
each $R^3$ can independently be selected from hydrogen and methyl; and
each X can independently be selected from O, S, and NR, wherein R can be selected from hydrogen and methyl; and
each A can independently be selected from a moiety derived from a polyvinyl ether of Formula (6) and a moiety derived from a polyalkenyl polyfunctionalizing agent of Formula (7):

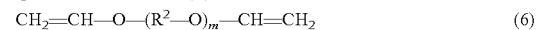

$$CH_2=CH-O-(R^2-O)_m-CH=CH_2 \quad (6)$$

$$B(-R^{70}-CH=CH_2)_z \quad (7)$$

wherein,
each $R^2$ can independently be selected from $C_{1-10}$ alkanediyl, $C_{6-8}$ cycloalkanediyl, $C_{6-14}$ alkanecycloalkanediyl, and —$[(CHR^3)_p X$—$]_q(CHR^3)_r$—, wherein p, q, r, $R^3$, and X are as defined as for $R^1$;
m can be an integer from 0 to 50;
B represents a core of a z-valent, polyalkenyl polyfunctionalizing agent $B(-R^{70}-CH=CH_2)_z$ wherein,
z can be an integer from 3 to 6; and
each $R^{70}$ can independently be selected from $C_{1-10}$ alkanediyl, $C_{1-10}$ heteroalkanediyl, substituted $C_{1-10}$ alkanediyl, and substituted $C_{1-10}$ heteroalkanediyl.

In thiol-terminated polythioether prepolymers of Formula (5a), $R^1$ can be $C_{2-10}$ alkanediyl.

In thiol-terminated polythioether prepolymers of Formula (5a), $R^1$ can be —$[(CHR^3)_p$—X—$]_q(CHR^3)_r$—.

In thiol-terminated polythioether prepolymers of Formula (5a), X can be selected from O and S, and thus —$[(CHR^3)_p$—X—$]_q(CHR^3)_r$— in Formula (5a) can be —$[(CHR^3)_p$—O—$]_q(CHR^3)_r$— or —$[(CHR^3)_p$—S—$]_q(CHR^3)_r$—. P and r can be equal, such as where p and r can be both two.

In thiol-terminated polythioether prepolymers of Formula (5a), $R^1$ can be selected from $C_{2-6}$ alkanediyl and —$[(CHR^3)_p$—X—$]_q(CHR^3)_r$—.

In thiol-terminated polythioether prepolymers of Formula (5a), $R^1$ can be —$[(CHR^3)_p$—X—$]_q(CHR^3)_r$—, and X can be O, or X can be S.

In thiol-terminated polythioether prepolymers of Formula (5a), where $R^1$ can be —$[(CHR^3)_p$—X—$]_q(CHR^3)_r$—, p can be 2, r can be 2, q can be 1, and X can be S; or p can be 2, q can be 2, r can be 2, and X can be O; or p can be 2, r can be 2, q can be 1, and X can be O.

In thiol-terminated polythioether prepolymers of Formula (5a), where $R^1$ can be —$[(CHR^3)_p$—X—$]_q(CHR^3)_r$—, each $R^3$ can be hydrogen, or at least one $R^3$ can be methyl.

In thiol-terminated polythioether prepolymers of Formula (5a), $R^1$ can be —$[(CH_2)_p$—X—$]_q(CH_2)_r$ wherein each X can independently be selected from O and S. In thiol-terminated polythioethers of Formula (5a), $R^1$ can be —$[(CH_2)_p$—X—$]_q(CH_2)_r$— each X can be O or each X can be S.

In thiol-terminated polythioether prepolymers of Formula (5a), $R^1$ can be —$[(CH_2)_p$—X—$]_q(CH_2)_r$—, where p can be 2, X can be O, q can be 2, r can be 2, $R^2$ can be ethanediyl, m can be 2, and n can be 9.

In thiol-terminated polythioether prepolymers of Formula (5a), each $R^1$ can be derived from 1,8-dimercapto-3,6-dioxaoctane (DMDO; 2,2-(ethane-1,2-diylbis(sulfanyl))bis (ethan-1-thiol)), or each $R^1$ can be derived from dimercaptodiethylsulfide (DMDS; 2,2'-thiobis(ethan-1-thiol)), and combinations thereof.

In thiol-terminated polythioether prepolymers of Formula (5a), each p can independently be selected from 2, 3, 4, 5, and 6. Each p can be the same and can be 2, 3, 4, 5, or 6.

In thiol-terminated polythioether prepolymers of Formula (5a), each q can independently be 1, 2, 3, 4, or 5. Each q can be the same and can be 1, 2, 3, 4, or 5.

In thiol-terminated polythioether prepolymers of Formula (5a), each r can independently be 2, 3, 4, 5, 6, 7, 8, 9, or 10. Each r can be the same and can be 2, 3, 4, 5, 6, 7, 8, 9, or 10.

In thiol-terminated polythioether prepolymers of Formula (5a), each r can independently bean integer from 2 to 4, from 2 to 6, or from 2 to 8.

In thiol-terminated polythioether prepolymers of Formula (5a), each A can independently be selected from a moiety of Formula (6a) and a moiety of Formula (7a):

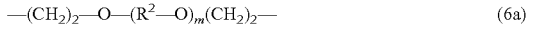

$$—(CH_2)_2—O—(R^2—O)_m(CH_2)_2— \quad (6a)$$

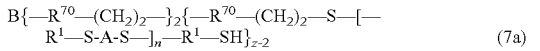

$$B\{—R^{70}—(CH_2)_2—\}_2\{—R^{70}—(CH_2)_2—S—[—R^1—S-A-S—]_n—R^1—SH\}_{z-2} \quad (7a)$$

where m, $R^1$, $R^2$, $R^{70}$, A, B, m, n, and z are defined as in Formula (5), Formula (6), and Formula (7).

In thiol-terminated polythioether prepolymers of Formula (5a) the molar ratio of moieties derived from a divinyl ether to moieties derived from a polyalkenyl polyfunctionalizing agent can be, for example, of 200:1, 150:1, 100:1, 50:1, or 25:1.

A thiol-terminated polythioether prepolymer can comprise a thiol-terminated polythioether prepolymer of Formula (3a), a thiol-terminated polythioether prepolymer of Formula (3b), a thiol-terminated polythioether prepolymer of Formula (3c), or a combination of any of the foregoing:

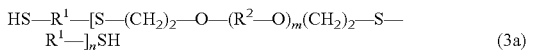

$$HS—R^1—[S—(CH_2)_2—O—(R^2—O)_m(CH_2)_2—S—R^1—]_nSH \quad (3a)$$

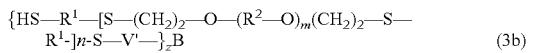

$$\{HS—R^1—[S—(CH_2)_2—O—(R^2—O)_m(CH_2)_2—S—R^1-]n\text{-}S—V'—\}_zB \quad (3b)$$

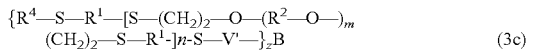

$$\{R^4—S—R^1—[S—(CH_2)_2—O—(R^2—O—)_m(CH_2)_2—S—R^1\text{-}]n\text{-}S—V'—\}_zB \quad (3c)$$

wherein, each $R^1$ can independently be selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(CHR^3)_p—X—]_q(CHR^3)_r—$, wherein,
p can be an integer from 2 to 6;
q can be an integer from 1 to 5;
r can be an integer from 2 to 10;
each $R^3$ can independently be selected from hydrogen and methyl; and
each X can independently be selected from O, S, and NR, wherein R can be selected from hydrogen and methyl;

each $R^2$ can independently be selected from $C_{1-10}$ alkanediyl, $C_{6-8}$ cycloalkanediyl, $C_{6-14}$ alkanecycloalkanediyl, and $—[(CHR^3)_p—X—]_q(CHR^3)_r—$, wherein p, q, r, $R^3$, and X are as defined as for $R^1$;
m can be an integer from 0 to 50;
n can be an integer from 1 to 60;

B represents a core of a z-valent, polyfunctionalizing agent $B(—V)_z$ wherein,
z can be an integer from 3 to 6; and
each V can be a moiety comprising a terminal group reactive with a thiol;
each —V'— can be derived from the reaction of —V with a thiol; and each $R^4$ can independently be selected from hydrogen and a moiety of Formula (3), which is bound to a prepolymer of Formula (3c).

In prepolymers of Formula (3a)-(3c), $R^1$ can be $—[(CH_2)_p—X—]_q(CH_2)_r—$, where p can be 2, X can be O, q can be 2, r can be 2, $R^2$ can be ethanediyl, m can be 2, and n can be 9.

In prepolymers of Formula (3a)-(3c), $R^1$ can be selected from $C_{2-6}$ alkanediyl and $—[(CHR^3)_p—X—]_q(CHR^3)_r—$.

In prepolymers of Formula (3a)-(3c), $R^1$ can be $—[(CHR^3)_p—X—]_q(CHR^3)_r—$, X can be O or X can be S.

In prepolymers of Formula (3a)-(3c), where $R^1$ can be $—[(CHR^3)_p—X—]_q(CHR^3)_r—$, p can be 2, r can be 2, q can be 1, and X can be S; or wherein p can be 2, q can be 2, r can be 2, and X can be O; or p can be 2, r can be 2, q can be 1, and X can be O.

In prepolymers of Formula (3a)-(3c), $R^1$ can be $—[(CHR^3)_p—X—]_q(CHR^3)_r—$, and each $R^3$ can be hydrogen or at least one $R^3$ can be methyl.

In prepolymers of Formula (3a)-(3c), each $R^1$ can be the same, or at least one R1 can be different.

In prepolymers of Formula (3a)-(3c), each m can be independently an integer from 1 to 3. Each m can be the same and can be 1, 2, or 3.

In prepolymers of Formula (3a)-(3c), n can be an integer from 1 to 30, an integer from 1 to 20, an integer from 1 to 10, or an integer from 1 to 5. The variable n may be any integer from 1 to 60.

In prepolymers of Formula (3a)-(3c), each p can independently be 2, 3, 4, 5, and 6. Each p can be the same and can be 2, 3, 4, 5, or 6.

In prepolymers of Formula (3a)-(3c), each q can independently be 1, 2, 3, 4, or 5. Each q can be the same and can be 1, 2, 3, 4, or 5.

In prepolymers of Formula (3a)-(3c), each r can independently be 2, 3, 4, 5, 6, 7, 8, 9, or 10.

In prepolymers of Formula (3a)-(3c), each r can independently be an integer from 2 to 4, from 2 to 6, or from 2 to 8.

Various methods can be used to prepare thiol-terminated polythioether prepolymers of Formula (3a)-(3c). Examples of suitable thiol-terminated polythioether prepolymers, and methods for their production, are described in U.S. Pat. Nos. 6,172,179, 6,232,401, and 8,932,685. Such thiol-terminated polythioether prepolymers may be difunctional, that is, linear prepolymers having two terminal thiol groups, or can be polyfunctional, that is, branched prepolymers having three or more terminal thiol groups.

Thiol-terminated polythioether prepolymers are liquid at room temperature and can have a glass transition temperature $T_g$, for example, less than −20° C., less than −30° C., or less than −40° C., where the glass transition temperature $T_g$ is determined by Dynamic Mass Analysis (DMA) using a TA Instruments Q800 apparatus with a frequency of 1 Hz, an amplitude of 20 microns, and a temperature ramp of −80° C. to 25° C., with the $T_g$ identified as the peak of the tan δ curve.

Thiol-terminated polythioether prepolymers can exhibit a viscosity, for example, within a range from 20 poise to 500 poise (2 Pa-sec to 50 Pa-sec), from 20 poise to 200 poise (2

Pa-sec to 20 Pa-sec) or from 40 poise to 120 poise (4 Pa-sec to 12 Pa-sec), measured using a Brookfield CAP 2000 viscometer, with a No. 6 spindle, at speed of 300 rpm, and a temperature of 25° C.

Thiol-terminated polythioether prepolymers can be characterized by a number average molecular weight and/or a molecular weight distribution. Thiol-terminated polythioether prepolymers can exhibit a number average molecular weight, for example, from 500 Da to 20,000 Da, from 2,000 Da to 5,000 Da, or from 1,000 Da to 4,000 Da. Thiol-terminated polythioether prepolymers can exhibit a polydispersity (Mw/Mn; weight average molecular weight/number average molecular weight), for example, from 1 to 20, or from 1 to 5. The backbone of a thiol-terminated polythioether prepolymer can be modified to improve the properties such as adhesion, tensile strength, elongation, UV resistance, hardness, and/or flexibility of sealants and coatings prepared using polythioether prepolymers. For example, adhesion-promoting groups, antioxidants, metal ligands, and/or urethane linkages can be incorporated into the backbone of a polythioether prepolymer to improve one or more performance attributes. Examples of backbone-modified polythioether prepolymers are disclosed, for example, in U.S. Pat. No. 8,138,273 (urethane containing), U.S. Pat. No. 9,540,540 (sulfone-containing), U.S. Pat. No. 8,952,124 (bis(sulfonyl)alkanol-containing), U.S. Pat. No. 9,382,642 (metal-ligand containing), U.S. Application Publication No. 2017/0114208 (antioxidant-containing), PCT International Publication No. WO 2018/085650 (sulfur-containing divinyl ether), and PCT International Publication No. WO 2018/031532 (urethane-containing).

A thiol-terminated polythioether prepolymer include prepolymers described in U.S. Application Publication Nos. 2017/0369737 and 2016/0090507.

A thiol-terminated sulfur-containing prepolymer can comprise a thiol-terminated polysulfide prepolymer or a combination of thiol-terminated polysulfide prepolymers.

A polysulfide prepolymer refers to a prepolymer that contains one or more polysulfide linkages, i.e., $-S_x-$ linkages, where x is from 2 to 4, in the prepolymer backbone. A polysulfide prepolymer can have two or more sulfur-sulfur linkages. Suitable thiol-terminated polysulfide prepolymers are commercially available, for example, from AkzoNobel and Toray Industries, Inc. under the tradenames Thioplast® and from Thiokol-LP®, respectively.

Examples of suitable polysulfide prepolymers are disclosed, for example, in U.S. Pat. Nos. 4,623,711; 6,172,179; 6,509,418; 7,009,032; and 7,879,955.

Examples of suitable thiol-terminated polysulfide prepolymers include are liquid polysulfide prepolymers that are blends of di- and tri-functional molecules where the difunctional polysulfide prepolymers have the structure of Formula (8a) and E in the thiol-terminated prepolymer of Formula (4) can be a moiety of Formula (8):

(8)

(8a)

and the trifunctional polysulfide polymers can have the structure of Formula (9a) and E in the thiol-terminated prepolymer of Formula (4) can be a moiety of Formula (9):

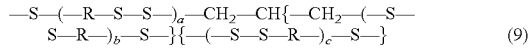
(9)

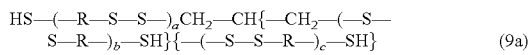
(9a)

where each R is $-(CH_2)_2-O-CH_2-O-(CH_2)_2-$, and n=a+b+c, where the value for n may be from 7 to 38 depending on the amount of the trifunctional cross-linking agent (1,2,3-trichloropropane; TCP) used during synthesis of the polysulfide prepolymer. Such thiol-terminated polysulfide prepolymers include Thioplast™ G polysulfides/resins such as Thioplast™ G1, Thioplast™ G4, Thioplast™ Gb, Thioplast™ G12, Thioplast™ G21, Thioplast™ G22, Thioplast™ G44, Thioplast™ G122, and Thioplast™ G131, which are commercially available from AkzoNobel. Thioplast™ G polysulfides can have a number average molecular weight from 1,000 Da to 6,500 Da, a SH content from 1% to greater than 5.5%, and a cross-linking density from 0% to 2.0%.

Examples of suitable thiol-terminated polysulfide prepolymers also include Thiokol™ LP polysulfides available from Toray Industries, Inc. such as Thiokol™ LP2, Thiokol™ LP3, Thiokol™ LP12, Thiokol™ LP23, Thiokol™ LP33, and Thiokol™ LP55. Thiokol™ LP polysulfides have a number average molecular weight from 1,000 Da to 7,500 Da, a —SH content from 0.8% to 7.7%, and a cross-linking density from 0% to 2%. Thiokol™ LP polysulfide prepolymers have the general structure of Formula (10a) and E in the thiol-terminated prepolymer of Formula (4) can be a moiety of Formula (10):

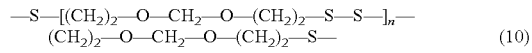
(10)

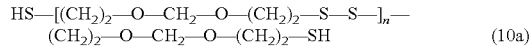
(10a)

where n can be such that the number average molecular weight from 1,000 Da to 7,500 Da, such as, for example an integer from 8 to 80.

A thiol-terminated sulfur-containing prepolymer can comprise a Thiokol-LP® polysulfide, a Thioplast® G polysulfide, or a combination thereof.

A thiol-terminated polysulfide prepolymer can comprise a thiol-terminated polysulfide prepolymer of Formula (11a) and E in the thiol-terminated prepolymer of Formula (4) can be a moiety of Formula (11):

(11)

(11a)

wherein,
t can be an integer from 1 to 60;
q can be an integer from 1 to 8;
p can be an integer from 1 to 10;
r can be an integer from 1 to 10;
y has an average value within a range from 1.0 to 1.5; and
each R can independently be selected from branched alkanediyl, branched arenediyl, and a moiety having the structure $-(CH_2)_p-O-(CH_2)_q-O-(CH_2)_r-$.

Examples of thiol-terminated polysulfide prepolymers of Formula (23) and (23a) are disclosed, for example, in U.S. Application Publication No. 2016/0152775, in U.S. Pat. No. 9,079,833, and in U.S. Pat. No. 9,663,619.

A thiol-terminated polysulfide prepolymer can comprise a thiol-terminated polysulfide prepolymer of Formula (12a) and E in the thiol-terminated prepolymer of Formula (4) can be a moiety of Formula (12):

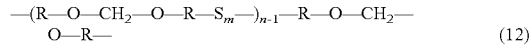
(12)

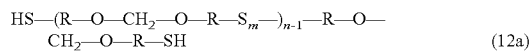
(12a)

where R is $C_{2-4}$ alkanediyl, m is an integer from 1 to 8, and n is an integer from 2 to 370.

Examples of thiol-terminated polysulfide prepolymers of Formula (24) and (24a) are disclosed, for example, in JP 62-53354.

A thiol-terminated sulfur-containing prepolymer can comprise a thiol-terminated sulfur-containing polyformal prepolymer or a combination of thiol-terminated sulfur-containing polyformal prepolymers. Sulfur-containing polyformal prepolymers useful in sealant applications are disclosed, for example, in U.S. Pat. No. 8,729,216 and in U.S. Pat. No. 8,541,513.

A thiol-terminated sulfur-containing prepolymer can comprise a thiol-terminated sulfur-containing polyformal prepolymer comprising a moiety of Formula (13):

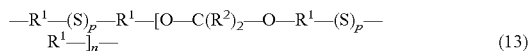
(13)

where n can be an integer from 1 to 50; each p can independently be selected from 1 and 2; each $R^1$ can be $C_{2-6}$ alkanediyl; and each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

A thiol-terminated sulfur-containing polyformal prepolymer can have the structure of Formula (13a):

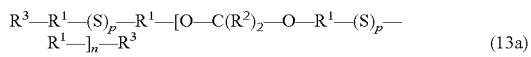
(13a)

where n can be an integer from 1 to 50; each p can independently be selected from 1 and 2; each $R^1$ can be $C_{2-6}$ alkanediyl; each $R^2$ can independently be selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and each $R^3$ comprises a thiol-terminated group.

A thiol-terminated sulfur-containing prepolymer can comprise a thiol-terminated monosulfide prepolymer or a combination of thiol-terminated monosulfide prepolymers.

A thiol-terminated monosulfide prepolymer can comprise a thiol-terminated monosulfide prepolymer comprising a moiety of Formula (14):

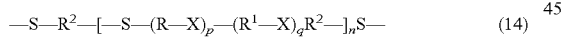
(14)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{5-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{5-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O or S;

p can be an integer from 1 to 5;

q can be an integer from 0 to 5; and n can be an integer from 1 to 60, such as from 2 to 60, from 3 to 60, or from 25 to 35.

A thiol-terminated monosulfide prepolymer can comprise a thiol-terminated monosulfide prepolymer of Formula (14a), a thiol-terminated monosulfide prepolymer of Formula (14b), a thiol-terminated monosulfide prepolymer of Formula (14c), or a combination of any of the foregoing:

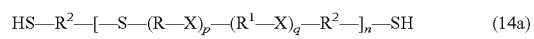
(14a)

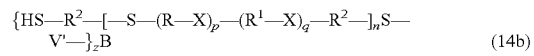
(14b)

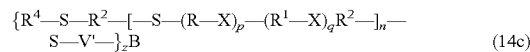
(14c)

wherein, each R can independently be selected from $C_{2-10}$ alkanediyl, such as $C_{2-6}$ alkanediyl; $C_{2-10}$ branched alkanediyl, such as $C_{3-6}$ branched alkanediyl or a $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkyanediyl, such as $C_{6-10}$ alkylcycloalkanediyl; and $C_{8-10}$ alkylarenediyl;

each $R^1$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl; $C_{6-14}$ alkylcycloalkanediyl, such as $C_{6-10}$ alkylcycloalkanediyl; and $C_{8-10}$ alkylarenediyl;

each $R^2$ can independently be selected from $C_{1-10}$ n-alkanediyl, such as $C_{1-6}$ n-alkanediyl, $C_{2-10}$ branched alkanediyl, such as $C_{3-6}$ branched alkanediyl having one or more pendant groups which can be, for example, alkyl groups, such as methyl or ethyl groups; $C_{6-8}$ cycloalkanediyl group; $C_{6-14}$ alkylcycloalkanediyl, such as a $C_{6-10}$ alkylcycloalkanediyl; and $C_{8-10}$ alkylarenediyl;

each X can independently be selected from O and S;

p can be an integer from 1 to 5;

q can be an integer from 0 to 5; and n can be an integer from 1 to 60, such as from 2 to 60, from 3 to 60, or from 25 to 35 and B represents a core of a z-valent polyfunctionalizing agent $B(-V)_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent $B(-V)_z$ through a moiety of Formula (14).

Methods of synthesizing thiol-terminated monosulfide moieties or prepolymers of Formula (14)-(14c) are disclosed, for example, in U.S. Pat. No. 7,875,666.

A thiol-terminated monosulfide prepolymer can comprise a thiol-terminated monosulfide prepolymer comprising a moiety of Formula (15) and E in the thiol-terminated prepolymer of Formula (4) can be a moiety of Formula (15a):

$$—[—S—(R—X)_p—C(R^1)_2—(X—R)_q]_n—S— \quad (15)$$

$$H—[—S—(R—X)_p—C(R^1)_2—(X—R)_q]_n—SH \quad (15a)$$

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{5-10}$ alkylarenediyl;

each $R^1$ can independently be selected from hydrogen, $C_{1-10}$ n-alkyl, such as a $C_{1-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;

p can be an integer from 1 to 5;

q can be an integer from 1 to 5; and n can be an integer from 1 to 60, such as from 2 to 60, from 3 to 60, or from 25 to 35.

A thiol-terminated monosulfide prepolymer can comprise a thiol-terminated monosulfide prepolymer of Formula (15a), a thiol-terminated monosulfide prepolymer of Formula (15b), a thiol-terminated monosulfide prepolymer of Formula (15c), or a combination of any of the foregoing:

$$H—[—S—(R—X)_p—C(R^1)_2—(X—R)_q]_n—SH \quad (15a)$$

$$\{H—[—S—(R—X)_p—C(R^1)_2—(X—R)_q]_nS—V'—\}_zB \quad (15b)$$

$$\{R^4—[—S—(R—X)_p—C(R^1)_2—(X—R)_q—]_nS—V'—\}_zB \quad (15c)$$

wherein, each R can independently be selected from $C_{2-10}$ alkanediyl, such as $C_{2-6}$ alkanediyl; a $C_{3-10}$ branched alkanediyl, such as a $C_{3-6}$ branched alkanediyl or a $C_{3-6}$ branched alkanediyl having one or more pendant groups which can be, for example, alkyl groups, such as methyl or ethyl groups; a $C_{6-8}$ cycloalkanediyl; a $C_{6-14}$ alkylcycloalkyanediyl, such as a $C_{6-10}$ alkylcycloalkanediyl; and a $C_{8-10}$ alkylarenediyl;

each $R^1$ can independently be selected from hydrogen, $C_{1-10}$ n-alkyl, such as a $C_{2-6}$ n-alkyl, $C_{3-10}$ branched alkyl, such as a $C_{3-6}$ branched alkyl having one or more pendant groups which can be, for example, alkyl groups, such as methyl or ethyl groups; a $C_{6-8}$ cycloalkyl group; a $C_{6-14}$ alkylcycloalkyl, such as a $C_{6-10}$ alkylcycloalkyl; and a $C_{8-10}$ alkylaryl;

each X can independently be selected from O and S;

p can be an integer from 1 to 5;

q can be an integer from 1 to 5;

n can be an integer from 1 to 60, such as from 2 to 60, from 3 to 60, or from 25 to 35;

B represents a core of a z-valent polyfunctionalizing agent $B(—V)_z$ wherein:

z can be an integer from 3 to 6; and each V can be a moiety comprising a terminal group reactive with a thiol group;

each —V'— can be derived from the reaction of —V with a thiol; and each $R^4$ can independently be selected from hydrogen and a bond to a polyfunctionalizing agent $B(—V)_z$ through a moiety of Formula (15).

Methods of synthesizing thiol-terminated monosulfides of Formula (15)-(15c) are disclosed, for example, in U.S. Pat. No. 8,466,220.

A radiation-curable sealant can comprise a polyalkenyl or a combination of polyalkenyls.

Suitable polyalkenyls can comprise two or more polyalkenyl groups. For example, a polyalkenyl can have an alkenyl functionality from 2 to 10, from 2 to 8, from 2 to 6, or from 2 to 4. Polyalkenyls can have an alkenyl functionality greater than 2, greater than 4, greater than 6, or greater than 8.

Suitable polyalkenyls can have a molecular weight or a number average molecular weight, for example, from 150 Da to 2,000 Da, from 200 Da to 1,500 Da, from 300 Da to 1,000 Da, or from 400 Da to 800 Da. Polyalkenyls can have a molecular weight, for example, less than 2,000 Da, less than 1,500 Da, less than 1,000 Da, less than 800 Da, less than 700 Da, less than 600 Da, or less than 500 Da. A polyalkenyl can have a molecular weight, for example, greater than 2,000 Da, greater than 1,500 Da, greater than 1,000 Da, greater than 800 Da, greater than 700 Da, greater than 600 Da, greater than 500 Da, or greater than 150 Da.

A polyalkenyl can be a polyalkenyl prepolymer, a monomeric polyalkenyl, an oligomeric polyalkenyl, or a combination of any of the foregoing.

A polyalkenyl can have, for example, a sulfur content from 0 wt % to 50 wt %, from 5 wt % to 40 wt %, from 10 wt % to 40 wt % or from 20 wt % to 40 wt %, where wt % is based on the total weight of the polyalkenyl. A polyalkenyl can be selected such that when reacted with a polythiol, the product can have a sulfur content, for example, greater than 5 wt %, greater than 10 wt %, greater than 15 wt %, greater than 20 wt %, or greater than 25 wt %, where wt % is based on the total weight of the reaction product. For example, the product can have a sulfur content from 5 wt % to 50 wt %, from 10 wt % to 40 wt %, from 15 wt % to 30 wt %, or from 10 wt % to 20 wt %, where wt % is based on the total weight of the reaction product.

A polyalkenyl may or may not be a sulfur-containing polyalkenyl and contain sulfur atoms.

Examples of suitable polyalkenyl monomers include divinyl ethers such as divinyl ethers having the structure of Formula (16):

$$CH_2=CH—O—(—R^2—O—)_m—CH=CH_2 \quad (16)$$

where m can be from 0 to 50 and $R^2$ in Formula (16) can be selected from $C_{2-6}$ n-alkanediyl, $C_{3-6}$ branched alkanediyl, $C_{6-8}$ cycloalkanediyl, $C_{6-10}$ alkanecycloalkanediyl, and —[—(CH_2)_p—X—]_q—(CH_2)_r—, where p can be an integer ranging from 2 to 6, q can be an integer from 1 to 5, r can be an integer from 2 to 10, and X can be O or S. In a divinyl ether of Formula (16), $R^2$ can be, for example, $C_{2-6}$ n-alkanediyl, $C_{3-6}$ branched alkanediyl, $C_{6-8}$ cycloalkanediyl, $C_{6-10}$ alkanecycloalkanediyl, —[(CH_2)_p—O—]_q—(CH_2)_r—, or —[(CH_2)_p—S—]_q—(CH_2)_r—.

In divinyl ethers of Formula (16), mean bean integer from 0 to 50, such as an integer from 1 to 6, from 1 to 4, or from 1 to 3.

In divinyl ethers of Formula (16), mean be 1, 2, 3, 4, 5, or 6.

In divinyl ethers of Formula (16), each $R^2$ can independently be $C_{2-6}$ alkanediyl such as 1,2-ethane-diyl, 1,3-propane-diyl, 1,4-butane-diyl, 1,5-pentane-diyl, or 1,6-hexane-diyl.

In divinyl ethers of Formula (16), each $R^2$ can be $-[-(CH_2)_p-X-]_q-(CH_2)_r-$.

In divinyl ethers of Formula (16), each $R^2$ can be $-[-(CH_2)_p-X-]_q-(CH_2)_r-$, where each p can be 2, each r can be 2, and q can be 1, 2, 3, 4, or 5.

Suitable divinyl ethers include, for example, compounds having at least one oxyalkanediyl group, such as from 1 to 4 oxyalkanediyl groups, i.e., compounds in which m in Formula (16) can be an integer ranging from 1 to 4. In a divinyl ether of Formula (16), m can be an integer ranging from 2 to 4. It is also possible to employ commercially available divinyl ether mixtures that are characterized by a non-integral average value for the number of oxyalkanediyl units per molecule. Thus, m in Formula (16) can also be a rational number from 0 to 10.0, such as from 1.0 to 10.0, from 1.0 to 4.0, or from 2.0 to 4.0, such as 2.5, which represents an average functionality.

Examples of suitable vinyl ethers include, divinyl ether, ethylene glycol divinyl ether (EG-DVE) ($R^2$ in Formula (16) is ethanediyl and m is 1), butanediol divinyl ether (BD-DVE) ($R^2$ in Formula (16) is butanediyl and m is 1), hexanediol divinyl ether (HD-DVE) ($R^2$ in Formula (16) is hexanediyl and m is 1), diethylene glycol divinyl ether (DEG-DVE; $R^2$ in Formula (16) is ethanediyl and m is 2), triethylene glycol divinyl ether (TEG-DVE; $R^2$ in Formula (16) is ethanediyl and m is 3), tetraethylene glycol divinyl ether ($R^2$ in Formula (16) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendent groups selected from alkyl groups, hydroxyl groups, alkoxy groups, and amine groups.

Divinyl ethers in which $R^2$ in Formula (16) is $C_{3-6}$ branched alkanediyl may be prepared by reacting a polyhydroxyl compound with acetylene. Examples of branched divinyl ethers include compounds in which $R^2$ in Formula (16) is an alkyl-substituted methanediyl group such as $-CH(-CH_3)-$, for which $R^2$ in Formula (16) is ethanediyl and m is 3 or an alkyl-substituted ethanediyl.

Other useful divinyl ethers include compounds in which $R^2$ in Formula (16) is polytetrahydrofuryl (poly-THF) or polyoxyalkanediyl, such as those having an average of about 3 monomer units.

A polyalkenyl can have the structure of Formula (1):

$$B(-V)_z \quad (1)$$

wherein,

B comprises a core of a z-valent polyfunctionalizing agent $B(-V)_z$;

z is an integer from 3 to 6; and each $-V$ is independently a moiety comprising a terminal alkenyl group.

In polyalkenyls of Formula (1), z can be, for example, 3, 4, 5, or 6.

A polyalkenyl of Formula (1) can be trifunctional, that is, compounds where z is 3. Suitable trifunctionalizing polyalkenyls include, for example, triallyl cyanurate (TAC), and trimethylolpropane trivinyl ether. Combinations of polyalkenyl compounds may also be used.

Examples of suitable polyalkenyl monomers having an alkenyl functionality greater than two include, for example, triallyl cyanurate (TAC), triallyl isocyanurate (TAIC), trimethylolpropane trivinyl ether, 2,4,6-triallyloxy-1,3,5-triazine, 1,3,5-triacryloylhexahydro-1,3,5-triazine, and tris[2-(acryloyloxy)ethyl] isocyanurate.

A divinyl ether can comprise a sulfur-containing bis(alkenyl) ether. An example of a suitable sulfur-containing divinyl ether is allyl sulfide.

A sulfur-containing bis(alkenyl) ether can have the structure of Formula (17):

$$CH_2=CH-O-(CH_2)_n-Y'-R^4-Y'-(CH_2)_n-O-CH=CH_2 \quad (17)$$

wherein, each n is independently an integer from 1 to 4;

each Y' is independently selected from $-O-$ and $-S-$; and $R^4$ is selected from $C_{2-6}$ n-alkanediyl, $C_{3-6}$ branched alkanediyl, $C_{6-8}$ cycloalkanediyl, $C_{6-10}$ alkanecycloalkanediyl, and $-[-(CH_2)_p-X-]_q(CH_2)_r-$, wherein, each X is independently selected from $-O-$, $-S-$, and $-S-S-$;

p is an integer from 2 to 6;

q is an integer from 1 to 5; and r is an integer from 2 to 6; and at least one Y' is $-S-$, or $R^4$ is $-[-(CH_2)_p-X-]_q-(CH_2)_r-$ and at least one X is $-S-$ or $-S-S-$.

A radiation-curable sealant can comprise a polyalkynyl or a combination of polyalkynyls.

Suitable polyalkynyls can comprise two or more alkynyl groups. For example, a polyalkynyl can have an alkynyl functionality from 2 to 10, from 2 to 8, from 2 to 6, or from 2 to 4. A polyalkynyl can have an alkynyl functionality greater than 2, greater than 4, greater than 6, or greater than 8.

Suitable polyalkynyls can have a molecular weight or a number average molecular weight, for example, from 150 Da to 2,000 Da, from 200 Da to 1,500 Da, from 300 Da to 1,000 Da, or from 400 Da to 800 Da. Polyalkynyls can have a molecular weight, for example, less than 2,000 Da, less than 1,500 Da, less than 1,000 Da, less than 800 Da, less than 700 Da, less than 600 Da, or less than 500 Da. A polyalkynyl can have a molecular weight, for example, greater than 2,000 Da, greater than 1,500 Da, greater than 1,000 Da, greater than 800 Da, greater than 700 Da, greater than 600 Da, greater than 500 Da, or greater than 150 Da.

Polyalkynyls can be polyalkynyl prepolymers, monomeric polyalkynyls, oligomeric polyalkynyls, or a combination of any of the foregoing.

Polyalkynyls may or may not be a sulfur-containing polyalkynyls, which include sulfur atoms.

Examples of suitable polyalkynyls include 1,7-octadiyne, 1,6-heptadiyne, 1,4-dithynylbenzene, 1,4-diethynylbenzene, 1,8-decadiyne, ethylene glycol 1,2-bis(2-propynyl) ether, and combinations of any of the foregoing.

A radiation-curable polymer composition can comprise a photoinitiator or combination of photoinitiators. A photoinitiator can comprise any of those disclosed for use with an adhesion-promoting composition.

A radiation-curable polymer composition can further comprise a free radical polymerization initiator that does not generate free radicals by absorption of UV or visible radiation. Examples of such free radical polymerization initiators include thermally-activated free radical initiators and/or chemically-activated free radically initiators. A free radical initiator can be activated by exposure to heat, or at ambient conditions (25° C./50% RH) without exposing the composition to electromagnetic or thermal energy.

A photopolymerization initiator can comprise a cationic photoinitiator, a photolatent base generator, a photolatent metal catalyst, or a combination of any of the foregoing. Exposure of the photopolymerization initiator to suitable actinic radiation can activate the photopolymerization initiator, for example, by generating free radicals, producing cations, producing Lewis acids, or releasing activated catalysts.

Suitable photoinitiators include, for example, aromatic ketones and synergistic amines, alkyl benzoin ethers, thioxanthones and derivatives, benzyl ketals, acylphosphine oxide, ketoxime ester or α-acyloxime esters, cationic quaternary ammonium salts, acetophenone derivatives, and combinations of any of the foregoing.

Examples of suitable UV photoinitiators include α-hydroxyketones, benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl O-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, and bisacyclophosphine oxide.

Examples of suitable benzophenone photoinitiators include 2-hydroxy-2-methyl-1-phenyl-1-propanone, 2-hydroxy-1,4,4-(2-hydroxyethoxy)phenyl]-2-methyl-1-propanone, α-dimethoxy-α-phenylacetophenone, 2-benzyl-2-(dimethylamino)-1-[4-(4-morpholinyl) phenyl]-1-butanone, and 2-methyl-1-[4-(methylthio)phenyl]-2-(4-morpholinyl)-1-propanone.

Examples of suitable oxime photoinitiators include (hydroxyimino)cyclohexane, 1-[4-(phenylthio)phenyl]-octane-1,2-dione-2-(O-benzoyloxime), 1-[9-ethyl-6-(2-methylbenzoyl)-9H-carbazol-3-yl]-ethanone-1-(O-acetyloxime), trichloromethyl-triazine derivatives), 4-(4-methoxystyryl)-2,6-trichloromethyl-1,3,5-triazine), 4-(4-methoxyphenyl)-2,6-trichloromethyl-1,3,5-triazine, and α-aminoketone (1-(4-morpholinophenyl)-2-dimethylamino-2-benzyl-butan-1-one).

Examples of suitable phosphine oxide photoinitiators include diphenyl (2,4,6-trimethylbenzoyl)-phosphine oxide (TPO) and phenylbis(2,4,6-trimethyl benzoyl) phosphine oxide (BAPO).

Other examples of suitable UV photoinitiators include the Irgacure® products from BASF or Ciba, such as Irgacure® 184, Irgacure® 500, Irgacure® 1173, Irgacure® 2959, Irgacure® 745, Irgacure® 651, Irgacure® 369, Irgacure® 907, Irgacure® 1000, Irgacure® 1300, Irgacure® 819, Irgacure® 819DW, Irgacure® 2022, Irgacure® 2100, Irgacure® 784, Irgacure® 250; Irgacure® MBF, Darocur® 1173, Darocur® TPO, Darocur® 4265, and combinations of any of the foregoing.

A UV photoinitiator can comprise, for example, 2,2-dimethoxy-,2-diphenylethan-1-one (Irgacure® 651, Ciba Specialty Chemicals), 2,4,6-trimethylbenzoyl-diphenylphosphineoxide (Darocur® TPO, Ciba Specialty Chemicals), or a combination thereof.

Other examples of suitable photoinitiators include Darocur® TPO (available from Ciba Specialty Chemicals), Lucirin® TPO (available from BASF), Speedcure® TPO (available from Lambson), Irgacure® TPO (available from Ciba Specialty Chemicals, and Omnirad® (available from IGM Resins), and combinations of any of the foregoing.

A photopolymerization initiator can comprise a cationic photoinitiator or a combination of cationic photoinitiators.

Examples of suitable cationic photoinitiators include hexafluoroantimonates, sulfonium salts, perfluorobutane sulfonates, and iodium salts.

Sealants can comprise one or more free radical initiators such as thermally-activated free radical initiators. A thermally-activated free radical initiator can become active at elevated temperature, such as at a temperature greater than 25° C.

Examples of suitable thermally-activated free radical initiators include organic peroxy compounds, azobis(organonitrile) compounds, N-acyloxyamine compounds, O-iminoisourea compounds, and combinations of any of the foregoing. Examples of suitable organic peroxy compounds, that may be used as thermal polymerization initiators include peroxymonocarbonate esters, such as tertiarybutylperoxy 2-ethylhexyl carbonate and tertiarybutylperoxy isopropyl carbonate; peroxyketals, such as 1,1-di-(tert-butyl peroxy)-3,3,5-trimethylcyclohexane; peroxydicarbonate esters, such as di(2-ethylhexyl)peroxydicarbonate, di(secondary butyl)peroxydicarbonate and diisopropylperoxydicarbonate; diacyperoxides such as 2,4-dichlorobenzoyl peroxide, isobutyryl peroxide, decanoyl peroxide, lauryl peroxide, propionyl peroxide, acetyl peroxide, benzoyl peroxide, and p-chlorobenzoyl peroxide; peroxyesters such as tert-butylperoxy pivalate, tert-butylperoxy octylate, and tert-butylperoxyisobutyrate; methylethylketone peroxide, acetylcyclohexane sulfonyl peroxide, and combinations of any of the foregoing. Other examples of suitable peroxy compounds include 2,5-dimethyl-2,5-di(2-ethylhexanoylperoxy)hexane, and/or 1,1-bis(tert-butylperoxy)-3,3,5-trimethylcyclohexane. Examples of suitable azobis(organonitrile) compounds that may be used as thermal polymerization initiators include azobis(isobutyronitrile), 2,2'-azobis(2-methyl-butanenitrile), and/or azobis(2/1-dimethylvaleronitrile). A thermally-activated free radical initiator can comprise 1-acetoxy-2,2,6,6-tetramethylpiperidine and/or 1,3-dicyclohexyl-O—(N-cyclohexylideneamino)-isourea.

A sealant can be exposed to actinic radiation for a sufficient time to fully or partially cure the surface of the sealant. The full depth of the composition can then cure with time via dark cure mechanisms, for example, in which free radicals are generated by chemical mechanisms. Providing a fully or partially cured surface can facilitate handling of the article comprising the sealant and can provide structural strength and integrity while the article is being fabricated and fully cures.

A sealant can comprise a chemically-activated free radical initiator or a combination of chemically-activated free radical initiators. Chemically-activated free radical initiators refer to compounds and complexes capable of generating free radicals without being activated by actinic radiation and/or by exposure to heat.

A chemically-activated free radical initiator can facilitate curing of portions of a sealant not exposed to actinic radiation and can effectively extend the depth of cure. For example, sealants can be at least partly curable upon exposure to actinic radiation and such compositions can include a photopolymerization initiator. The actinic radiation can be applied to at least a portion of a sealant. A sealant can be accessible to the actinic radiation and the portion of the sealant exposed to the actinic radiation can be cured to a certain surface depth and/or to a certain radiation does. A portion of a sealant may not be accessible or may be incompletely accessible to actinic radiation either because of absorption or scattering of the actinic radiation such that the sealant prevents the actinic radiation from interacting with the full thickness of the sealant.

A chemically-activated free radical initiator can also be included in sealants that are not curable upon exposure to actinic radiation. For example, an overlying layer of a sulfur-containing sealant may not be transmissive or may be only partially transmissive to actinic radiation such as UV radiation.

In dark cure mode, i.e., when actinic radiation such as UV radiation is not used to generate free radicals, chemically-activated free radical initiators provide an alternate radical initiation mechanism that takes place in absence of actinic radiation.

Examples of suitable chemically-activated free radical initiators include combinations of metal complexes and organic peroxides, trialkylborane complexes, and peroxide-amine redox initiators. Examples of suitable chemically-activated free radical initiators are disclosed, for example, in U.S. application Ser. No. 16/373,668 filed on Apr. 3, 2019, and in PCT International Publication No. WO 2018/227149.

In addition to a photoinitiator, polythiol, and polyalkenyl and/or polyalkynyl, a polymer composition can include, for example, filler, reactive diluents, rheology agents, plasticizers, antioxidants, thermal stabilizers, adhesion promoters, colorants, photochromic materials, corrosion inhibitors, dispersants, UV stabilizers, and combinations of any of the foregoing.

A multilayer sealant system provided by the present disclosure include multilayer sealant systems comprising an adhesion-promoting layer and an overlying sealant.

A multilayer sealant system provided by the present disclosure comprise an adhesion-promoting layer and an overlying sealant composition such as a radical-polymerizable sealant composition.

A multilayer sealant system provided by the present disclosure can be used to seal surface of vehicles such as aviation and aerospace vehicles. The sealants may be used to seal apertures such as apertures associated with fuel tanks. To seal an aperture a sealant may be applied to a surface or one or more surfaces defining an aperture and the sealant allowed to cure to seal the aperture.

A multilayer sealant system can comprise a radiation-curable sealant, methods provided by the present disclosure comprise exposing the uncured sealant composition described above to radiation to provide a cured sealant. The examples herein describe suitable conditions for performing this method. In some embodiments of the present disclosure, the thiol-ene reaction, which forms the cured sealant, is initiated by irradiating an uncured sealant composition comprising: (a) a thiol-terminated polythioether (such as any of those described above); and (b) an alkenyl-terminated compound, with radiation such as UV or visible radiation.

Ultraviolet radiation from any suitable source which emits ultraviolet light having a wavelength ranging from, for example, 180 nanometers to 400 nanometers, may be employed to initiate the thiol-ene reaction described above and thereby form the cured sealant. Suitable sources of ultraviolet light are generally known and include, for example, mercury arcs, carbon arcs, low pressure mercury lamps, medium pressure mercury lamps, high pressure mercury lamps, swirl-flow plasma arcs and ultraviolet light emitting diodes. Certain embodiments of the compositions of the disclosure can exhibit an excellent degree of cure in air at relatively low energy exposure in ultraviolet light.

UV cure of sealants to depths of up to 2 inches or more can be achieved in some cases. This means that cured sealants having a thickness of 2 inches or more, and having desirable sealant properties described herein, can be achieved by exposure of the compositions described herein to actinic radiation, such as ultraviolet radiation, in air at relatively low energy exposure.

A UV light source can have an emission peak in the range of 250 nm to 400 nm and at any wavelength or combination of wavelengths in between 250 nm and 400 nm. For example, useful UV sources include mercury vapor (250 nm to 400 nm; 600 mW/cm$^2$) and Phoseon Firefly™ (395 nm; >1000 mW/cm$^2$ setting).

An adhesion-promoting composition provided by the present disclosure can be applied to a surface of a metal substrate or metal part. Before applying the adhesion-promoting composition, the surface can be solvent cleaned. For example, the surface can be wiped with a cleaning solvent to remove any particulates and oils from the metal surface. A cleaning solvent can comprise a volatile organic solvent such as, for example, methylethyl ketone, solvent L628 available from PPG Aerospace, or ethyl lactate such as DS-108 available from Socomore.

An adhesion-promoting composition provided by the present disclosure can be applied to the solvent-cleaned metal surface using any suitable method such as wiping, spraying, or brushing the adhesion-promoting composition across the surface, for example, using a saturated gauze pad such as a cotton gauze pad. The amount of the adhesion-promoting composition can result in a dried layer thickness, for example, from 1 μm to 10 μm, such as from 2 μm to 8 μm, or from 3 μm to 6 μm. For adhesion-promoting compositions comprising a colorant, the coverage and homogeneity of the layer thickness can be evaluated by visual inspection.

An adhesion-promoting composition provided by the present disclosure can be applied to a metal or metal alloy surface, including any metal or metal alloy surface used in the vehicle or aerospace industry. Examples of suitable surfaces include stainless steel AMS 5513, sulfuric acid anodized aluminum AMS 2471, titanium composition C AMS 4911, Alclad 2024 T3 aluminum QQA 250/5, aluminum QQA 250/12, aluminum QQA 250/13, and Alodine® 1200. These surfaces represent substrates encountered in the aerospace industry. The substrate, such as a metal substrate can include an aperture, a gap between panels, indentations, and/or fasteners.

The applied adhesion-promoting composition can then be dried. The adhesion-promoting composition can be dried by heating or by leaving at ambient conditions (25° C./50% RH) until the solvent has evaporated. For example, at a temperature of about 25° C. the applied adhesion-promoting composition can be left to dry, for example, for at least 10 minutes, at least 20 minutes, at least 30 minutes, or at least 1 hour. The dried adhesion-promoting composition can have a dried layer thickness, for example, from 1 μm to 10 μm, such as from 2 μm to 8 μm, or from 3 μm to 6 μm. The dried thickness of the adhesion-promoting layer can be, for example, greater than 1 μm, greater than 2 μm, greater than 3 μm, greater than 4 μm, greater than 6 μm, or greater than 8 μm. The dried thickness of the adhesion-promoting layer can be, for example, less than 10 μm, less than 8 μm, less than 6 μm, less than 4 μm, or less than 2 μm.

After the applied adhesion-promoting composition is dried, a layer of a sealant composition such as a free radical polymerizable sealant composition can be applied over the dried adhesion-promoting composition.

A sealant composition can contain, for example, from 30% to 70 wt % of a thiol-terminated sulfur-containing prepolymer such as a thiol-terminated polythioether prepolymer, from 35 wt % to 65 wt %, from 40 wt % to 60 wt % or from 45 wt % to 55 wt % of a thiol-terminated polythioether prepolymer, where wt % is based on the total weight of the sealant composition. A sealant composition can contain from 2 wt % to 12 wt % of a polyalkenyl and/or polyalkynyl curing agent, from 3 wt % to 11 wt %, from 4 wt % to 10 wt %, or from 5 wt % to 9 wt % of a polyalkenyl and/or polyalkynyl curing agent, where wt % is based on the total weight of the sealant composition.

Sealant compositions can be applied directly onto the surface an adhesion-promoting layer provided by the present disclosure. The combination of an adhesion promoting layer and an overlying sealant is referred to as a sealant system.

Sealant compositions may be formulated as Class A, Class B, or Class C sealants. A Class A sealant refers to a brushable sealant having a viscosity of 1 poise to 500 poise (0.1 Pa-sec to 50 Pa-sec) and is designed for brush application. A Class B sealant refers to an extrudable sealant having a viscosity from 4,500 poise to 20,000 poise (450 Pa-sec to 2,000 Pa-sec) and is designed for application by extrusion via a pneumatic gun. A Class B sealant can be used form fillets and sealing on vertical surfaces or edges where low slump/slag is required. A Class C sealant has a viscosity from 500 poise to 4,500 poise (50 Pa-sec to 450 Pa-sec) and is designed for application by a roller or combed tooth spreader. A Class C sealant can be used for fay surface sealing. Viscosity can be measured according to Section 5.3 of SAE Aerospace Standard AS5127/1C published by SAE International Group.

A sealant composition can be applied to an adhesion-promoting layer using any suitable method including, for example, brushing, spraying, roller coating, or extrusion.

An applied sealant composition can have a thickness, for example, from 5 mils to 25 mils (127 μm to 635 μm) such as from 10 mils to 20 mils (254 μm to 508 μm).

After the sealant composition is applied to the adhesion-promoting layer, the sealant composition and the adhesion-promoting layer can be exposed to radiation to initiate the curing reaction for both the sealant composition and the adhesion-promoting layer.

The photopolymerization reaction can be initiated by exposing a sealant to radiation such as UV radiation, for example, for less than 180 seconds, less than 120 seconds, less than 90 seconds, less than 60 seconds, less than 30 seconds, less than 15 seconds, or less than 5 seconds.

The photopolymerization reaction can be initiated by exposing the sealant and adhesion-promoting layer to radiation such as UV radiation, for example, for from 5 seconds to 180 seconds, from 5 seconds to 120 seconds, from 10 seconds to 90 seconds, from 15 seconds to 60 seconds, or from 20 seconds to 40 seconds.

The UV radiation can include radiation at a wavelength of 394 nm.

The total power of the UV exposure can be, for example, from 50 mW/cm$^2$ to 500 mW/cm$^2$, from 50 mW/cm$^2$ to 400 mW/cm$^2$, from 50 mW/cm$^2$ to 300 mW/cm$^2$, from 100 mW/cm$^2$ to 300 mW/cm$^2$, or from 150 mW/cm$^2$ to 250 mW/cm$^2$.

A multilayer sealant system can be exposed to a UV dose, for example from 1 J/cm$^2$ to 4 J/cm$^2$ to cure the composition. The UV source can be an 8 W lamp with a UVA spectrum. Other doses and/or other UV sources can be used. A UV dose for curing a sealant composition can be, for example, from 0.5 J/cm$^2$ to 4 J/cm$^2$, from 0.5 J/cm$^2$ to 3 J/cm$^2$, from 1 J/cm$^2$ to 2 J/cm$^2$, or from 1 J/cm$^2$ to 1.5 J/cm$^2$.

A multilayer sealant system can also be cured with radiation at blue wavelength ranges such as using a light-emitting diode.

A multilayer sealant system can be substantially transmissive to actinic radiation, partially transmissive to actinic radiation, or substantially opaque to actinic radiation.

The time to form a viable seal using sealant system provided the present disclosure can depend on several factors as can be appreciated by those skilled in the art, and as defined by the requirements of applicable standards and specifications. In general, sealant systems can develop adhesion strength within 24 hours to 30 hours, and 90% of full adhesion strength develops from 2 days to 3 days, following mixing and application to a surface. In general, full adhesion strength as well as other properties of cured sealant system can become fully developed within 7 days following mixing and application of a sealant composition to the adhesion-promoting layer.

Similar methods can be used to cure multilayer systems in which the polymer layer comprises a coating composition, an adhesive composition, or a potting/encapsulation composition. The polymer compositions for these multilayer systems can comprise a thiol/alkenyl and/or thiol/alkynyl curing chemistry and are curable using UV or visible radiation. The polymer compositions can comprise materials and the applied polymer compositions can have a thickness that permits at least some of the incident radiation to penetrate the applied polymer composition to irradiate the adhesion-promoting layer and thereby initiate curing of the adhesion-promoting layer.

A multilayer sealant system produced according to the methods of the present disclosure can be fuel-resistant. As used herein, the term "fuel resistant" means that a sealant has a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods described in ASTM D792 or AMS 3269 JRF Type I, as employed herein for determination of fuel resistance, has the following composition (see AMS 2629, issued Jul. 1, 1989), § 3.1.1 et seq., available from SAE (Society of Automotive Engineers, Warrendale, Pa.).

A multilayer sealant system produced according to the present disclosure can have an elongation of at least 100% and a tensile strength of at least 250 psi (1.72 MPa) when measured in accordance with the procedure described in AMS 3279, § 3.3.17.1, test procedure AS5127/1, § 7.7.

A multilayer sealant system according to the present disclosure can have a peel strength value of least 10 lb/in (1751 N/m) and 100% cohesive failure for repairability substrates or a peel strength value of at least 20 lb/in (3502 N/m) and 100% cohesive failure for other aerospace substrates as determined using AS5127/1 Rev. C Aerospace Standard Test Method.

A multilayer sealant system produced according to the present disclosure can have a tear strength of at least 25 pounds per linear inch (pli) or more when measured according to ASTM D624 Die C.

A multilayer sealant system can meet or exceed the requirements for aerospace sealants as set forth in AMS 3277.

Prior to environmental exposure a cured sealant can exhibit a density less than 1.2 g/cm$^3$ (specific gravity less than 1.2) as determined according to ISO 2781, a tensile strength greater than 1 MPa determined according to ISO 37, a tensile elongation greater than 150% determined according to ISO 37, and a hardness greater than 40 Shore A determined according to ISO 868, where the tests are performed at a temperature within a range of 21° C. to 25° C., and a humidity from 45% RH to 55% RH.

Following exposure to aviation fuel (JRF Type 1) according to ISO 1817 for 168 hours at 60° C., a cured sealant can exhibit a tensile strength greater than 1.4 MPa determined according to ISO 37, a tensile elongation greater than 150% determined according to ISO 37, and a hardness greater than 30 Shore A determined according to ISO 868, where the tests are performed at a temperature within a range of 21° C. to 25° C., and a humidity from 45% RH to 55% RH.

Following exposure to 3% aqueous NaCl for 168 hours at 60° C., a multilayer sealant system can exhibit a tensile strength greater than 1.4 MPa determined according to ISO 37, a tensile elongation greater than 150% determined according to ISO 37, and a hardness greater than 30 Shore A determined according to ISO 868, where the tests are performed at a temperature within a range of 21° C. to 25° C., and a humidity from 45% RH to 55% RH.

Following exposure to de-icing fluid according to ISO 11075 Type 1 for 168 hours at 60° C., a multilayer sealant system can exhibit a tensile strength greater than 1 MPa determined according to ISO 37, and a tensile elongation greater than 150% determined according to ISO 37, where the tests are performed at a temperature within a range of 21° C. to 25° C., and a humidity from 45% RH to 55% RH.

Following exposure to phosphate ester hydraulic fluid (Skydrol® LD-4) for 1,000 hours at 70° C., a multilayer sealant system can exhibit a tensile strength greater than 1 MPa determined according to ISO 37, a tensile elongation greater than 150% determined according to ISO 37, and a hardness greater than Shore 30A determined according to ISO 868, where the tests are performed at a temperature within a range of 21° C. to 25° C., and a humidity from 45% RH to 55% RH.

Adhesion-promoting compositions provided by the present disclosure may be used to assemble seal caps, which are used to seal fasteners such as those used in aircraft fuel tanks. When placed over a fastener and cured, the preformed seal caps allow visual inspection of the seal between the fastener and the cured composition. Methods for making premixed and frozen seal caps using polythioether polymer compositions are disclosed in U.S. Pat. No. 7,438,974, U.S. Application Publication No. 2013/0284359, U.S. Application Publication No. 2012/0040104, U.S. Application Publication No. 2012/0040103, and U.S. Application Publication No. 2015/0086726. For use with seal caps, an adhesion-promoting composition provided by the present disclosure can be applied to a fastener and dried, and a seal cap such as a UV-curable seal cap can be applied over the fastener having the pre-applied layer of an adhesion-promoting composition.

UV curable sealants may be used to fill and planarize surface defects such as depressions, dents, joints, and gaps. Aircraft surface may contain thousands of fasteners, and many joints and panel gaps. For example, fasteners that attach outer panels of aircraft are often countersunk and attached to conductive inner surfaces. It is desirable that the countersink depressions be planarized to improve the aerodynamics of the structure and also be electrically insulated. In addition, there can be joints between assemblies and gaps between adjacent panels that are desirable to fill to improve surface aerodynamics and to electrically insulate. These and other objectives can be accomplished by using the UV-curable sealants disclosed herein.

Surface depressions on an aerospace substrate, resulting, for example, from countersunk fasteners or dents, can be filled by applying a UV-curable sealant provided by the present disclosure and exposing the applied sealant to UV radiation to cure the sealant. Prior to applying the sealant over a fastener or other surface, the fastener or other surface may be wiped clean with a solvent and an adhesion-promoting composition provided by the present disclosure applied to the fastener or other surface and allowed to dry. The sealant may be applied to the fastener or surface having a dried layer of the adhesion-promoting composition with an applicator such as a syringe, cartridge, extruder, or spatula in an amount sufficient to fill the depression and smoothed. The applied sealant may be smoothed, for example, by smearing or by applying a plate on top of the sealant. The plate may be transparent to UV radiation, such as a glass plate or a plastic sheet such as a polyethylene sheet, thereby enabling pressure to be applied to the sealant during curing. The applied sealant can then be exposed to UV radiation to cure the sealant. If used, the UV-transmissive pressure plate may then be removed to provide an aerodynamically smooth surface. In certain methods, it may be necessary to remove excess sealant or otherwise smooth the interface between the edge of the cured sealant and the aircraft substrate. This may be accomplished, for example, by sanding the surface using, for example, an abrasive paper, such as 400 wet/dry sand paper.

Similar methods may be used to fill gaps between panels or other surface features.

Such methods may be used during aircraft assembly or during repair and replacement operations. In general, the aircraft surface including the cured UV-curable sealant is painted prior to use.

For aerospace sealant applications it can be desirable that a sealant including a multilayer sealant including a partially reacted alkoxysilane primer and overlying thiol-ene based sealant meet the requirements of Mil-S—22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a tack free cure time at room temperature within 24 hours of the pot life. Useful working time or pot life refers to the time period the composition remains workable for application at ambient temperatures after the catalyst is released.

Sealant systems provided by the present disclosure comprise a metal substrate, an adhesion-promoting layer contacting and overlying the metal substrate, and a sealant contacting and overlying the adhesion-promoting layer. The adhesion-promoting layer enhances the adhesion between the sealant and the metal substrate. Sealant systems provided by the present disclosure can be used to seal surfaces and can be used to repair and/or restore damaged and/or aged surfaces to reseal a surface or maintain the integrity of a sealed surface.

The metal substrate can comprise the surface of a vehicle such as a marine vehicle, a passenger vehicle, a transport vehicle, or an aerospace vehicle. The metal substrate can comprise a surface of a feature or part such as a fuel tank or fastener. Sealant systems including an adhesion-promoting layer provided by the present disclosure can be used to seal and/or reseal apertures, surfaces, joints, fillets, fay surfaces, and fasteners including apertures, surfaces, fillets, joints, fay surfaces fasteners of vehicles including aerospace vehicles. Surfaces including vehicular surfaces such as aerospace surfaces, sealed with a sealant system including an adhesion-promoting layer are included within the scope of the disclosure.

A multilayer sealant system provided by the present disclosure can be used with vehicles especially where fuel resistance is desired, A sealant refers to a curable composition that has the ability when cured to resist atmospheric conditions such as moisture (e.g., from 5% RH to 100% RH) and temperature (e.g., from −30° C. to 40° C.) and at least partially block the transmission of materials such as water, water vapor, fuel, solvents, and/or liquids and gases.

A multilayer sealant system can exhibit properties acceptable for use in vehicle and aerospace sealant applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi (2.75 MPa); tear strength greater than 50 pounds per linear inch (pli) (8.75 N/mm); elongation between 250% and 300%; and hardness greater than 40 Durometer A. These and other cured sealant properties appropriate for aviation and aerospace applications are disclosed in AMS 3265B. It is also desirable that, when cured, compositions of the present disclosure used in aviation and aircraft applications exhibit a percent volume swell not greater than 25% following immersion for one week at 60° C. (140° F.) and ambient pressure in Jet Reference Fluid (JRF) Type 1. Other properties, ranges, and/or thresholds may be appropriate for other sealant applications.

A multilayer sealant system can be fuel-resistant. The term "fuel resistant" means that a composition, when applied to a substrate and cured, can provide a cured product, such as a sealant, that exhibits a percent volume swell of not greater than 40%, in some cases not greater than 25%, in some cases not greater than 20%, and in other cases not more than 10%, after immersion for one week at 140° F. (60° C.) and ambient pressure in JRF Type I according to methods described in ASTM D792 (American Society for Testing and Materials) or AMS 3269 (Aerospace Material Specification). JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, § 3.1.1 etc., available from SAE (Society of Automotive Engineers)).

A multilayer sealant system can exhibit a tensile elongation of at least 200% and a tensile strength of at least 200 psi when measured in accordance with the procedure described in AMS 3279, § 3.3.17.1, test procedure AS5127/1, § 7.7. In general, for a Class A sealant there is no tensile and elongation requirement. For a Class B sealant, as a general requirement, tensile strength is equal to or greater than 200 psi (1.38 MPa) and elongation is equal to or greater than 200%. Acceptable elongation and tensile strength can be different depending on the application.

A multilayer sealant system can exhibit a lap shear strength of greater than 200 psi (1.38 MPa), such as at least 220 psi (1.52 MPa), at least 250 psi (1.72 MPa), and, in some cases, at least 400 psi (2.76 MPa), when measured according to the procedure described in SAE AS5127/1 paragraph 7.8.

A cured sealant system can meet or exceed the requirements for aerospace sealants as set forth in AMS 3277.

A multilayer sealant system provided by the present disclosure can exhibit a peel strength greater than 10 pli and 100% cohesive failure; greater than 20 pli/100% CF, greater than 30 pli/100% CF, or greater than 40 pli/100% CF.

A multilayer sealant system including an adhesion-promoting layer provided by the present disclosure can meet the requirements of AMS draft specification G9-16AA. Draft Specification G9-16AA requires the peel strength to be at least 10 pli (113 N-cm) and 100% cohesive strength on a variety of aerospace substrates. A cured sealant system provided by the present disclosure can exhibits greater than 20 pli peel strength and 100% cohesive failure determined according to AMS-3277 within 24 hours following cure using cladded aluminum (Alclad, QQ-A-250/5 or 2024-T3) and stainless steel (AMS 5518) substrates.

A multilayer sealant system provided by the present disclosure can exhibit cohesive failure as determined according to Draft Specification G9-16AA after at least 1-week ambient exposure, at least 2 weeks, at least 4 weeks, or at least 8 weeks following curing the sealant system.

Multilayer sealant systems including an adhesion-promoting layer provided by the present disclosure can be used to seal a part including a surface of a vehicle such as an aerospace vehicle.

Multilayer sealant systems including an adhesion-promoting layer provided by the present disclosure can be used to seal apertures, surfaces, joints, fillets, fay surfaces of a vehicle such as an aerospace vehicle.

The term "vehicle" is used in its broadest sense and includes all types of aircraft, spacecraft, watercraft, and ground vehicles. For example, a vehicle can include, aircraft such as airplanes including private aircraft, and small, medium, or large commercial passenger, freight, and military aircraft; helicopters, including private, commercial, and military helicopters; aerospace vehicles including, rockets and other spacecraft. A vehicle can include a ground vehicle such as, for example, trailers, cars, trucks, buses, vans, construction vehicles, golf carts, motorcycles, bicycles, trains, and railroad cars. A vehicle can also include watercraft such as, for example, ships, boats, and hovercraft.

A multilayer sealant system can be used in a F/A-18 jet or related aircraft such as the F/A-18E Super Hornet and F/A-18F; in the Boeing 787 Dreamliner, 737, 747, 717 passenger jet aircraft, a related aircraft (produced by Boeing Commercial Airplanes); in the V-22 Osprey; VH-92, S-92, and related aircraft (produced by NAVAIR and Sikorsky); in the G650, G600, G550, G500, G450, and related aircraft (produced by Gulfstream); and in the A350, A320, A330, and related aircraft (produced by Airbus). Compositions provided by the present disclosure can be used in any suitable commercial, military, or general aviation aircraft such as, for example, those produced by Bombardier Inc. and/or Bombardier Aerospace such as the Canadair Regional Jet (CRJ) and related aircraft; produced by Lockheed Martin such as the F-22 Raptor, the F-35 Lightning, and related aircraft; produced by Northrop Grumman such as the B-2 Spirit and related aircraft; produced by Pilatus Aircraft Ltd.; produced by Eclipse Aviation Corporation; or produced by Eclipse Aerospace (Kestrel Aircraft).

A multilayer sealant system provided by the present disclosure can be used to seal parts and surfaces of vehicles such as fuel tank surfaces and other surfaces exposed to or potentially exposed to aerospace solvents, aerospace hydraulic fluids, and aerospace fuels.

The present invention includes parts sealed with a multilayer sealant system provided by the present disclosure, and assemblies and apparatus comprising a part sealed with a multilayer sealant system provided by the present disclosure.

The present invention includes vehicles comprising a part such as a surface sealed with a multilayer sealant system provided by the present disclosure. For example, an aircraft comprising a fuel tank or portion of a fuel tank sealed with a multilayer sealant system provided by the present disclosure is included within the scope of the invention.

ASPECTS OF THE INVENTION

The invention is further defined by the following aspects.

Aspect 1. A photocurable adhesion-promoting precursor composition comprising: an amine-functional alkoxysilane; an alkenyl-functional alkoxysilane; a photoinitiator; and an organic solvent.

Aspect 2. The precursor composition of aspect 1, wherein the precursor composition comprises: from 1 wt % to 30 wt % of the amine-functional alkoxysilane; from 1 wt % to 30 wt % of the alkenyl-functional alkoxysilane; from 0.1 wt % to 20 wt % of the photoinitiator; and from 30 wt % to 95 wt % of the organic solvent; wherein wt % is based on the total weight of the photocurable adhesion-promoting precursor composition.

Aspect 3. The precursor composition of any one of aspects 1 to 2, further comprising: a mercapto-functional alkoxysilane; and an organic titanate and/or an organic zirconate.

Aspect 4. The precursor composition of any one of aspects 1 to 3, wherein the mercapto-functional alkoxysilane comprises a γ-mercapto-functional alkoxysilane.

Aspect 5. The precursor composition of any one of aspects 3 to 4, wherein the precursor composition comprises an organic titanate.

Aspect 6. The precursor composition of any one of aspects 3 to 5, wherein the precursor composition comprises: from 0.5 wt % to 4.5 wt % of the mercapto-functional alkoxysilane; and from 2.0 wt % to 6.0 wt % of the organic titanate and/or the organic zirconate, wherein wt % is based on the total weight of the photocurable adhesion-promoting precursor composition.

Aspect 7. The precursor composition of any one of aspects 1 to 6, further comprising water.

Aspect 8. The precursor composition of aspect 7, wherein the precursor composition comprises from 1 wt % to 9 wt % of the water, wherein wt % is based on the total weight of the photocurable adhesion-promoting precursor composition.

Aspect 9. The precursor composition of any one of aspects 1 to 8, wherein the precursor composition comprises: from 5 wt % to 15 wt % of the amine-functional alkoxysilane; from 5 wt % to 17 wt % of the alkenyl-functional alkoxysilane; from 0.5 wt % to 4.5 wt % of a mercapto-functional alkoxysilane; from 2.0 wt % to 6.0 wt % of an organic titanate, an organic zirconate, or a combination thereof; from 0.5 wt % to 3.0 wt % of the photoinitiator; from 65 wt % to 85 wt % of the organic solvent; and from 1 wt % to 9 wt % of water, wherein wt % is based on the total weight of the photocurable adhesion-promoting precursor composition.

Aspect 10. The precursor composition of any one of aspects 1 to 9, wherein the precursor composition further comprises: from 1 wt % to 10 wt % of a photosensitizer; and from 1 wt % to 10 wt % of a co-initiator, wherein wt % is based on the total weight of the photocurable adhesion-promoting precursor composition.

Aspect 11. The precursor composition of any one of aspects 1 to 9, wherein the precursor composition further comprises: from 0.5 wt % to 3.0 wt % of a photosensitizer; and from 0.5 wt % to 3.0 wt % of a co-initiator, wherein wt % is based on the total weight of the photocurable adhesion-promoting precursor composition.

Aspect 12. The precursor composition of any one of aspects 1 to 11, wherein the amine-functional alkoxysilane comprises: a monoamine-functional trialkoxysilane; and a secondary amine-functional alkoxysilane.

Aspect 13. The precursor composition of aspect 12, wherein the amine-functional alkoxysilane comprises: from 65 wt % to 85 wt % of the monoamine-functional trialkoxysilane; and from 15 wt % to 35 wt % of the secondary amine-functional alkoxysilane, wherein wt % is based on the total weight of the amine-functional alkoxysilane in the photocurable adhesion-promoting precursor composition.

Aspect 14. The precursor composition of any one of aspects 1 to 13, wherein the alkenyl-functional alkoxysilane comprises: an alkenyl-functional alkoxysilane, wherein the alkenyl-functional alkoxysilane does not comprise a ketoximine group; and an alkenyl-functional (ketoximino)alkoxysilane.

Aspect 15. The precursor composition of aspect 14, wherein the alkenyl-functional alkoxysilane comprises: from 55 wt % to 75 wt % of the alkenyl-functional alkoxysilane; and from 25 wt % to 45 wt % of the alkenyl-functional (ketoximino)alkoxysilane, wherein wt % is based on the total weight of the alkenyl-functional alkoxysilane in the photocurable adhesion-promoting precursor composition.

Aspect 16. The precursor composition of any one of aspects 1 to 15, wherein the organic solvent comprises a glycol ether.

Aspect 17. The precursor composition of any one of aspects 1 to 16, further comprising a colorant and/or a photochromic material.

Aspect 18. The precursor composition of any one of aspects 1 to 17, wherein the precursor composition is substantially free of an acid capable of catalyzing hydrolysis of the alkoxysilanes.

Aspect 19. A photocurable adhesion-promoting composition, comprising the product of heating the photocurable adhesion-promoting precursor composition of any one of aspects 1 to 18 at temperature from 40° C. to 100° C.

Aspect 20. The adhesion-promoting composition of aspect 19, wherein heating comprises for from 20 hours to 200 hours.

Aspect 21. The adhesion-promoting composition of any one of aspects 19 to 20, further comprising, after heating, cooling the photocurable adhesion-promoting composition to a temperature from 20° C. to 30° C.

Aspect 22. The adhesion-promoting composition of any one of aspects 19 to 21, further comprising, after cooling, heating the photocurable adhesion-promoting composition at a temperature from 40° C. to 60° C. for at least 24 hours.

Aspect 23. The adhesion-promoting composition of aspect 22, wherein heating comprises heating the photocurable adhesion-promoting composition for at least 7 days.

Aspect 24. The adhesion-promoting composition of any one of aspects 19 to 23, wherein the photocurable adhesion-promoting composition has substantially the Si-NMR spectrum of FIG. 1.

Aspect 25. The adhesion-promoting composition of any one of aspects 19 to 24, wherein a Si-NMR spectrum at 99.36 MHz of the photocurable adhesion-promoting composition has characteristic peaks at about 58 ppm, at about 68 ppm, at about 82 ppm, and at about 108 ppm.

Aspect 26. The adhesion-promoting composition of any one of aspects 19 to 25, wherein the photocurable adhesion-promoting composition has substantially the FTIR spectrum of FIG. 2.

Aspect 27. The adhesion-promoting composition of any one of aspects 19 to 26, wherein an FTIR spectrum of the adhesion-promoting composition has characteristic peaks at about 3380 nm, from about 2980 nm to 2800 nm, from 1670 nm to 1600 nm, at about 1350 nm, at about 1100 nm, and at about 960 nm.

Aspect 28. The adhesion-promoting composition of any one of aspects 19 to 27, wherein the adhesion-promoting composition comprises alkoxy groups, and in the adhesion-promoting composition, from 30% of to 70% of the alkoxy groups are hydrolyzed.

Aspect 29. The adhesion-promoting composition of any one of aspects 19 to 28, wherein the photocurable adhesion-promoting composition has a viscosity less than 100 cp (0.1 Paxs) measured using a CAP 2000 viscometer (parallel plate) at 25° C. and at a shear rate of 50 rpm.

Aspect 30. The adhesion-promoting composition of any one of aspects 19 to 29, wherein the photocurable adhesion-promoting composition is storage stable at 25° C. for at least 2 months under dark conditions.

Aspect 31. The adhesion-promoting composition of any one of aspects 19 to 30, wherein the photocurable adhesion-promoting composition is visually clear at 25° C. for at least 2 months under dark conditions.

Aspect 32. A photocurable adhesion-promoting layer derived from the photocurable adhesion-promoting composition of any one of aspects 19 to 31.

Aspect 33. The adhesion promoting layer of aspect 32, wherein the photocurable adhesion-promoting layer comprises the photocurable adhesion-promoting composition after drying.

Aspect 34. The adhesion promoting layer of aspect 33, wherein drying comprises evaporating the organic solvent from the photocurable adhesion-promoting composition at a temperature from 20° C. to 30° C., for less than 1 hour at atmospheric pressure.

Aspect 35. The adhesion promoting layer of any one of aspects 33 to 34, wherein the photocurable adhesion-promoting layer comprises: from 20 wt % to 40 wt % of the amine-functional alkoxysilane; from 25 wt % to 45 wt % of the alkenyl-functional alkoxysilane; from 2.5 wt % to 12.5 wt % of the mercapto-functional alkoxysilane; from 7.5 wt % to 17.5 wt % of the organic titanate and/or organic zirconate; and from 2.0 wt % to 8.0 wt % of the photoinitiator; wherein wt % is based on the total weight of the dried adhesion-promoting layer.

Aspect 36. The adhesion promoting layer of aspect 35, wherein the photocurable adhesion-promoting layer further comprises: from 2.0 wt % to 8.0 wt % of the photosensitizer; and from 2.0 wt % to 8.0 wt % of the co-initiator, wherein wt % is based on the total weight of the dried photocurable adhesion-promoting layer.

Aspect 37. A multilayer system comprising: (a) the photocurable adhesion-promoting layer of any one of aspects 32 to 36; and (b) a polymer layer overlying the photocurable adhesion-promoting layer, wherein the polymer layer is derived from a radiation-curable composition.

Aspect 38. A multilayer system of aspect 37, wherein the polymer layer comprises a sealant, a coating, an adhesive, or an encapsulant/potting compound.

Aspect 39. The multilayer system of any one of aspects 37 to 38, wherein the radiation-curable composition comprises a UV-curable composition.

Aspect 40. The multilayer system of any one of aspects 37 to 39, wherein the radiation-curable composition comprises a thiol/alkenyl and/or thiol/alkynyl curing chemistry.

Aspect 41. The multilayer system of any one of aspects 37 to 40, wherein the radiation-curable composition comprises a radiation-curable sealant composition and the polymer layer comprises a sealant.

Aspect 42. The multilayer system of any one of aspects 37 to 41, wherein the prepolymer layer comprises a reaction product of reactants comprising: a sulfur-containing prepolymer; and a curing agent reactive with the sulfur-containing prepolymer.

Aspect 43. The multilayer system of aspect 42, wherein, the sulfur-containing polymer comprises a thiol-terminated sulfur-containing prepolymer; and the curing agent comprises a polyalkenyl, a polyalkynyl, or a combination thereof.

Aspect 44. The multilayer system of aspect 42, wherein, the sulfur-containing prepolymer comprises a thiol-terminated polythioether prepolymer; and the curing agent comprises a polyalkenyl ether.

Aspect 45. The multilayer system of any one of aspects 37 to 44, wherein the photocurable adhesion-promoting layer has a thickness from 1 μm to 20 μm.

Aspect 46. The multilayer system of any one of aspects 37 to 45, wherein, the multilayer system overlies a metal substrate; and the multilayer system, when cured, exhibits greater than 20 pli peel (3502 N/m) strength and 100% cohesive failure determined according to Draft Specification G9-16AA after curing for at least 1 week at 25° C./50% RH.

Aspect 47. A vehicle comprising the multilayer system of any one of aspects 37 to 46.

Aspect 48. The vehicle of aspect 47, wherein the vehicle comprises an aerospace vehicle.

Aspect 49. A method of making a photocurable adhesion-promoting composition comprising heating the photocurable adhesion-promoting precursor composition of any one of aspects 1 to 18 to a temperature from 40° C. to 100° C., for from 20 hours to 200 hours to form the photocurable adhesion-promoting composition.

Aspect 50. The method of aspect 49, further comprising, after heating, cooling the photocurable adhesion-promoting composition to a temperature from 20° C. to 30° C.

Aspect 51. The method of aspect 50, further comprising, after cooling, heating the photocurable adhesion-promoting composition to a temperature from 40° C. to 60° C. for at least 24 hours.

Aspect 52. The method of aspect 50, further comprising, after cooling, heating the photocurable adhesion-promoting composition to a temperature from 40° C. to 60° C. for at least 7 days.

Aspect 53. A photocurable adhesion-promoting composition made according to the method of any one of aspects 49 to 52.

Aspect 54. An adhesion-promoting layer derived from the photocurable adhesion-promoting composition of aspect 53.

Aspect 55. A method of making a multilayer system, comprising: applying the photocurable adhesion-promoting composition of any one of aspects 19 to 31 to a substrate; drying the applied photocurable adhesion-promoting composition to form a photocurable adhesion-promoting layer; applying a radiation-curable polymer composition onto the photocurable adhesion-promoting layer; and exposing the photocurable adhesion-promoting layer and the applied radiation-curable polymer composition to radiation to cure the photocurable adhesion-promoting layer and to cure the applied radiation-curable polymer composition.

Aspect 56. The method of aspect 55, wherein the substrate comprises a metal.

Aspect 57. The method of any one of aspects 55 to 56, wherein the radiation-curable polymer composition comprises a UV-curable polymer composition.

Aspect 58. The method of any one of aspects 55 to 57, wherein the radiation-curable polymer composition comprises: a sulfur-containing prepolymer; and a curing agent reactive with the sulfur-containing prepolymer.

Aspect 59. The method of any one of aspects 55 to 58, wherein, the sulfur-containing polymer comprises a thiol-terminated sulfur-containing prepolymer; and the curing agent comprises a polyalkenyl, a polyalkynyl, or a combination thereof.

Aspect 60. The method of any one of aspects 55 to 58, wherein, the sulfur-containing prepolymer comprises a thiol-terminated polythioether prepolymer; and the curing agent comprises a polyalkenyl, a polyalkynyl, or a combination thereof.

Aspect 61. The method of any one of aspects 55 to 60, wherein the substrate comprises an aluminum alloy or a stainless steel alloy.

Aspect 62. A vehicle comprising a multilayer system made according to the method of any one of aspects 55 to 61.

Aspect 63. The vehicle of aspect 62, wherein the vehicle comprises an aerospace vehicle.

EXAMPLES

Embodiments provided by the present disclosure are further illustrated by reference to the following examples, which describe adhesion-promoting compositions provided by the present disclosure, uses of such compositions, and sealant systems comprising adhesion-promoting layers prepared using adhesion-promoting compositions provided by the present disclosure. It will be apparent to those skilled in the art that many modifications, both to materials, and methods, may be practiced without departing from the scope of the disclosure.

Example 1

Photocurable Adhesion Promoting Composition

Two adhesion promoters were prepared using the constituents listed in Table 1.

TABLE 1

| Adhesion-promoting precursor composition. | |
|---|---|
| Constituent | wt % |
| Monoamine-functional trialkoxysilane | 5-11 |
| Alkenyl-functional alkoxysilane | 5-11 |
| Triamine-functional trialkoxysilane | 1.5-3.5 |
| Organic solvent | 50-70 |
| Organic titanate/zirconate | 2-6 |
| Thiol-functional trialkoxysilane | 1.5-3.5 |
| Alkenyl-functional tris-ketoximinosilane | 2-6 |
| Water | 3-7 |
| Photoinitiator | 1-3 |
| Photosensitizer | 1-3 |
| Co-initiator | 1-3 |

Adhesion Promoter (1) was prepared by sequentially adding each of the individual constituent to the solvent and thoroughly mixing before adding the next constituent. The fully-dissolved mixture was heated to 70° C. for 24 h and then maintained at 60° C. for 3 days. The adhesion-promoting composition was optionally subjected to an accelerating aging process by heating the mixture at 50° C. for 2 weeks under dark conditions.

Adhesion-promoting composition (2) was prepared by sequentially adding certain constituents to the solvent and thoroughly mixing before adding the next constituent. The fully-dissolved mixture was heated to 70° C. for 24 h and then maintained at 60° C. for 3 days. Then the remaining constituents were added and the mixture was thoroughly mixed. The adhesion-promoting composition was optionally subjected to an accelerated aging process by heating the mixture at 50° C. for 2 weeks under dark conditions.

A Si-NMR spectrum at 99.36 MHz of Adhesion Promoter (1) is shown in FIG. 1.

A FTIR spectrum of Adhesion Promoter (1) is shown in FIG. 2.

The adhesion promoting compositions were stable for at least 9 months under dark conditions under an inert atmosphere at 25° C./50% RH.

Example 2

Sealant Formulation

The ability of adhesive-promoting layers to provide adhesion to metal substrates was evaluated using a UV-curable thiol-ene based sealant.

The sealant was prepared by combining two parts. The compositions of Part A and Part B are provided in Table 2 and Table 3, respectively.

Preparation of Part A: In a Black Max® 200 JAR (Flack-Tek Inc.; Landrum, S. C.) cup, the Part A composition was prepared by sequentially adding vinyl ethers, initiators, plasticizers, and filler (Table 1) followed by gentle mixing first using a spatula and then by using a SpeedMixer® (Hauschild, Model No. DAC 600FVZ) at 2,000 rpm for 30 sec. After adding the silica, the resulting mixture was mixed at 2,000 rpm for 60 sec to produce a well-dispersed mixture having a viscosity of ca. 280 poise (28 Pa-s) (Brookfield Viscometer CAP 2000; Spindle #7, 10 rpm, 25° C.). In addition, before adding Part A to the formulation, the cup was mixed at 2,000 rpm for 30 sec to ensure homogeneity before transferring the material to a formulating cup.

Preparation of Part B: In a Hauschild Black Max® 200 JAR, 57.34 g of Permapol® P-3.1E prepolymer (PPG Aerospace, Sylmar, Calif.) (Thiol EW: 1625) was added followed by 13.53 g of a higher functionality Permapol® P3.1 E-2.8 (PPG Aerospace, Sylmar, Calif.) (thiol EW: 1531) and 2.49 g of a trithiol polyfunctionalizing agent (Table 3). The resulting mixture was first hand-mixed using a spatula followed by mixing at 1,200 rpm for 1 min using a Hauschild SpeedMixer®. To this mixture 5.39 g of polyolefin particles were added, followed by mixing at 2,000 rpm for 1 min. To this mixture, fumed silica was added followed by mixing at 2,350 rpm for 2 mins. This was followed by the addition of 16.37 g of silica gel and mixing at 2,300 rpm for 2 min (twice) with intermittent hand mixing to ensure all filler in the cup had been incorporated. This was followed by the addition of low-density filler and mixing at 1800 rpm for 1 min. This was followed by the addition of adhesion promoter and the formulation mixed at 2,000 rpm for 1 min (twice) with an intermittent hand mix. The final formulation had a viscosity of ca. 20,000 poise (2,000 Pa-s) (Brookfield Viscometer CAP2000; Spindle #7, 10 rpm 25° C.). Table 2. Composition of UV-Curable Sealant: Part A.

TABLE 2

Composition of UV-Curable Sealant: Part A.

| Component | Product | Amount wt % |
|---|---|---|
| Vinyl ether | Divinyl ether | 69.41 |
| Vinyl ether | hydroxy-functional vinyl ether | 9.49 |
| Photoinitiator | Omnirad ® TPO | 0.31 |
| Photoinitiator | Omnirad ® 651 | 1.25 |
| Plasticizer | Hydrocarbon | 8.45 |
| Inorganic filler | Calcium carbonate | 0.91 |
| Inorganic filler | Silica | 10.18 |

TABLE 3

Composition of UV-Curable Sealant: Part B.

| Component | Product | Amount wt % |
|---|---|---|
| Thiol-terminated polythioether | Permapol ® 3.1E | 57.34 |
| Thiol-terminated polythioether | Permapol ® 3.1E–2.8 | 13.53 |
| Polythiol | Trithiol | 2.49 |
| Organic filler | Polyolefin particles | 5.39 |
| Inorganic filler | Fumed Silica | 4.5 |
| Inorganic filler | Silica gel | 16.37 |
| Lightweight Filler | Expancel ® microspheres | 0.25 |
| Adhesion Promoter | thiol-functional alkoxysilane | 0.13 |

Part B and Part A were mixed in a weight ratio of 100 g Part B to 8 g Part A to provide a UV-curable sealant composition (UV SCOD sealant).

Example 3

Peel Testing

Peel samples were prepared using the following procedure.

Substrates for peel testing were prepared and cleaned according to AS5127@ Rev. C Aerospace Standard Test Method. An adhesion promoting composition was applied to the substrates with AMS 3819 Grade A cloth to form a uniformed layer on the substrate surface. The samples were left at 25 C/50% RH for at least 30 min to allow the solvent to evaporate.

After drying, the thickness of the adhesion-promoting layer was about 3 μm. The UV SCOD sealant of Example 2 was then applied over the dried adhesion-promoting layer to a thickness of about 0.125 in (3.175 mm). A pre-primed peel medium, for example, a 30-mesh stainless steel screen, was placed on top of the UV SCOD sealant, before an overcoat of the UV SCOD sealant was applied to a thickness of 0.03 in (0.762 mm). The UV SCOD sealant was exposed to UV at 395 nm (LED source) for 1 min at 0.26 W/cm² using an OmniCure® AC475 8 W UV LED lamp (Excelitas Technologies).

The repairability peel samples were tested within 24 h after exposure to UV. Other samples were immersed in the specified solvent(s) according to Draft Specification G9-16AA. Aerospace Sealant Specification. AS5127/1 Rev. C Aerospace Standard Test Method was followed when testing peel samples. Draft Specification G9-16AA requires a peel strength value of at least 10 lb/in (1751 N/m) and 100% cohesive failure for repairability substrates and a peel strength value of at least 20 lb/in (3502 N/m) and 100% cohesive failure for all other tests. Aerospace sealants PR-2001, PR-1826, PR-1828, and PR-1750 are available from PPG Aerospace. The substrate materials are defined in the Draft Specification G9-16AA.

The results of the Repairability Peel Tests are provided in Table 4.

TABLE 4

Repairability test results.

| Substrate | Peel Strength (lb/in) | % Cohesive failure |
|---|---|---|
| RW-6162-71 | 31 | 100 |
| RW-6162-71, Conditioned[1] | 25 | 100 |
| PR-2001 | 27 | 100 |
| PR-2001, Conditioned[1] | 24 | 100 |
| PR-1826 | 31 | 100 |
| PR-1826, Conditioned[1] | 33 | 100 |
| PR-1828 | 26 | 100 |
| PR-1828, Conditioned[1] | 29 | 100 |
| PR-1750 | 32 | 100 |
| PR-1750, Conditioned[1] | 30 | 100 |

[1]Conditioned test panels were immersed in AMS 2629 Rev. E at 60° C. for 3 days followed by exposure to dry air at 49° C. or 3 days, followed by heat aging at 121° C. for 7 days under dark conditions.

The peel test results for panels immersed in 50%/50% AMS 2629 Rev.E and 3% salt water at 60° C. for 7 days is provided in Table 5.

TABLE 5

Peel test results.

| | AMS 2629 Rev. E section | | 3% salt water section | |
|---|---|---|---|---|
| Substrate | Peel Strength (lb/in) | % Cohesive failure | Peel Strength (lb/in) | % Cohesive failure |
| AMS 4045 | 33 | 100 | 36 | 100 |
| Alodine ® 1200 | 40 | 100 | 37 | 100 |
| AMS 2471 | 36 | 100 | 37 | 100 |
| AMS 5516 | 37 | 100 | 35 | 100 |
| AMS 4911 | 33 | 100 | 36 | 100 |
| AMS-C-27725 | 35 | 100 | 38 | 100 |

The peel test results for panels immersed in AMS 2629 Rev.E at 60° C. for 7 days is provided in Table 6.

TABLE 6

Peel test results.

| Substrate | Peel Strength (lb/in) | % Cohesive failure |
|---|---|---|
| AMS 4045 | 33 | 100 |
| Alodine ® 1200 | 32 | 100 |
| AMS 2471 | 30 | 100 |
| AMS 5516 | 28 | 100 |
| AMS 4911 | 31 | 100 |
| AMS-C-27725 | 35 | 100 |

The peel test results for panels immersed in 3% salt water at 60° C. for 7 days is provided in Table 7.

TABLE 7

Peel test results.

| Substrate | Peel Strength (lb/in) | % Cohesive failure |
|---|---|---|
| MIL-PRF-23377, 7 days at 25° C./50% RH | 38 | 100 |
| MIL-PRF-23377, 2 hours at 200° C. | 37 | 100 |
| MIL-PRF-85285 | 33 | 100 |
| MIL-PRF-85582 | 38 | 100 |

The peel test results for panels subjected to heat cycle testing is provided in Table 8. The test panels were immersed in 50%/150% AMS 2629 Rev.E and 3% salt water and exposed to 6 cycles each cycle consisting of 60° C. for 100 h followed by 71° C. for 10 h and 82° C. for 1 h.

TABLE 8

Peel test results.

| Substrate | AMS 2629 Rev. E section | | 3% salt water section | |
|---|---|---|---|---|
| | Peel Strength (lb/in) | % Cohesive failure | Peel Strength (lb/in) | % Cohesive failure |
| AMS 4045 | 32 | 100 | 39 | 100 |
| Alodine ® 1200 | 33 | 100 | 35 | 100 |
| AMS 2471 | 37 | 100 | 39 | 100 |
| AMS 5516 | 24 | 100 | 38 | 100 |
| AMS 4911 | 32 | 100 | 38 | 100 |
| AMS-C-27725 | 31 | 100 | 38 | 100 |
| Graphite/Epoxy, Tool | 32 | 100 | 40 | 100 |
| Graphite/Epoxy, Ply | 32 | 100 | 39 | 100 |
| Graphite/Bismaleimide, Tool | 31 | 100 | 35 | 100 |
| Graphite/Bismaleimide, Ply | 32 | 100 | 37 | 100 |

The peel test results for panels immersed in 50%/50% AMS 2629 Rev.E and 3% salt water at 60° C. for 70 days is provided in Table 9.

TABLE 9

Peel test results.

| Substrate | AMS 2629 Rev. E section | | 3% salt water section | |
|---|---|---|---|---|
| | Peel Strength (lb/in) | % Cohesive failure | Peel Strength (lb/in) | % Cohesive failure |
| AMS 4911 | 43 | 100 | 51 | 100 |
| AMS-C-27725 | 37 | 100 | 54 | 100 |

The peel test results for panels immersed in AMS 2629 Rev.E at 60° C. for 70 days is provided in Table. 10.

TABLE 10

Peel test results.

| Substrate | Peel Strength (lb/in) | % Cohesive failure |
|---|---|---|
| AMS4911 | 40 | 100 |
| AMS-C-27725 | 41 | 100 |

Example 4

COMPARATIVE EXAMPLES

The peel strength of test panels prepared using other adhesion-promoting compositions was evaluated. The test panels were prepared as described in Example 3, except that a different adhesion promoting composition was used. The adhesion-promoting compositions are listed in Table 11. The adhesion-promoting compositions used in test panels 3-5 were UV-curable and did not contain an organic titanate/zirconate.

TABLE 11

Peel strength using various adhesion-promoting compositions.

| | Composition | Substrate | Immersion condition | Peel data (24 h after cure unless noted) |
|---|---|---|---|---|
| 1 | 9 wt % γ-aminopropyltriethoxysilane<br>6 wt % alkenyl-functional alkoxysilane<br>3 wt % H$_2$O/IPA | PR-2001 | none | 100% AF [1] |
| 2 | 9.5 wt % γ-aminopropyltriethoxysilane<br>5.5 wt % epoxy-functional triethoxysilane<br>1.8 wt % H$_2$O/IPA | PR-1776 | none | 100% AF |
| 3 | 9.5 wt % γ-aminopropyltriethoxysilane<br>5.5 wt % epoxy-functional triethoxysilane<br>2 wt % UV photoinitiator<br>1.8 wt % H$_2$O/IPA | PR-1782 | none | 100% AF |
| 4 | 15 wt % γ-aminopropyltriethoxysilane<br>9 wt % alkenyl-functional alkoxysilane<br>2 wt % UV photoinitiator<br>5.4% H$_2$O/IPA | AMS4045 | 1 week in 50%/50% AMS2629 and 3% NaCl solution 60° C. | 90% CF [2] for both layer |
| 5 | 15 wt % γ-aminopropyltriethoxysilane<br>9 wt % alkenyl-functional alkoxysilane<br>2 wt % UV photoinitiator<br>5.4 wt % H$_2$O/IPA | AMS5516 | 1 week in 50%/50% AMS2629 and 3% NaCl solution 60° C. | 60% CF for both layer |

[1] AF, adhesive failure.
[2] CF, cohesive failure.

Finally, it should be noted that there are alternative ways of implementing the embodiments disclosed herein. Accordingly, the present embodiments are to be considered as illustrative and not restrictive. Furthermore, the claims are not to be limited to the details given herein and are entitled to their full scope and equivalents thereof.

What is claimed is:

1. A photocurable adhesion-promoting precursor composition comprising:
   from 1 wt % to 30 wt % of an amine-functional alkoxysilane;
   from 1 wt % to 30 wt % of an alkenyl-functional alkoxysilane;
   from 0.1 wt % to 20 wt % of a photoinitiator; and
   from 30 wt % to 95 wt % of an organic solvent;
   wherein wt % is based on the total weight of the photocurable adhesion-promoting precursor composition.

2. The precursor composition of claim 1, further comprising:
   a mercapto-functional alkoxysilane; and
   an organic titanate and/or an organic zirconate.

3. The precursor composition of claim 2, wherein,
   the mercapto-functional alkoxysilane comprises a γ-mercapto-functional alkoxysilane; and
   the organic titanate and/or organic zirconate comprises an organic titanate.

4. The precursor composition of claim 2, wherein the precursor composition comprises water.

5. The precursor composition of claim 1, wherein the precursor composition comprises:
   from 5 wt % to 15 wt % of the amine-functional alkoxysilane;
   from 7 wt % to 17 wt % of the alkenyl-functional alkoxysilane;
   from 0.5 wt % to 4.5 wt % of a mercapto-functional alkoxysilane;
   from 2.0 wt % to 6.0 wt % of an organic titanate, an organic zirconate, or a combination thereof;
   from 0.5 wt % to 3.0 wt % of the photoinitiator;
   from 65 wt % to 85 wt % of the organic solvent; and
   from 1 wt % to 9 wt % of water,
   wherein wt % is based on the total weight of the photocurable adhesion-promoting precursor composition.

6. The precursor composition of claim 5, wherein the amine-functional alkoxysilane comprises:
   from 65 wt % to 85 wt % of an γ-amine-functional alkoxysilane; and
   from 15 wt % to 35 wt % of a secondary amine-functional alkoxysilane,
   wherein wt % is based on the total weight of the amine-functional alkoxysilane in the photocurable adhesion-promoting precursor composition.

7. The precursor composition of claim 5, wherein the alkenyl-functional alkoxysilane comprises:
   from 55 wt % to 75 wt % of an alkenyl-functional alkoxysilane that does not comprise a ketoximino group; and
   from 25 wt % to 45 wt % of an alkenyl-functional (ketoximino)alkoxysilane,
   wherein wt % is based on the total weight of the alkenyl-functional alkoxysilane in the photocurable adhesion-promoting precursor composition.

8. The precursor composition of claim 1, wherein the precursor composition is substantially free of an acid capable of catalyzing hydrolysis of the alkoxysilanes.

9. The precursor composition of claim 1, wherein the precursor composition comprises:
   from 3 wt % to 13 wt % of a monoamine-functional trialkoxysilane;
   from 3 wt % to 13 wt % of an alkenyl-functional alkoxysilane;
   from 1 wt % to 4 wt % of a triamine-functional trialkoxysilane;
   from 50 wt % to 70 wt % of an organic solvent;
   from 1 wt % to 7 wt % of an organic titanate and/or organic zirconate;
   from 1 wt % to 4 wt % of a thiol-functional trialkoxysilane;
   from 1 wt % to 7 wt % of an alkenyl-functional tris-ketoximinosilane;
   from 2 wt % to 8 wt % water;
   from 0.5 wt % to 3.5 wt % of a photoinitiator; and
   from 1 wt % to 7 wt % of a photosensitizer and/or co-initiator,
   wherein wt % is based on the total weight of the photocurable adhesion-promoting precursor composition.

10. A photocurable adhesion-promoting composition, comprising the product of heating the photocurable adhesion-promoting precursor composition of claim 1 at temperature from 40° C. to 100° C. for from 20 hours to 200 hours.

11. The adhesion-promoting composition of claim 10, wherein the photocurable adhesion-promoting composition has the silicon nuclear magnetic resonance (Si-NMR) spectrum of FIG. 1.

12. The adhesion-promoting composition of claim 10, wherein the photocurable adhesion-promoting composition has the Fourier transform infrared (FTIR) spectrum of FIG. 2.

13. The adhesion-promoting composition of claim 10, wherein,
   the photocurable adhesion-promoting composition has a viscosity less than 100 cp (0.1 Pa×s) measured using a CAP 2000 viscometer (parallel plate) at 25° C. and at a shear rate of 50 rpm; and
   wherein the photocurable adhesion-promoting composition is storage stable at 25° C. for at least 2 months.

14. A photocurable adhesion-promoting layer derived from the photocurable adhesion-promoting composition of claim 10.

15. The adhesion promoting layer of claim 14, wherein,
   the photocurable adhesion-promoting layer comprises the photocurable adhesion-promoting composition after drying; and
   the photocurable adhesion-promoting layer comprises:
      from 20 wt % to 40 wt % of the amine-functional alkoxysilane;
      from 25 wt % to 45 wt % of the alkenyl-functional alkoxysilane;
      from 2.5 wt % to 12.5 wt % of the mercapto-functional alkoxysilane;
      from 7.5 wt % to 17.5 wt % of the organic titanate and/or organic zirconate; and
      from 2.0 wt % to 8.0 wt % of the photoinitiator;
      wherein wt % is based on the total weight of the dried adhesion-promoting layer.

16. A multilayer system comprising:
(a) the photocurable adhesion-promoting layer of claim 14; and
(b) a polymer layer overlying the photocurable adhesion-promoting layer, wherein the polymer layer is derived from a radiation-curable composition.

17. The multilayer system of claim 16, wherein the radiation-curable composition comprises a UV-curable composition.

18. The multilayer system of claim 16, wherein,
the polymer layer comprises a reaction product of reactants comprising:
a thiol-terminated sulfur-containing prepolymer; and
a curing agent reactive with the thiol-terminated sulfur-containing prepolymer;
wherein the curing agent comprises a polyalkenyl, a polyalkynyl, or a combination thereof.

19. The multilayer system of claim 16, wherein,
the multilayer system overlies a metal substrate; and
the multilayer system, when cured, exhibits greater than 20 pli peel (3502 N/m) strength and 100% cohesive failure determined according to Draft Specification G9-16AA after curing for at least 1 week at 25° C./50% RH.

20. A vehicle comprising the multilayer system of claim 16.

21. The vehicle of claim 20, wherein the vehicle comprises an aerospace vehicle.

* * * * *